US008301487B2

(12) United States Patent
Rapperport et al.

(10) Patent No.: US 8,301,487 B2
(45) Date of Patent: Oct. 30, 2012

(54) SYSTEM AND METHODS FOR CALIBRATING PRICING POWER AND RISK SCORES

(75) Inventors: Jamie Rapperport, Palo Alto, CA (US); Jeffrey D. Johnson, San Francisco, CA (US); Gianpaolo Callioni, Redwood City, CA (US); Allan David Ross Gray, Menlo Park, CA (US); Sean Geraghty, Scottsdale, AZ (US); Vlad Gorlov, Park Ridge, CA (US); Amit Mehra, Wheaton, IL (US)

(73) Assignee: Vendavo, Inc., Mountain View, CA (US)

( * ) Notice: Subject to any disclaimer, the term of this patent is extended or adjusted under 35 U.S.C. 154(b) by 661 days.

(21) Appl. No.: 12/408,868

(22) Filed: Mar. 23, 2009

(65) Prior Publication Data

US 2009/0259523 A1 Oct. 15, 2009

Related U.S. Application Data

(63) Continuation-in-part of application No. 11/938,714, filed on Nov. 12, 2007, which is a continuation-in-part of application No. 11/415,877, filed on May 2, 2006.

(60) Provisional application No. 60/865,643, filed on Nov. 13, 2006.

(51) Int. Cl.
*G06Q 99/00* (2006.01)

(52) U.S. Cl. ............... 705/7.35; 705/7.28; 705/7.32; 705/400

(58) Field of Classification Search .......... 705/7.31, 705/7.35, 330, 400, 7.28
See application file for complete search history.

(56) References Cited

U.S. PATENT DOCUMENTS

| | | | |
|---|---|---|---|
| 3,806,711 A | 4/1974 | Cousins, Jr. | |
| 5,053,957 A | 10/1991 | Suzuki | |
| 5,224,034 A | 6/1993 | Katz et al. | |
| 5,461,708 A | 10/1995 | Kahn | |
| 5,497,489 A | 3/1996 | Menne | |
| 5,537,590 A | 7/1996 | Amado | |
| 5,590,269 A | 12/1996 | Kruse et al. | |

(Continued)

FOREIGN PATENT DOCUMENTS

WO WO 99/60486 11/1999
(Continued)

OTHER PUBLICATIONS

Cortese, Amy, "Price Flexing: How the Web Adds New Twists", Mar. 1, 2002; CioInsight, NA, 6 pgs.*

(Continued)

*Primary Examiner* — John Hayes
*Assistant Examiner* — Freda A Nelson
(74) *Attorney, Agent, or Firm* — Kang S. Lim

(57) ABSTRACT

A power and risk score calibrator is provided, which receives quantitative power and risk scores for each quantitative segment, and receives qualitative power and risk scores for each qualitative segment. The qualitative segment and the qualitative power and risk scores are defined by a user. The system generates consolidated segments. Then consolidated power and risk scores for each of the consolidated segments are generated, respectively. The gaps between the qualitative power and risk scores and the consolidated power and risk scores are reconciled. From these reconciliations, adjustment factors are generated, which are applied by pricing power and risk value calibrators. The system may also perform a drill down to explain the gap between the qualitative scores and the consolidated scores.

20 Claims, 50 Drawing Sheets

U.S. PATENT DOCUMENTS

| | | | |
|---|---|---|---|
| 5,670,984 | A | 9/1997 | Robertson et al. |
| 5,689,287 | A | 11/1997 | Mackinlay et al. |
| 5,710,887 | A | 1/1998 | Chelliah et al. |
| 5,740,448 | A | 4/1998 | Gentry et al. |
| 5,758,327 | A | 5/1998 | Gardner et al. |
| 5,808,894 | A | 9/1998 | Wiens et al. |
| 5,870,717 | A | 2/1999 | Wiecha |
| 5,873,069 | A | 2/1999 | Reuhl et al. |
| 5,878,400 | A | 3/1999 | Carter, III |
| 5,946,666 | A | 8/1999 | Nevo et al. |
| 6,009,407 | A * | 12/1999 | Garg ............................ 705/7.25 |
| 6,075,530 | A | 6/2000 | Lucas et al. |
| 6,078,901 | A | 6/2000 | Ching |
| 6,151,031 | A | 11/2000 | Atkins et al. |
| 6,211,880 | B1 | 4/2001 | Impink, Jr. |
| 6,320,586 | B1 | 11/2001 | Plattner et al. |
| 6,434,533 | B1 | 8/2002 | Fitzgerald |
| 6,553,350 | B2 | 4/2003 | Carter |
| 6,665,577 | B2 | 12/2003 | Onyshkevych |
| 6,678,695 | B1 | 1/2004 | Bonneau et al. |
| 6,785,664 | B2 | 8/2004 | Jameson |
| 6,801,201 | B2 | 10/2004 | Escher |
| 6,812,926 | B1 | 11/2004 | Rugge |
| 6,851,604 | B2 | 2/2005 | Girotto et al. |
| 6,856,967 | B1 | 2/2005 | Woolston et al. |
| 6,907,403 | B1 | 6/2005 | Klein et al. |
| 6,988,076 | B2 | 1/2006 | Ouimet |
| 7,015,912 | B2 | 3/2006 | Marais |
| 7,046,248 | B1 | 5/2006 | Perttunen |
| 7,076,463 | B1 | 7/2006 | Boies et al. |
| 7,080,026 | B2 | 7/2006 | Singh et al. |
| 7,092,929 | B1 | 8/2006 | Dvorak et al. |
| 7,133,848 | B2 | 11/2006 | Phillips et al. |
| 7,149,716 | B2 | 12/2006 | Gatto |
| 7,155,510 | B1 | 12/2006 | Kaplan |
| 7,218,325 | B1 | 5/2007 | Buck |
| 7,233,928 | B2 | 6/2007 | Huerta et al. |
| 7,254,584 | B1 | 8/2007 | Addison, Jr. |
| 7,308,421 | B2 | 12/2007 | Raghupathy et al. |
| 7,315,835 | B1 | 1/2008 | Takayasu et al. |
| 7,343,355 | B2 | 3/2008 | Ivanov et al. |
| 7,360,697 | B1 | 4/2008 | Sarkar et al. |
| 7,966,226 | B1 * | 6/2011 | Temares et al. ............... 705/26.7 |
| 7,966,266 | B2 * | 6/2011 | Delvat ........................... 705/400 |
| 2001/0003814 | A1 | 6/2001 | Hirayama et al. |
| 2002/0007323 | A1 | 1/2002 | Tamatsu |
| 2002/0032610 | A1 | 3/2002 | Gold et al. |
| 2002/0042782 | A1 | 4/2002 | Albazz et al. |
| 2002/0052817 | A1 | 5/2002 | Dines et al. |
| 2002/0059229 | A1 | 5/2002 | Natsumeda et al. |
| 2002/0072993 | A1 | 6/2002 | Sandus et al. |
| 2002/0099596 | A1 | 7/2002 | Geraghty |
| 2002/0107819 | A1 | 8/2002 | Ouimet |
| 2002/0116348 | A1 | 8/2002 | Phillips et al. |
| 2002/0128953 | A1 | 9/2002 | Quallen et al. |
| 2002/0152133 | A1 | 10/2002 | King et al. |
| 2002/0152150 | A1 | 10/2002 | Cooper et al. |
| 2002/0156695 | A1 | 10/2002 | Edwards |
| 2002/0165726 | A1 | 11/2002 | Grundfest |
| 2002/0165760 | A1 | 11/2002 | Delurgio et al. |
| 2002/0178077 | A1 | 11/2002 | Katz et al. |
| 2002/0188576 | A1 | 12/2002 | Peterson et al. |
| 2002/0194051 | A1 | 12/2002 | Hall et al. |
| 2003/0009411 | A1 | 1/2003 | Ram et al. |
| 2003/0028451 | A1 | 2/2003 | Ananian |
| 2003/0033240 | A1 | 2/2003 | Balson et al. |
| 2003/0095256 | A1 | 5/2003 | Cargill et al. |
| 2003/0110066 | A1 | 6/2003 | Walser et al. |
| 2003/0115129 | A1 | 6/2003 | Feaver et al. |
| 2003/0126053 | A1 | 7/2003 | Boswell et al. |
| 2003/0130883 | A1 | 7/2003 | Schroeder et al. |
| 2003/0167209 | A1 | 9/2003 | Hsieh |
| 2003/0191723 | A1 | 10/2003 | Foretich et al. |
| 2003/0195810 | A1 | 10/2003 | Raghupathy et al. |
| 2003/0200185 | A1 | 10/2003 | Huerta et al. |
| 2003/0225593 | A1 | 12/2003 | Ternoey et al. |
| 2003/0229552 | A1 | 12/2003 | Lebaric et al. |
| 2004/0024715 | A1 | 2/2004 | Ouimet |
| 2004/0049470 | A1 | 3/2004 | Ouimet |
| 2004/0078288 | A1 | 4/2004 | Forbis et al. |
| 2004/0117376 | A1 | 6/2004 | Lavin et al. |
| 2004/0128225 | A1 | 7/2004 | Thompson et al. |
| 2004/0133526 | A1 | 7/2004 | Shmueli et al. |
| 2004/0193442 | A1 | 9/2004 | Kimata et al. |
| 2004/0267674 | A1 | 12/2004 | Feng et al. |
| 2005/0004819 | A1 | 1/2005 | Etzioni et al. |
| 2005/0096963 | A1 | 5/2005 | Myr et al. |
| 2005/0197857 | A1 | 9/2005 | Avery |
| 2005/0197971 | A1 | 9/2005 | Kettner et al. |
| 2005/0256778 | A1 | 11/2005 | Boyd et al. |
| 2005/0267831 | A1 | 12/2005 | Esary et al. |
| 2005/0278227 | A1 | 12/2005 | Esary et al. |
| 2006/0004861 | A1 | 1/2006 | Albanese et al. |
| 2006/0031178 | A1 | 2/2006 | Lehrman et al. |
| 2006/0031179 | A1 | 2/2006 | Lehrman |
| 2006/0047574 | A1 | 3/2006 | Sundaram et al. |
| 2006/0069585 | A1 | 3/2006 | Springfield et al. |
| 2006/0241923 | A1 | 10/2006 | Xu et al. |
| 2007/0043655 | A1 * | 2/2007 | Phillips et al. .................. 705/38 |
| 2007/0294192 | A1 | 12/2007 | Tellefsen |
| 2008/0046446 | A1 * | 2/2008 | Sundararajan et al. ....... 707/100 |
| 2008/0059280 | A1 | 3/2008 | Tellefsen et al. |
| 2008/0126264 | A1 | 5/2008 | Tellefsen et al. |

FOREIGN PATENT DOCUMENTS

| | | |
|---|---|---|
| WO | WO 00/29995 | 5/2000 |
| WO | WO 0210961 A2 * | 2/2002 |
| WO | WO 2005/1199500 | 12/2005 |

OTHER PUBLICATIONS

Jakovljevic, P. J., "Know Thy Market Segment's Price Response", May 18, 2007, 22 pages.*

Secomandi, Nicola and Johnson, Jeffrey D., "Operations Management and Business Pricing", Dec. 1, 2007, Carnegie Mellon University research Showcase, 34 pgs.*

Dr. Lawrence Haar, "Pricing power in Wholesale Markets—A risky Business Wrestle with How Much to Charge for Their Product", Mar. 2004, 7 pages.*

"PCT International Search Report and the Written Opinion of the International Searching Authority", Application No. PCT/US07/18663, mailed Aug. 26, 2008.

"PCT International Search Report and the Written Opinion of the International Searching Authority", Application No. PCT/US07/23740, mailed Mar. 3, 2008.

"PCT International Search Report", Application No. PCT/US07/10754, mailed Nov. 7, 2007.

"PCT International Search Report", Application No. PCT/US07/11571, mailed Jan. 7, 2008.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: Apr. 28, 2000, p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Beidl, Richard et al., "The Coming of Risk-Based Pricing: Part Two", Oct. 2000, Mortgage Banking, Washington, vol. 61, Issue 1.

Walker, Kenton B. et al., "Planning a Revenue Stream System in an E-Business Environment", 2001, Industrial Management—Data Systems, p. 406-413, 8/9;ABI/INFORM Global.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

Bhattacharya, Anindya et al. "Using 'smart' pricing to increase profits and maximize customer satisfaction", Aug. 2001, The National Public Accountant; vol. 25, Issue 6.

Kim, Byung-Do et al., "Modeling the Distribution of Price Sensitivity and Implications for Optimal Retail Pricing", Jul. 1995, Journal of Business & Economic Statistics; vol. 13, Issue 3.

Leeflang, Peter S. H. et al., "Marketing Decisions Based on Econometric Models", Spring 2002, Marketing Research; vol. 14, Issue 1.

Dawes, John, "Price Changes and Defection Levels in a Subscription-Type Market: Can An Estimation Model Really Predict Defecation Levels?", The Journal of Services Marketing; vol. 18, Issue 1.

Lucke, Dorothea et al., "A Note on R&D and Price Elasticity of Demand," Nov. 2005, Jahrbucher fur Nationalokonomie and Statistik; vol. 225, Issue 6.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

Levy, Michael et al., "Emerging Trends in Retail Pricing Practice: Implications for Research", 2004, Journal of Retailing; vol. 80.

Hung, Chao-Shun, "Conjectural Variations and Market Performance in a Differentiated Product Industry", Dec. 1991, Atlantic Economic Journal; vol. 19, Issue 4.

Dawes, John, "Assessing the Impact of a Very Successful Price Promotion on Brand, Category and Competitor Sales", 2004, The Journal of Product and Brand Management; vol. 13, Issue 5.

Leeflang, Peter S. H. et al., "Marketing Decisions Based on Econometric Models", Spring 2002, Marketing Research; vol. 14; Issue 1.

Dawes, John, "Price Changes and Defection Levels in a Subscription-Type Market: Can An Estimation Model Really Predict Defecation Levels?", The Journal of Services Marketing; vol. 18, Issue 1, 2004.

Lucke, Dorothea et al., "A Note on R&D and Price Elasticity of Demand," Nov. 2005, Jahrbucher fur Nationalokonomic and Statistik; vol. 225, Issue 6.

Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition," Feb. 1990. Management Science, vol. 36, Issue 2, pp. 175-199.

Kirschen, D. S., Stribac, G., Cumparayot, P., de Paiva Mendes, D. "Factoring the Elasticity of Demand in Electricity Prices," May 2000. IEEE Transactions on Power Systems, vol. 15, No. 2, pp. 612-617.

* cited by examiner

| Sub-Family | Type Group | Qualitative | | Quantitative | | Qual. vs. Quant. Gap | |
|---|---|---|---|---|---|---|---|
| | | Power (0-100) | Risk (0-100) | Power (0-100) | Risk (0-100) | Power (0-100) | Risk (0-100) |
| Accessories | A1 | 50 | 35 | 60 | 43 | 10 | 8 |
| Accessories | A35 | 40 | 40 | 48 | 54 | 8 | 14 |
| Accessories | A36 | 30 | 35 | 44 | 22 | 14 | 13 |
| Accessories | C8 | 50 | 60 | 76 | 38 | 26 | 22 |
| Accessories | C12 | 40 | 20 | 52 | 32 | 12 | 12 |
| Accessories | Home | 70 | 20 | 46 | 7 | 24 | 13 |
| Accessories | Mobile | 5 | 25 | 10 | 38 | 5 | 13 |
| Accessories | Other | 5 | 35 | 58 | 55 | 53 | 20 |

| Client Segment | Generated Segment | Profit Contribution ($K) | Number of Customers | Revenue ($K) | Capacity Utilization (%) | CoV of List Price Yield | Percentile of Profit Contribution ($) | Percentile of Number of Customers | RAW PRICING RISK SCORE | Percentile of Capacity Utilization | Percentile of CoV of List Price Yield | RAW PRICING POWER SCORE |
|---|---|---|---|---|---|---|---|---|---|---|---|---|
| | | | | 3,820,000 | | | | | | | | |
| | | | | | | | Weights 30% | 70% | | Weights 60% | 40% | |
| Cars | Sedans | 700,000 | 10 | 1,000,000 | 70% | 20% | 1.000 | 0.500 | 65.0 | 0.125 | 0.125 | 12.5 |
| Cars | Roadsters | 255,000 | 2 | 300,000 | 85% | 50% | 0.500 | 0.875 | 76.3 | 0.750 | 0.750 | 75.0 |
| Cars | Hatchbacks | 300,000 | 3 | 500,000 | 75% | 30% | 0.625 | 0.750 | 71.3 | 0.250 | 0.250 | 25.0 |
| Trucks | SUVs | 525,000 | 5 | 700,000 | 80% | 30% | 0.875 | 0.625 | 70.0 | 0.500 | 0.250 | 40.0 |
| Trucks | PickUps | 480,000 | 30 | 600,000 | 75% | 40% | 0.750 | 0.125 | 31.3 | 0.250 | 0.500 | 35.0 |
| Trucks | Vans | 100,000 | 1 | 200,000 | 50% | 15% | 0.250 | 1.000 | 77.5 | - | - | - |
| Boats | Yachts | 200,000 | 10 | 290,000 | 90% | 50% | 0.375 | 0.500 | 46.3 | 0.875 | 0.750 | 82.5 |
| Boats | Speedboats | 72,000 | 80 | 180,000 | 80% | 70% | 0.125 | - | 3.8 | 0.500 | 1.000 | 70.0 |
| Boats | Cruisers | 30,000 | 20 | 50,000 | 90% | 40% | - | 0.250 | 17.5 | 0.875 | 0.500 | 72.5 |

SYSTEM AND METHODS FOR CALIBRATING PRICING POWER AND RISK SCORES

CROSS REFERENCE TO RELATED APPLICATIONS

This application is a continuation-in-part of U.S. patent application Ser. No. 11/938,714, filed on Nov. 12, 2007, by Jens E. Tellefsen and Jeffrey D. Johnson, entitled "Systems and Methods for Price Optimization using Business Segmentation", which in turn is a continuation-in-part of U.S. patent application Ser. No. 11/415,877 filed May 2, 2006, and also claims priority of U.S. Provisional patent application Ser. No. 60/865,643 filed on Nov. 13, 2006, which applications are incorporated herein in their entirety by this reference.

This application is related to co-pending and concurrently filed application Ser. No. 12/408,862, filed Mar. 23, 2009, by Jamie Rapperport, Jeffrey D. Johnson, Gianpaolo Callioni, Allan David Ross Gray, Sean Geraghty, Vlad Gorlov and Amit Mehra, entitled "System and Methods for Generating Quantitative Pricing Power and Risk Scores", currently pending, which application is incorporated herein in its entirety by this reference.

BACKGROUND OF THE INVENTION

The present invention relates to business to business market price control and management systems. More particularly, the present invention relates to systems and methods for generating pricing power and risk scores for business segments in order to facilitate the optimizing of prices in a business to business market setting wherein an optimal price change is determined according to business strategy and objectives.

There are major challenges in business to business (hereinafter "B2B") markets which hinder the effectiveness of classical approaches to price optimization. These classical approaches to price optimization typically rely upon databases of extensive transaction data which may then be modeled for demand. The effectiveness of classical price optimization approaches depends upon a rich transaction history where prices have changed, and consumer reactions to these price changes are recorded. Thus, classical price optimization approaches work best where there is a wide customer base and many products, such as in Business to Consumer (B2C) settings.

Unlike B2C environments, in B2B markets a small number of customers represent the lion's share of the business. Managing the prices of these key customers is where most of the pricing opportunity lies. Also, B2B markets are renowned for being data-poor environments. Availability of large sets of accurate and complete historical sales data is scarce.

Furthermore, B2B markets are characterized by deal negotiations instead of non-negotiated sale prices (prevalent in business to consumer markets). There is no existing literature on optimization of negotiation terms and processes, neither at the product/segment level nor at the customer level.

Finally, B2B environments suffer from poor customer segmentation. Top-down price segmentation approaches are rarely the answer. Historical sales usually exhibit minor price changes for each customer. Furthermore, price bands within customer segments are often too large and customer behavior within each segment is non-homogeneous.

Product or segment price optimization relies heavily on the quality of the customer segmentation and the availability of accurate and complete sales data. In this context, price optimization makes sense only (i) when price behavior within each customer segment is homogeneous and (ii) in the presence of data-rich environments where companies sales data and their competitors' prices are readily available. These conditions are met almost exclusively in business to consumer (hereinafter "B2C") markets such as retail, and are rarely encountered in B2B markets.

On the other hand, customer price optimization relies heavily on the abundance of data regarding customers' past behavior and experience, including win/loss data and customer price sensitivity. Financial institutions have successfully applied customer price optimization in attributing and setting interest rates for credit lines, mortgages and credit cards. Here again, the aforementioned condition is met almost exclusively in B2C markets.

There are three major types of price optimization solutions in the B2B marketplace: revenue/yield management, price testing and highly customized optimization solutions.

Revenue/yield management approaches were initially developed in the airline context, and were later expanded to other applications such as hotel revenue management, car rentals, cruises and some telecom applications (e.g. bandwidth pricing). These approaches are exclusively concerned with perishable products (e.g. airline seats) and are not pricing optimization approaches per se.

Price testing approaches attempt to learn and model customer behavior dynamically by measuring customer reaction to price changes. While this approach has been applied rather successfully in B2C markets, where the benefits of price optimization outweigh the loss of a few customers, its application to B2B markets is questionable. No meaningful customer behavior can be modeled without sizable changes in customer prices (both price increases and decreases). In B2B markets, where a small fraction of customers represent a substantial fraction of the overall business, these sizable price-changing tests can have adverse impact on business. High prices can drive large customers away with potentially a significant loss of volume. Low prices on the other hand, even for short periods of time, can dramatically impact customer behavior, increase customers' price sensitivities and trigger a more strategic approach to purchasing from the customers' side.

Finally, in B2B markets, highly customized price optimization solutions have been proposed. These solutions have had mixed results. These highly customized price optimization solutions require significant consulting effort in order to address companies' unique situations including cost structure, customer and competitor behavior, and to develop optimization methods that are tailored to the type of pricing data that is available. Most of the suggested price changes from these solutions are not implemented. Even when they are implemented, these price changes tend not to stick. Furthermore, the maintenance of such pricing solutions usually requires a lot of effort. This effort includes substantial and expensive on-going consulting engagements with the pricing companies.

Due to the difficulties inherent in a B2B environment, there is a strong need for a system able to provide guidance for price changes which reduces the need for ongoing consultation and is more readily implemented.

Furthermore, instead of developing highly customized company-specific price optimization solutions, there remains a need for scalable and customizable price optimization solutions that vary by industry vertical.

In view of the foregoing, System and Methods for Calibrating Pricing Power and Risk Scores are disclosed. The present invention provides a novel system for price guidance is put forward which leverages multiple predictive factors to calibrate two values known as business segment "Pricing Risk" and "Pricing Power". Calibrated Pricing Risk and Pricing Power may be used by a price management system to provide negotiation guidance, price allocation data and business decision guidance.

Utilizing Pricing Power and Pricing Risk enables clients in a B2B environment to generate efficient pricing guidance without the need for a particularly rich transaction database. Additionally, Pricing Power and Pricing Risk may be leveraged to provide guidance to clients with a great reduction in the invasive, expensive and time consuming consultation typically required when generating highly customized price optimization solutions.

SUMMARY OF THE INVENTION

The present invention discloses business to business market price control and management systems. More particularly, the present invention teaches systems and methods for calibrating Pricing Power and Pricing Risk scores in a business to business market setting. Pricing Risk and Power may be used by a price management system to provide negotiation guidance, price allocation data and business decision guidance in a cost efficient manner and without the need for rich transaction data.

A pricing power and risk score calibrator is provided. The power and risk score calibrator includes a segment pricing power reconciler, a segment pricing risk reconciler, a segment cartographer, a segment power aggregator, a segment risk aggregator, a pricing power value comparer, a pricing risk value comparer, a pricing power value calibrator, and a pricing risk value calibrator.

The segment pricing power reconciler receives a quantitative power score for each quantitative segment, and receives a qualitative power score for each qualitative segment. In a similar manner, the segment pricing risk reconciler receives a quantitative risk score for each quantitative segment, and receives a qualitative risk score for each qualitative segment. The qualitative segment is defined by a user, and the user also determines the qualitative power and risk scores for each qualitative segment.

The segment cartographer generates consolidated segments by aggregating some of the quantitative segments. The resulting consolidated segments are analogous to the qualitative segments. The segment cartographer may also generate a segment map for aggregating the quantitative segments by comparing the quantitative segments to the qualitative segments.

The segment power and risk aggregators may then generate consolidated power and risk scores for each of the consolidated segments, respectively. The consolidated power score is generated by aggregating the quantitative power score for each quantitative segment used to generate each consolidated segment. The consolidated risk score is generated in a similar manner.

The pricing power value comparer may then reconcile gaps between the qualitative power score for each qualitative segment with the consolidated power score for each consolidated segment. The pricing power value comparer may do the same for gaps between qualitative and consolidated risk scores. From these reconciliations, power and risk adjustment factors are generated.

The pricing power and risk value calibrators may then apply the adjustment factors to the quantitative power and risk scores to generate calibrated power and risk scores. These adjustments include nonlinear adjustments.

The pricing power and risk value calibrators may also perform a 'drill down' into the qualitative power and risk scores. A drill down generates data explaining the gap between the qualitative scores and the consolidated scores.

From the drill down data, a variety of actions may be performed, including modifying the qualitative scores, overriding the quantitative scores, and tuning the quantitative scores and rerunning the calibration.

The power and risk score calibrator may also include a quantitative pricing power and pricing risk score generator for generating the quantitative power score and the quantitative risk score for each quantitative segment. Such a quantitative pricing power and pricing risk score generator may include a segment generator, a segment pricing power analyzer, and a segment pricing risk analyzer.

The segment generator may receive segments associated with a customer. In some embodiments, the segment generator may also generate the segments.

The segment pricing power and risk analyzers identify pricing power and factors, and assigns a raw score to each factor. The segment pricing power and risk analyzers then generate a pricing power and risk weights for each of the raw pricing power and risk scores.

Then, the segment pricing power and risk analyzers may generate the quantitative pricing power and risk scores for each quantitative segment by computing a weighted average of the pricing power and risk factors using the generated pricing power and risk weights.

Lastly, the power and risk score calibrator may also include a reconciled data outputter for outputting the calibrated power and risk scores to a segment price setter.

Note that the various features of the present invention described above can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 29 is a flow chart illustrating an exemplary method for generating a quotation in accordance with an embodiment of the present invention;

FIG. 32 is an illustrative example of a pricing power and risk table for exemplary segments in accordance with an embodiment of the present invention;

FIG. 38 is an exemplary table of quantitative pricing power and risk factors and scores for exemplary generated segments in accordance with an embodiment of the present invention;

DETAILED DESCRIPTION OF THE PREFERRED EMBODIMENTS

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
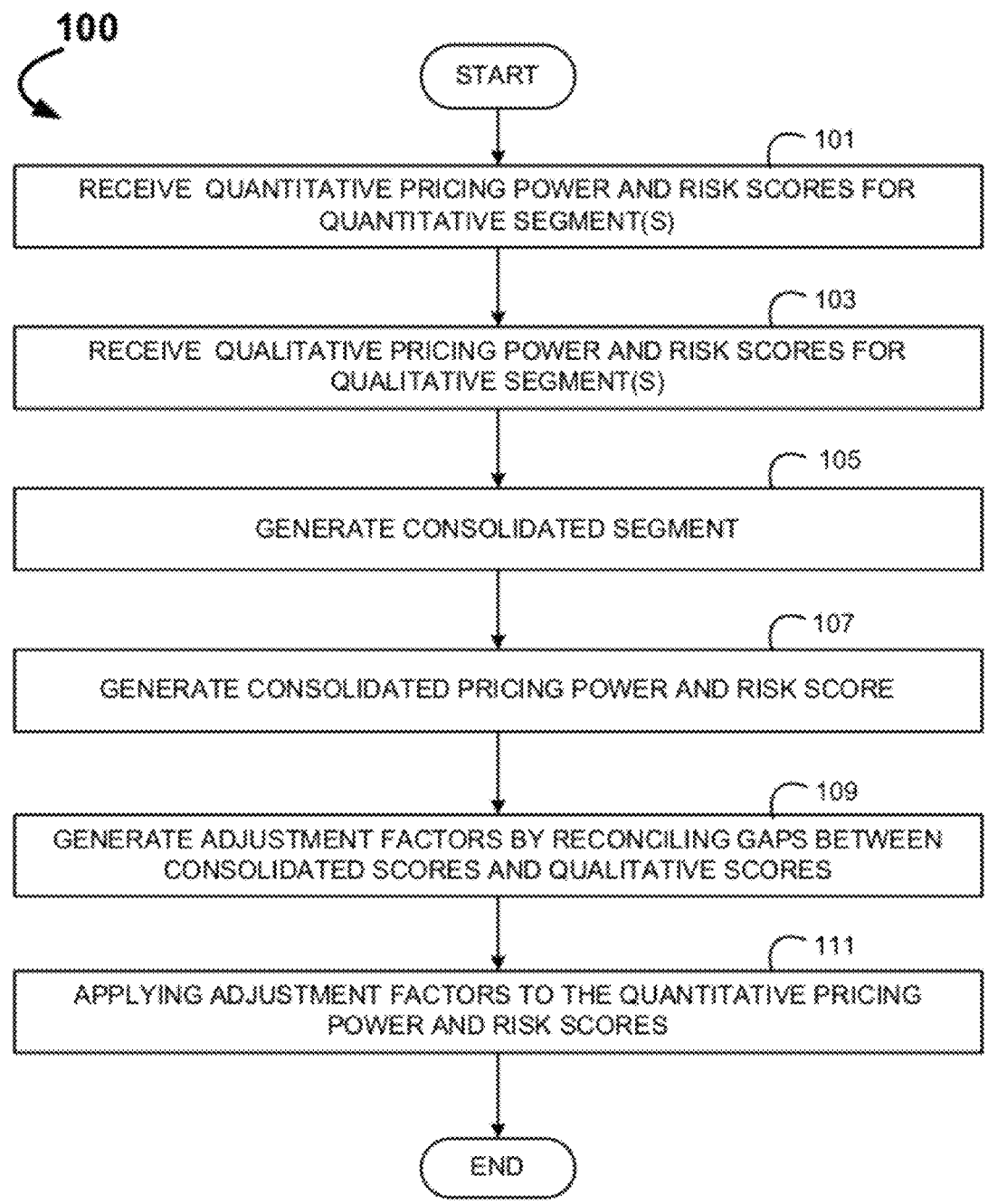
FIG. 1 is a high level flowchart illustrating calibrating Pricing Power and Risk scores in accordance with an embodiment of the present invention.

To facilitate discussion, FIG. 1 is a high level flowchart illustrating calibrating Pricing Power and Risk scores, shown generally at 100. Quantitative pricing power and risk scores are received at step 101. Quantitative pricing power and risk scores are generated using quantifiable power and risk factors for quantitative segments. At step 103, qualitative power and risk scores are received. The qualitative scores are received for qualitative segments which are defined by a user. The user also determines the qualitative power and risk scores. A consolidated segment is generated at step 105 by aggregating some of the quantitative segments. Each consolidated segment is analogous to a qualitative segment. Then, at step 107, a consolidated power score and a consolidated risk score may be generated for each consolidated segment by aggregating the quantitative power score and the quantitative risk score for each of the quantitative segments used to generate each of the consolidated segments. The gaps between the qualitative power scores and the consolidated power scores may be reconciled at step 109. Likewise, the gap between the qualitative risk scores and the consolidated risk scores may be reconciled. Adjustment factors may be generated from this reconciliation. Lastly, at step 111, the adjustment factors may be applied to the quantitative power scores and the quantitative risk scores to generate calibrated power and risk scores for each of the quantitative segments.

I. Business to Business Environment

Figure 2A:
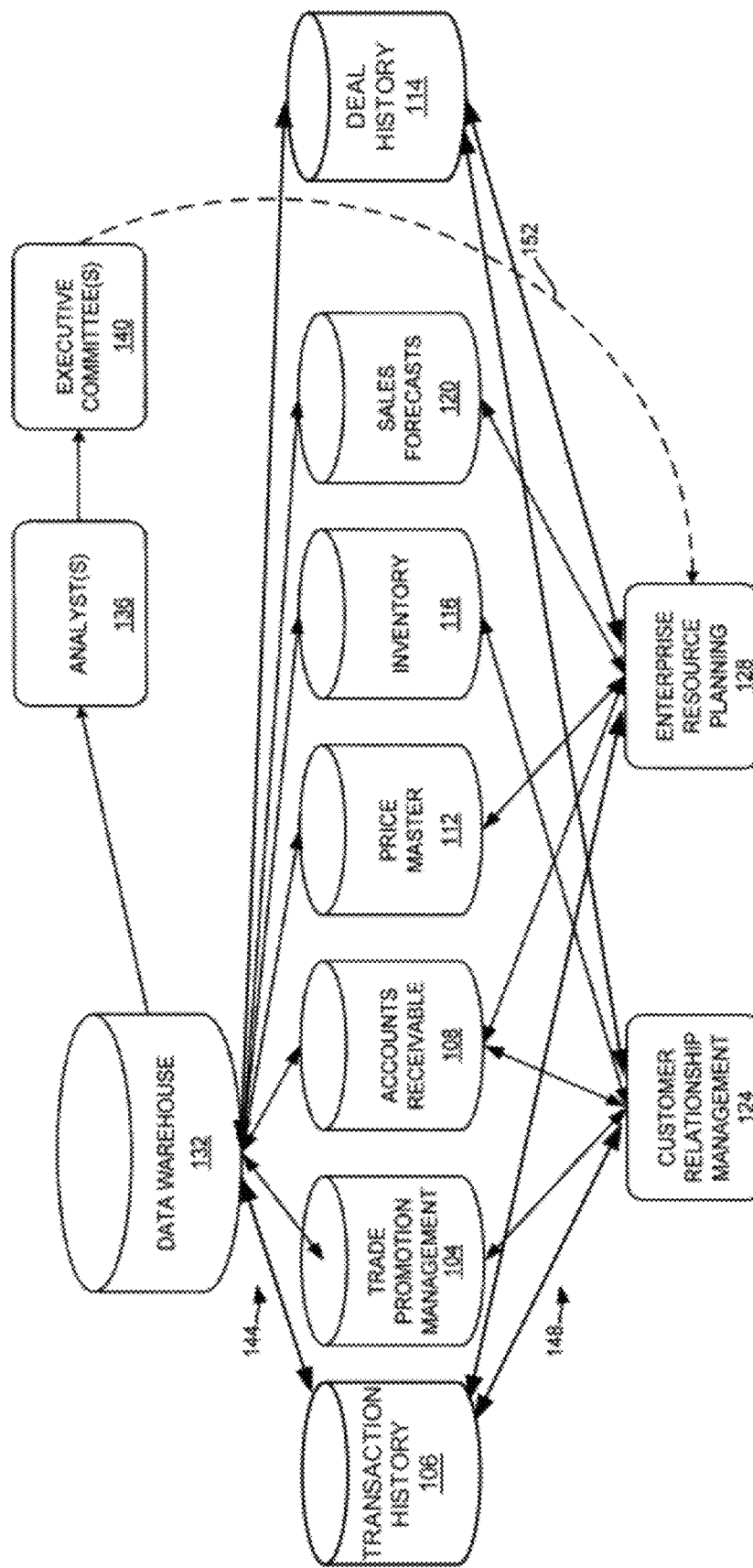
FIG. 2A is a simple graphical representation of an enterprise level pricing environment in accordance with an embodiment of the present invention.

To facilitate discussion, FIG. 2A is a simplified graphical representation of an enterprise pricing environment. Several example databases (104-120) are illustrated to represent the various sources of working data. These might include, for example, Trade Promotion Management (TPM) 104, Accounts Receivable (AR) 108, Transaction History 106, Price Master (PM) 112, Deal History 114, Inventory 116, and Sales Forecasts 120. The data in those repositories may be utilized on an ad hoc basis by Customer Relationship Management (CRM) 124, and Enterprise Resource Planning (ERP) 128 entities to produce and post sales transactions. The various connections 148 established between the repositories and the entities may supply information such as price lists as well as gather information such as invoices, rebates, freight, and cost information.

The wealth of information contained in the various databases (104-120) however, is not "readable" by executive management teams due in part to accessibility and, in part, to volume. That is, even though data in the various repositories may be related through a Relational Database Management System (RDMS), the task of gathering data from disparate sources can be complex or impossible depending on the organization and integration of legacy systems upon which these systems may be created. In one instance, all of the various sources may be linked to a Data Warehouse 132 by various connections 144. Typically, data from the various sources may be aggregated to reduce it to a manageable or human comprehensible size. Thus, price lists may contain average prices over some selected temporal interval. In this manner, data may be reduced. However, with data reduction, individual transactions may be lost. Thus, CRM 124 and ERP 128 connections to an aggregated data source may not be viable.

Analysts 136, on the other hand, may benefit from aggregated data from a data warehouse. Thus, an analyst 136 may compare average pricing across several regions within a desired temporal interval to develop, for example, future trends in pricing across many product lines. An analyst 136 may then generate a report for an executive committee 140 containing the findings. An executive committee 140 may then, in turn, develop policies that drive pricing guidance and product configuration suggestions based on the analysis returned from an analyst 136. Those policies may then be returned to CRM 124 and ERP 128 entities to guide pricing activities via some communication channel 152 as determined by a particular enterprise.

As can be appreciated, a number of complexities may adversely affect this type of management process. First, temporal setbacks exist at every step of the process. For example, a CRM 124 may make a sale. That sale may be entered into a sales database 120, INV database 116, Deal History Database 114, Transaction History Database 106, and an AR database 108. The entry of that data may be automatic where sales occur at a network computer terminal, or may be entered in a weekly batch process thus introducing a temporal setback. Another example of a temporal setback is time-lag introduced by batch processing data stored to a data warehouse resulting in weeks-old data that may not be timely for real-time decision support. Still other temporal setbacks may occur at any or all of the transactions illustrated in FIG. 2A that may ultimately render results untimely at best, and irrelevant at worst. Thus, the relevance of an analyst's 136 original forecasts may expire by the time the forecasts reach the intended users. Still further, the usefulness of any pricing guidance and product configuration suggestions developed by an executive committee 140 may also have long since expired leaving a company exposed to lost margins.

Figure 2B:
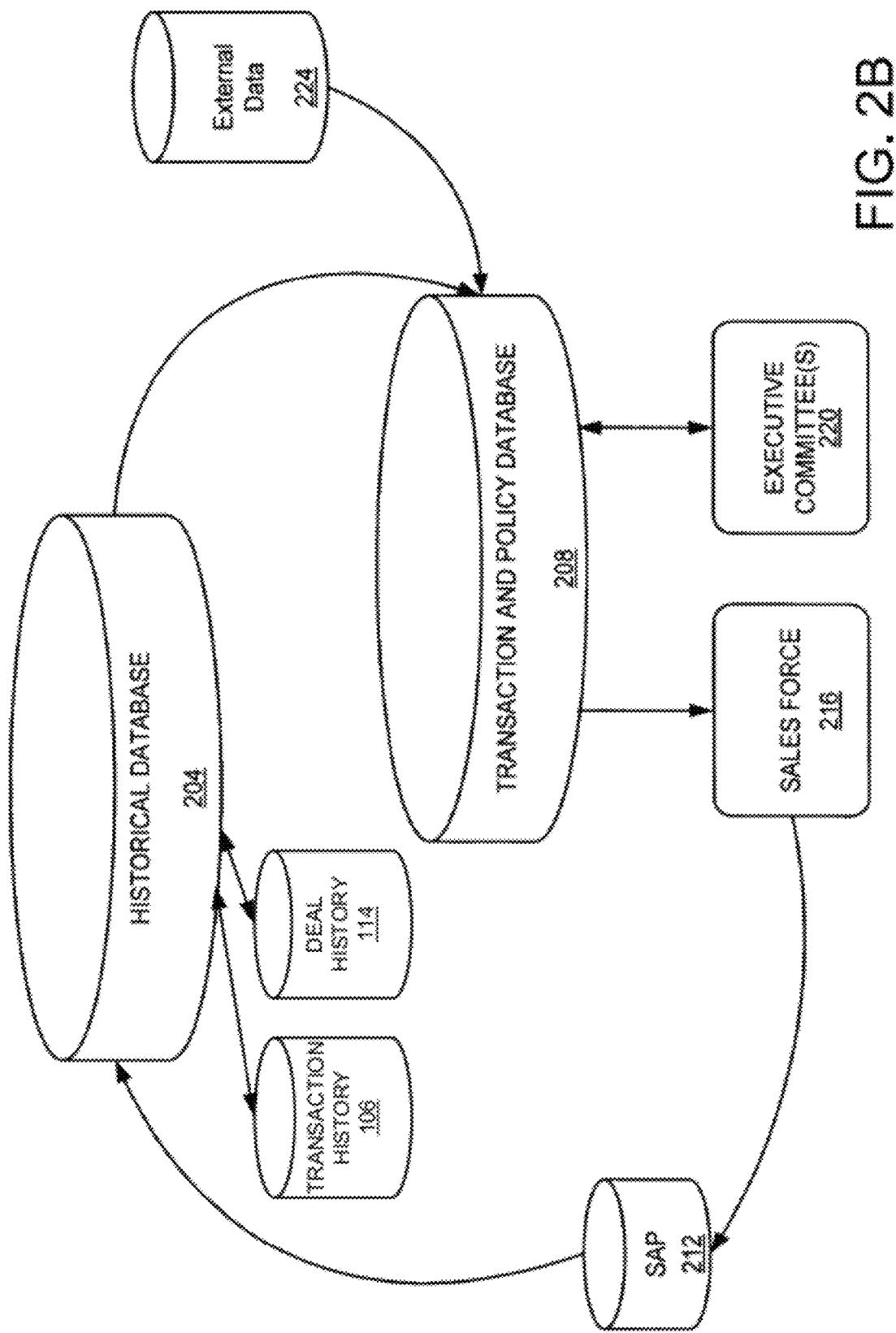
FIG. 2B is a simplified graphical representation of a price modeling environment where an embodiment of the present invention may be utilized.

As pertains to the present invention, FIG. 2B is a simplified graphical representation of a price modeling environment where an embodiment of the present invention may be utilized. A historical database 204, under the present invention may contain any of a number of records. In one embodiment of the present invention, a historical database may include sales transactions from the Deal History Database 114 the Transaction History Database 106. In other embodiments of the present invention, a historical database may include waterfall records.

An analysis of a historical data may then be used to generate a transaction and policy database 208. For example, analysis of a selected group of transactions residing in a historical database may generate a policy that requires or suggests a rebate for any sale in a given region. In this example, some kind of logical conclusion or best guess forecast may determine that a rebate in a given region tends to stimulate more and better sales. A generated policy may thus be guided by historical sales transactions over a desired metric—in this case, sales by region. A policy may then be used to generate logic that will then generate a transaction item.

In this manner, a price list of one or many items reflecting a calculated rebate may be automatically conformed to a given policy and stored for use by a sales force, for example. In this example, a rebate may be considered as providing guidance to a sales force. Furthermore, historical data may be used to generate configuration suggestions.

In some embodiments, policies are derived strictly from historical data. In other embodiments, policies may be generated ad hoc in order to test effects on pricing based hypothetical scenarios. In still other examples, executive committee(s) 220, who implements policies, may manually enter any number of policies relevant to a going concern. For example, an executive committee(s) 220 may incorporate forecast data from external sources 224 or from historical data stored in a historical database in one embodiment. Forecast data may comprise, in some examples, forward looking price estimations for a product or product set, which may be stored in a transaction and policy database. Forecast data may be used to generate sales policies such as guidance and suggestion as noted above. Still further, forecast data may be utilized by management teams to analyze a given deal to determine whether a margin corresponding to a deal may be preserved over a given period of time. In this manner, an objective measure for deal approval may be implemented. Thus forecast data, in some examples, may be used either to generate sales policy, to guide deal analysis, or both. Thus, in this manner, policies may be both generated and incorporated into the system.

After transactions are generated based on policies, a transactional portion of the database may be used to generate sales quotes by a sales force 216 in SAP 212, for example. SAP 212 may then generate a sales invoice which may then, in turn, be used to further populate a historical database 204 including the Deal History Database 114 and Transaction History Database 106. In some embodiments, sales invoices may be constrained to sales quotes generated by a transaction and policy database. That is, as an example, a sales quote formulated by a sales force 216 may require one or several levels of approval based on variance (or some other criteria) from policies (e.g. guidance and suggestion) stored in a transaction and policy database 208. In other embodiments, sales invoices are not constrained to sales quotes generated by a transaction and policy database.

II. Systems for Generating Quantitative Pricing Power and Risk Scores

A. System Overview

Figure 2C:
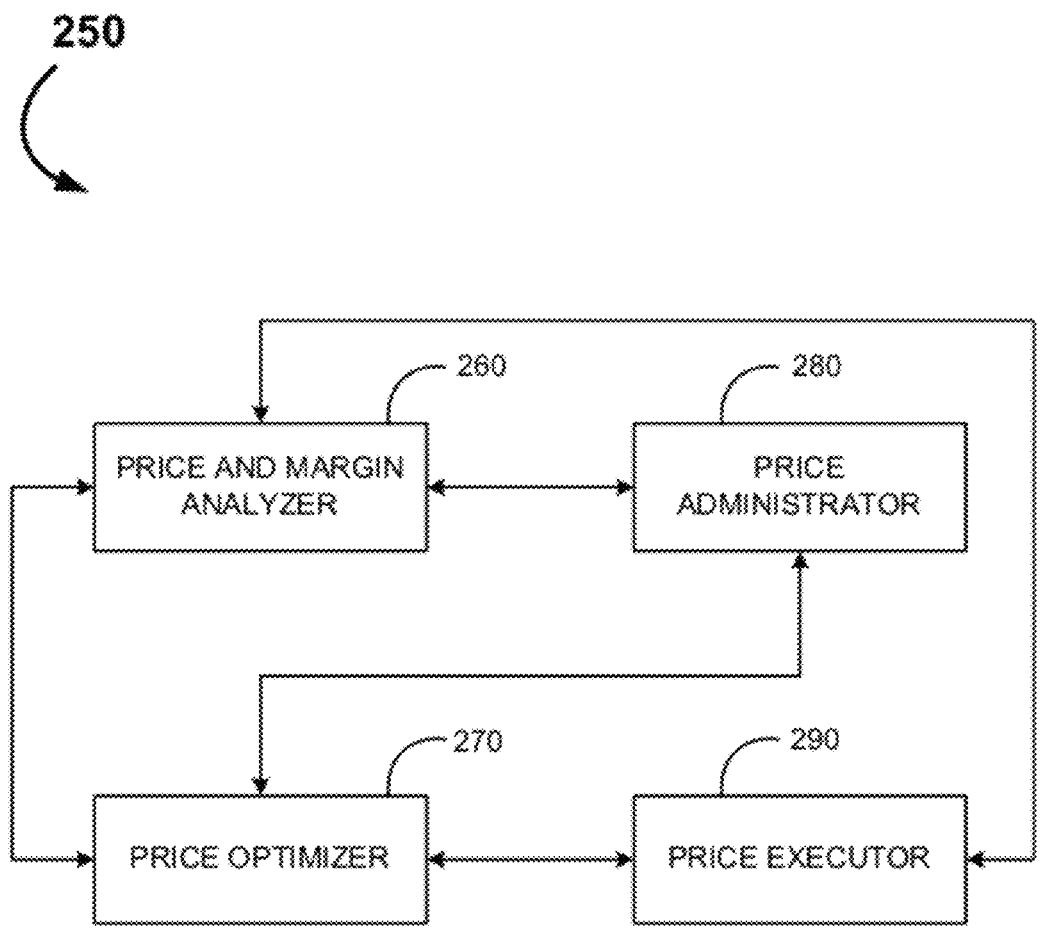
FIG. 2C is an exemplary integrated price management system for generating optimized price changes and generating business guidance in accordance with an embodiment of the present invention.

To further facilitate discussion, FIG. 2C is an exemplary Integrated Price Management System 250 for generating optimized price changes and generating business guidance in accordance with an embodiment of the present invention. The Integrated Price Management System 250 may include a Price and Margin Analyzer 260, a Price Optimizer 270, a Price Administrator 280, and a Price Executor 290. The Price and Margin Analyzer 260 may couple to each of the Price Optimizer 270, the Price Administrator 280 and Price Executor 290. Likewise, the Price Optimizer 270 may couple to each of the Price and Margin Analyzer 260, Price Administrator 280 and Price Executor 290. However, in some embodiments, the Price Administrator 280 and Price Executor 290 may couple to the Price and Margin Analyzer 260 and the Price Optimizer 270 only.

The Price and Margin Analyzer 260 may provide detailed understanding of the business context. This understanding may include analyzing pricing results and processes. Segment hypothesizes may likewise be generated by the Price and Margin Analyzer 260. This segment hypothesis may then be tested and refined.

The Price Optimizer 270 is the focus of the present disclosure. The Price Optimizer 270 may utilize segment hypotheses, product data and client input in order to generate quotations for deal negotiation. The present embodiment of the Price Optimizer 270 may utilize Pricing Power for given products or business segments (Power) and Pricing Risk for given products or business segments (Risk) in order to generate pricing guidance. Generated guidance from the Price Optimizer 270 may be output to the Price Administrator 280 and the Price Executor 290.

The Price Administrator 280 may utilize the generated guidance to generate approvals and facilitate deal evaluations. Pricing management may likewise be performed by the Price Administrator 280.

The Price Executor 290 may include the actual implementation of the generated and approved pricing.

B. Price Optimizer

Figure 3:
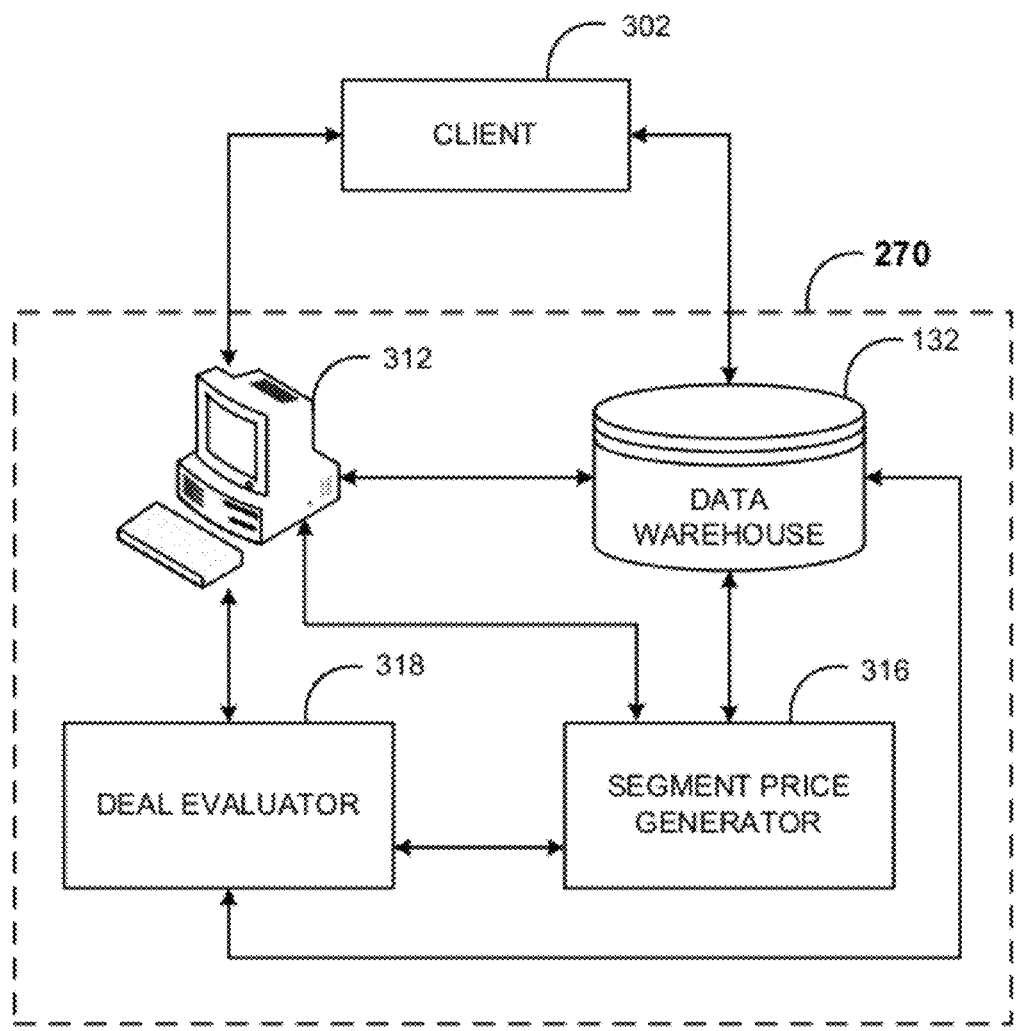
FIG. 3 is an exemplary price optimizer for use with the integrated price management system in accordance with an embodiment of the present invention.

FIG. 3 is an exemplary Price Optimizer 270 for use with the Integrated Price Management System 250 in accordance with an embodiment of the present invention. As can be seen, the Price Optimizer 270 may include an Interface 312, a Deal Evaluator 318, and a Segment Price Generator 316. Additionally, the Data Warehouse 132 may be included in the Price Optimizer 270 in some embodiments. In some alternate embodiments, the Price Optimizer 270 may access an external Data Warehouse 132.

The Data Warehouse 132 may be populated with data from the Client 302. This data may include product data, customer data, transaction data, inventory data, cost data, segment data, transaction and deal data, and other data pertinent to pricing. Segment Data may additionally include product types, attributes, channel, transaction and market data.

The Client 302 may, additionally, be enabled to access the Interface 312. The Interface 312 may provide the Client 302 connectivity to the Deal Evaluator 318 and the Segment Price Generator 316. Additionally, generated pricing data and analytics may be provided to the Client 302 via the Interface 312. In some embodiments, the Interface 312 may provide the means for the Client 302 to add data to the Data Warehouse 132.

The Segment Price Generator 316 may couple to the Interface 312 and Data Warehouse 132 and may generate product segments and optimized pricing. The Segment Price Generator 316 may utilize input from the Client 302 via the Interface 312, along with data form the Data Warehouse 132 in the generation of the segment and pricing data. Pricing data may include price approval levels, target prices and price change allocation suggestions. All pricing data may be by line item, or may be by a larger product aggregate, such as by segment, brand, or other grouping.

The Segment Price Generator 316 may output the segment and pricing data to the Deal Evaluator 318 for evaluation of received deal proposals. These deal evaluations may be of use in facilitating profitable deals, and may be used to guide business decisions by the Client 302. Analysis from the evaluations may be provided to the Client 302 via the Interface 312. Evaluation data may be used by the Price Administrator 280 and Price Executor 290 for downstream applications.

Note that, in some embodiments, the Segment Price Generator 316 may be a stand alone system capable of generating pricing data and segment data independently from the Integrated Price Management System 250 or the Price Optimizer 270 as a whole. Is such embodiments, the output from the Segment Price Generator 316 may then be utilized by managers directly, or may be input into another price managing system. It is thus intended that each component of the Integrated Price Management System 250 be relatively autonomous and capable of substitution, deletion, or modification as to generate a desired performance of the Integrated Price Management System 250.

C. Product Segment Price Generator

Figure 4:
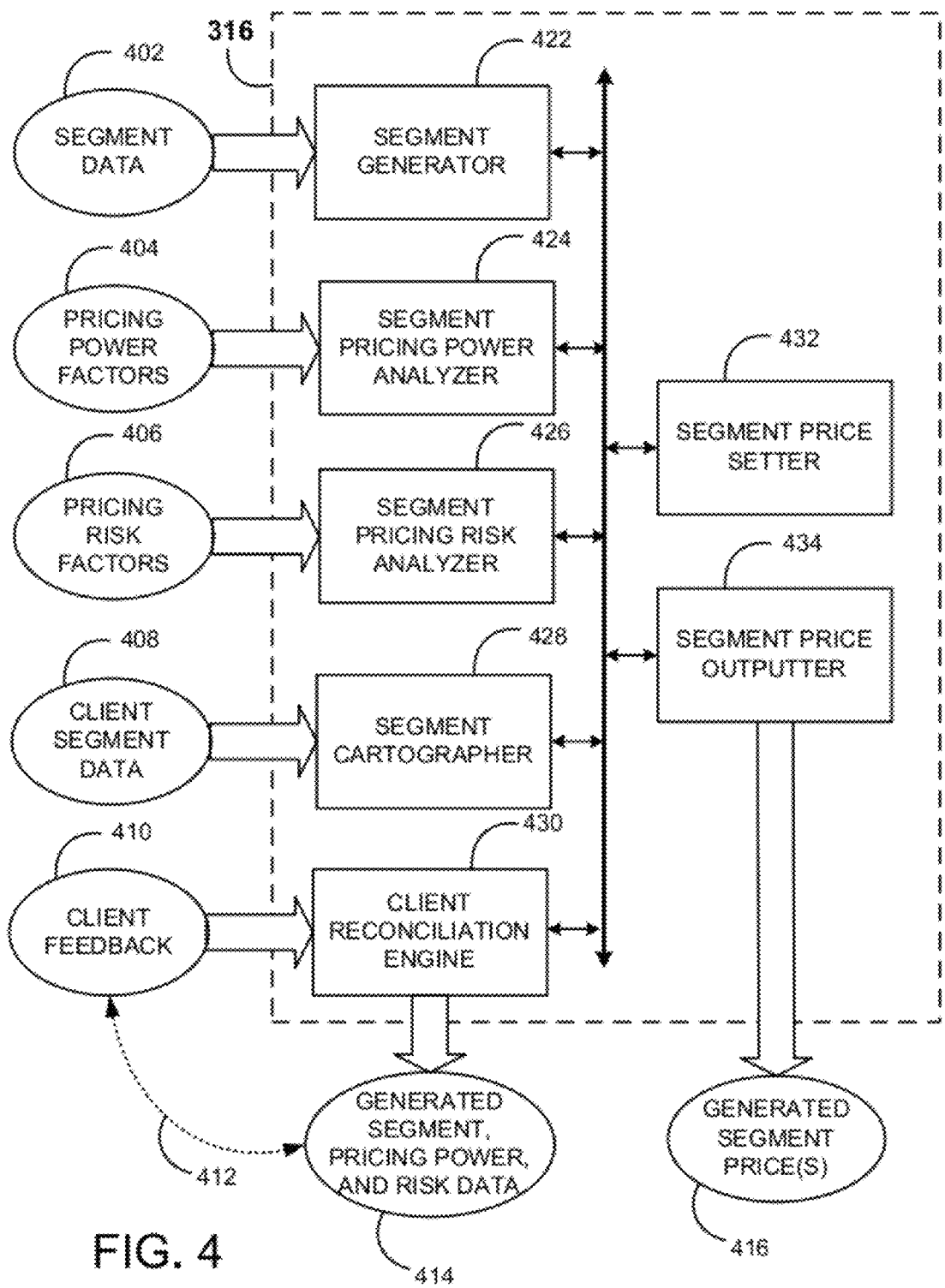
FIG. 4 is an exemplary product segment price generator for use with the price optimizer of the integrated price management system in accordance with an embodiment of the present invention.

FIG. 4 is an exemplary illustration of the Segment Price Generator 316 for use with the Price Optimizer 270 of the Integrated Price Management System 250. The Segment Price Generator 316 may include any of the following components: a Segment Generator 422, a Segment Power Analyzer 424, a Segment Pricing Risk Analyzer 426, a Segment Cartographer 428, a Client Reconciliation Engine 430, a Segment Price Setter 432 and a Segment Price Outputter 434. Each component of the Segment Price Generator 316 may be coupled to one another by use of a bus. Likewise, a network or computer architecture may provide the coupling of each component of the Segment Price Generator 316. Of course additional, or fewer components may be included within the Segment Price Generator 316 as is desired for operation capability or efficiency.

The Segment Generator 422 may receive Segment Data 402 from the Client 302 or from data stored in the Data Warehouse 132. The Segment Generator 422 may generate one or more segments from the segment data. As previously mentioned, segment data may include product ID, product attributes, sales channel data, customer data, transaction data and market data. In some embodiments, additional customer and channel data may be provided to the Segment Generator 422 as is needed (not illustrated).

The Segment Generator 422 may use the inputted data to generate segments. Segments may also be referred to as business segments. Typically segments may be generated at the transaction level by considering different attributes, such as product similarities, sales channel similarities, customer similarities, transaction similarities and market similarities. In some embodiments, segmentation may rely upon presets, and products and sales channels may be fit to a segment preset. Additionally, attributes of the product may be used to switch products to different segments. Client override of segments is also considered.

In some embodiments, attributes for segmentation can be static (non-changing) or dynamic (changing over time). Examples of static business segments include: Product segments: Product Family, Product Group, Product Type (e.g. Commodity, Specialty, Competitive), Product Use (e.g. Core Products, Add-on Products, Maintenance Products); Customer segments: Customer Geography, Customer Region, Customer Industry, Customer Size, Customer Relationship (e.g. Primary provider, Spot Purchase, Competitive).

Examples of dynamic business segments include: Product segments: Product Lifecycle (New, Growing, Mature, End-of-life), Product Yearly Revenue Contribution (A=Top 30% of total revenue, B=Next 30%, C=Bottom 40%), Product Yearly Profit Contribution, Customer segments: Customer Yearly Revenue Contribution, Customer Yearly Profit Contribution, Customer Product Purchase Compliance (customers who order less than certain percent of quoted products), Order Compliance (customers who order less than committed volumes from quote or contract), Payment Compliance (customers who pay their invoices outside of pre-agreed payment terms defined in quote or contract).

Generally, the purpose of segmentation is to group transactions in a way where all transactions in the segment react to changes in pricing and events (such as promotions and demand shifts) in a similar fashion. Regardless of method of segment selection, this purpose, that all transactions in the segment react in a similar manner, is maintained.

The Segment Power Analyzer 424 receives the segment data from the Segment Generator 422 and, with additional Power Factors 404 that are gathered from the Client 302 or the Interface 312, may generate an initial quantitative pricing power score for each segment. Pricing power factors may also include presets stored within the Segment Power Analyzer 424. Examples of pricing power factors include, but are not limited to, price variance, approval escalations, win ratios, and elasticity. Pricing power, also known as the segment's power value, or simply 'power', is an indicator of the ability for the Client 302 to realize a price increase. Thus, segments with a large pricing power score will typically be able to have their price increased without shifting business away from the segment.

The Segment Power Analyzer 424 may generate the quantitative pricing power scores for each segment by assigning values to each pricing power factor, weighting the factors and taking a weighted average of the factors. It should be noted that the pricing power factor arrived at using such a method is considered 'quantitative', since this is a mathematically derived scientific value. In contrast, a 'qualitative' pricing power score may be defined by a knowledgeable individual within the Client 302. Qualitative pricing power scores include the manager's (or other knowledgeable individual) "gut feel" and business expertise to determine a relative pricing power scoring from segment to segment. Typically, the qualitative pricing power score may be given for client defined segments which are often larger and more coarsely segmented than the generated segments. Later it will be seen that the quantitative pricing power score and qualitative pricing power score may be reconciled to generate a calibrated pricing power score for each segment.

In a similar manner, the Segment Pricing Risk Analyzer 426 receives the segment data from the Segment Generator 422 and, with additional Pricing Risk Factors 406 that are gathered from the Client 302 or the Interface 312, may generate an initial quantitative pricing risk scores for each segment. Pricing Risk factors may also include presets stored within the Segment Pricing Risk Analyzer 426. Examples of pricing risk factors include, but are not limited to, total sales, sales trends, margin, and percent of total spend. Pricing risk, also known as the segment's risk value, is an indicator of what is at stake for the Client 302 if a price increase is not realized (loss of some or all segment business). Thus, segments with a large pricing risk score may often be key sales (either by volume, profit, or by customer) to the Client 302.

The Segment Pricing Risk Analyzer 426 may generate the quantitative pricing risk scores for each segment by assigning values to each pricing risk factor, weighting the factors and taking a weighted average of the factors. Again, the pricing risk factor arrived at using such a method is considered 'quantitative', since this is a mathematically derived scientific value. In contrast, a 'qualitative' pricing risk score may be defined by a knowledgeable individual within the Client 302. Qualitative pricing risk scores, as with pricing power scores, include the manager's (or other knowledgeable individual) "gut feel" and business expertise to determine a relative pricing risk scoring from segment to segment. Typically, the qualitative pricing risk score may be given for the same client defined segments as used for qualitative pricing power score. These client segments are often larger and more coarsely segmented than the generated segments. As with pricing power, it will be seen that the quantitative pricing risk score and qualitative pricing risk score may be reconciled to generate a calibrated pricing risk score for each segment.

A Segment Elasticity Determiner (not illustrated) may, in some embodiments, be an optional component. The Segment Elasticity Determiner may rely upon transaction data for the generation of elasticity variables. In some embodiments, the Segment Elasticity Determiner may be enabled to only generate elasticity variables for segments where there is sufficiently rich transaction history to generate optimized pricing through traditional means. This may be beneficial since, given a rich transaction history, traditional demand modeling may be performed in a very accurate manner. Thus, where the history supports it, demand models and optimized prices may be generated. These prices may then be implemented directly, or may be included into the set pricing utilizing price power and risk scores. Of course, in some alternate embodiments, the Segment Elasticity Determiner may be omitted due to the relative scarcity of transaction data.

The Segment Cartographer 428 may receive Client Segment Data 408 and segment data generated by the Segment Generator 422. The Segment Cartographer 428 may compare the Client Segment Data 408 and generated segment data to produce a segment map. The segment map may indicate which of the generated segments, when aggregated, are comparable to the client segments.

The Client Reconciliation Engine 430 may receive the quantitative pricing power score for each segment from the Segment Pricing Power Analyzer 424 and the quantitative pricing risk score for each segment from the Segment Pricing Risk Analyzer 426. Generated Segment, Pricing Power and Pricing Risk Data 414 may be output to the client. This data may be output as a plot, known as a 'pricing power and risk plot', for ease of user consumption.

The Client Reconciliation Engine 430 may also receive qualitative pricing power and risk scores for client defined segments as part of Client Feedback 410. The Client 302 may review the outputted Data 414 at 412 when determining the Client Feedback 410. Differences between the received qualitative pricing power and risk scores and the generated quantitative pricing power and risk scores may then be reconciled. Reconciliation may include determining errors in the qualitative score, identification of unknown factors, modifying segment groupings and applying a calibration to the quantitative pricing power and risk scores such that they adhere to the qualitative pricing power and risk scores. Much of the application will be discussing the particulars of this reconciliation below.

In addition to qualitative pricing power and risk scores, the Client Feedback 410 may also include client segment data, criticisms of pricing power and risk factor values and/or weights, unknown factors, and additional information.

The Segment Price Setter 432 may receive the calibrated pricing power and risk scores from the Client Reconciliation Engine 430 and use them, in conjunction with various business goals, to generate prices for each segment. This may often be performed by receiving the pricing power and risk scores and plotting them. Tradeoff price change contours or a price change grid (matrix) may be applied to the plot to achieve an overall business goal. For example, the goal may be to raise prices a total of 5% while minimizing pricing risk. By applying the pricing risk and pricing power plot to this goal, a price change value may be generated for each segment where segments with high pricing risk receive little, or even a negative price change. Low pricing risk segments, on the other hand, will have a larger price increase in this example. An example of a tradeoff contour includes isometric curves. Particularly, in some embodiments, hyperbolic curve functions are considered.

The Segment Price Outputter 434 may receive the prices and business guidance generated by the Segment Price Setter 432 and may output this information as Generated Segment Price(s) 416. The Generated Segment Price(s) 416 may be utilized directly by the management and sales teams of the Client 302, or may be used for further downstream operations. For example, the Generated Segment Price(s) 416 may, in some embodiments, be provided to the Deal Evaluator 318 for evaluation of deal terms, or to the Price Executor 290 for execution.

Figure 5:
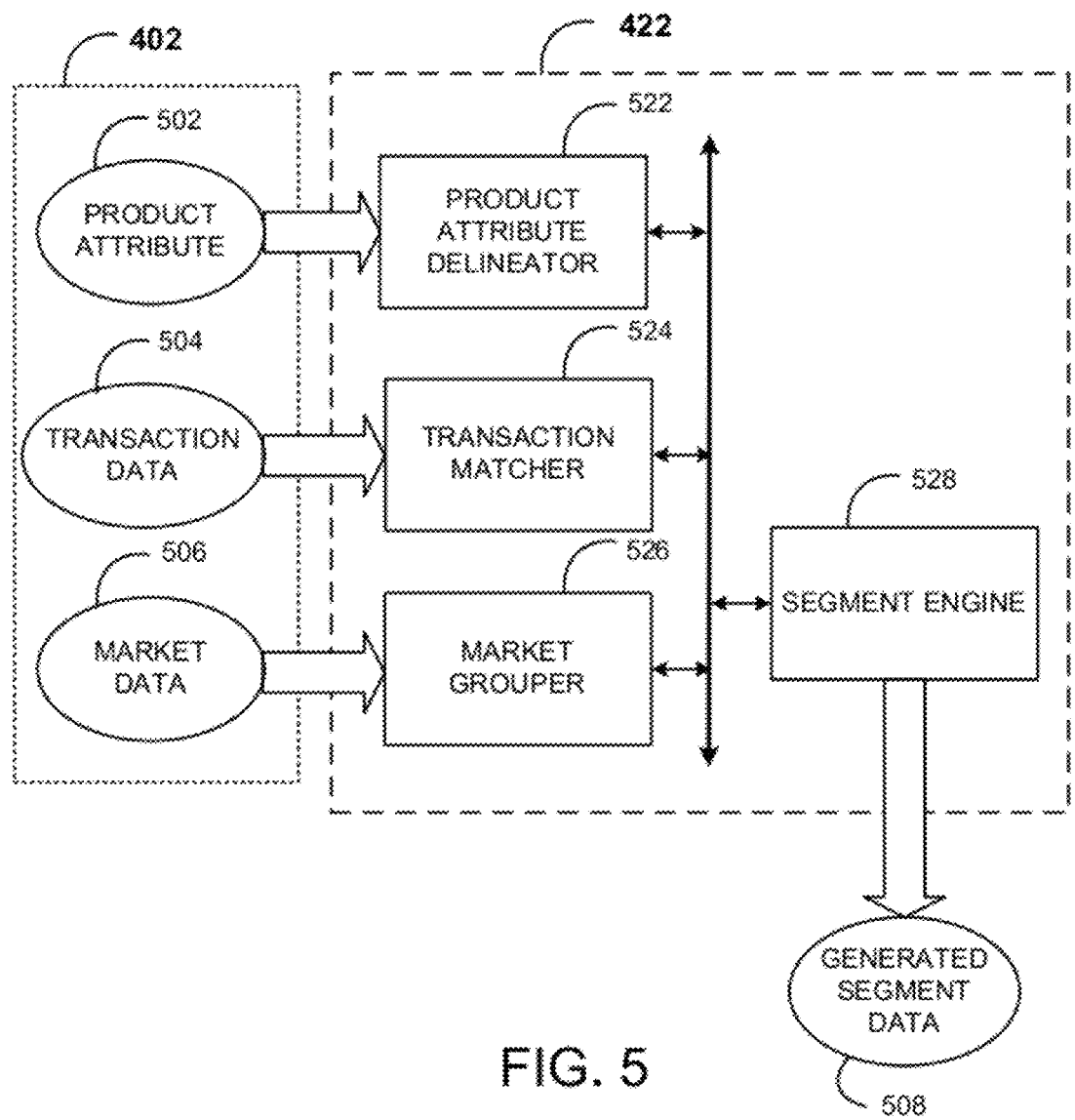
FIG. 5 is an exemplary Segment Generator for use with the product segment price generator of the price optimizer in the integrated price management system in accordance with an embodiment of the present invention.

FIG. 5 is an exemplary illustration of the Segment Generator 422 for use with the Segment Price Generator 316 of the Price Optimizer 270 in the Integrated Price Management System 250. Here the Segment Generator 422 may be seen as including a Product Attribute Delineator 522, a Transaction Matcher 524, a Market Grouper 526 and a Segment Engine 528. A central bus may couple each component to one another. Additionally, any network system, or computer hardware or software architecture may be used to couple the components of the Segment Generator 422 to one another.

Also visible is the Segment Data 402, which is shown to include Product Attributes 502 data, Transaction Data 504, and Market Data 506. Although not illustrated, the Segment Data 402 may also include client data such as channels, region, customer demographic, etc. Segment analysis of products, transactions and customers may be performed at a 'transaction level'. That is, a single transaction's details may be analyzed to find similarities across product, customer and transaction attributes. The intent is to create a common base of comparison across seemingly unrelated records and extract insights on what is really driving better price and margin realization.

The Product Attributes 502 data may be received by the Product Attribute Delineator 522. The Product Attribute Delineator 522 may then aggregate products into segments by similarities in product attributes. Such similarities may include functional similarities, such as hardware components, by brand, by price, by quality, or by any other relevant product attribute.

The Transaction Data 504 may be received by the Transaction Matcher 524 which may then fit the products of the client according to similarities in the Transaction Data 504.

The Market Data 506 data may be received by the Market Grouper 626. The Market Grouper 626 may the define segments according to market similarities.

Products that do not fit within any particular product category may be assigned an arbitrary segment, or may be defined as their own segment. Alternatively, product attributes may be used to determine segments for these products. Of course, additional segmentation methods may be applied, such as segments by common consumer demographic, segments by price ranges, segments by sales channels, segments by related use, season, or quality, and segment by client feedback, just to name a few.

Each of the operations performed by the Product Attribute Delineator 522, Transaction Matcher 524 and the Market Grouper 526 may be performed in series or in parallel. In some embodiments, only some of the methods for segmentation may be utilized, and disagreements between segments may be resolved in any of a myriad of ways by the Segment Engine 528 which creates the Generated Segment Data 508. For example, in some embodiments, the client's Transaction Data 504 may form the basis of the segments in the Transaction Matcher 524. Segments may be generated comprised of most of the client's products, but some products were unable to be fit into any of the Transaction Data 504. These products may then undergo product attribute analysis by the Product Attribute Delineator 522. The analysis may determine which segment these unusual products fit within, and the segments may be updated to reflect the additional products. Then the Market Grouper 526 may perform a segment check to determine that the segments adhere to particular market delineations. Client feedback may also be considered, such as having a single segment for all highly acidic chemicals. If such an incompatibility is identified then, in the present example, the segments may again be modified to adhere to the client requirements. Of course other segment inconsistencies and generation techniques are contemplated by the present invention. The above example is intended to clarify one possible method for segment generation as is not intended to limit the segment generation for the present invention.

Generation of segments may include a subjective hypothesis generation and testing or may involve the use of a computerized segment optimization routine.

Figure 6:
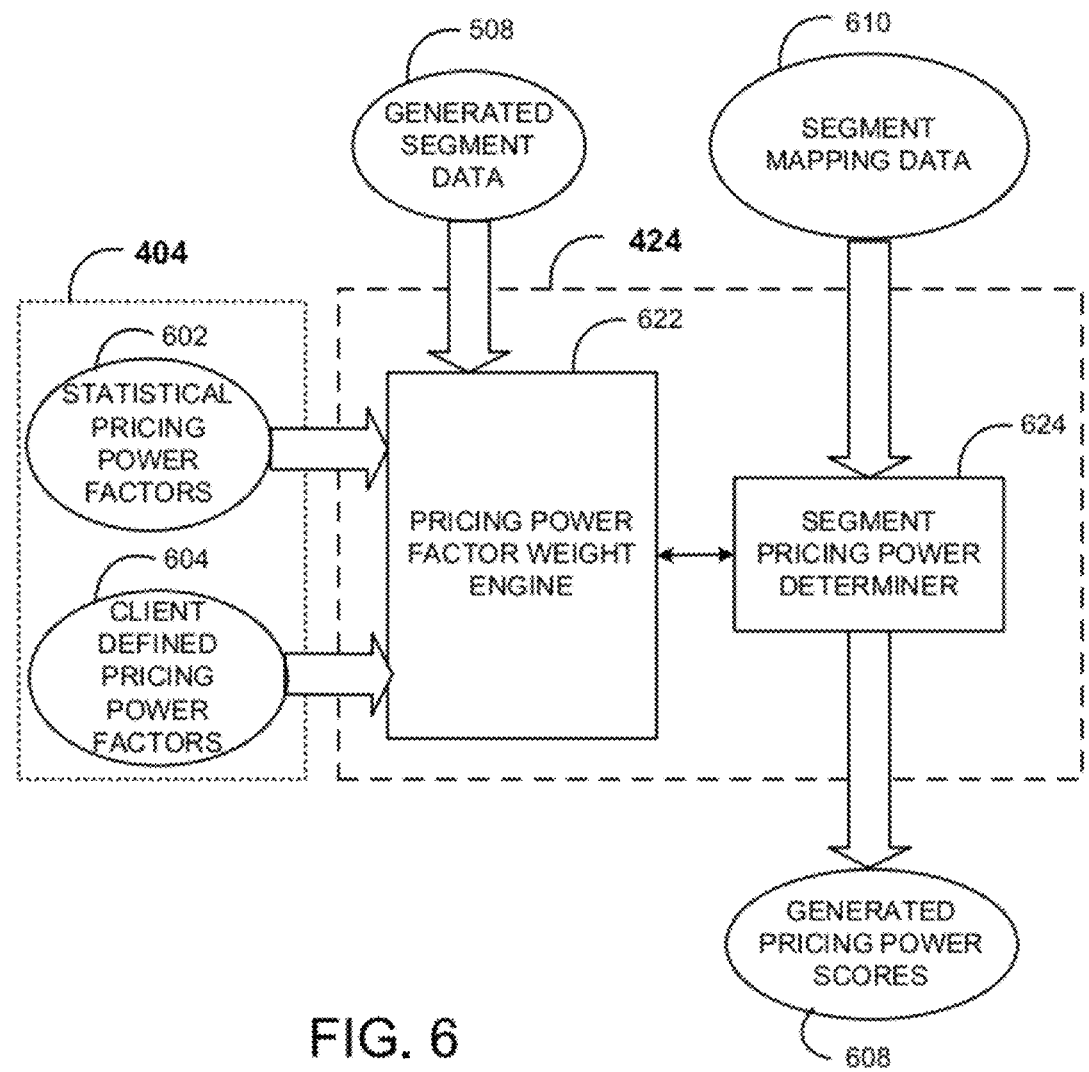
FIG. 6 is an exemplary segment pricing power analyzer for use with the product segment price generator of the price optimizer in the integrated price management system in accordance with an embodiment of the present invention.

FIG. 6 is an exemplary illustration of the Segment Pricing Power Analyzer 424 for use with the Segment Price Generator 316 of the Price Optimizer 270 in the Integrated Price Management System 250. The Segment Pricing Power Analyzer 424 may include a Pricing Power Factor Weight Engine 622 coupled to a Segment Pricing Power Determiner 624. The Segment Pricing Power Determiner 624 receives Segment Mapping Data 610 from the Segment cartographer 428. This segment data may be also provided to the Pricing Power Factor Weight Engine 622 so that pricing power factors are generated for the proper segments.

The Pricing Power Factor Weight Engine 622 may receive the Generated Segment Data 508 and the Pricing Power Factors 404. The Pricing Power Factors 404 may include Statistical Pricing Power Factors 602 and Client Defined Pricing Power Factors 604. All of these factors are input into the Pricing Power Factor Weight Engine 622 where values for the factors are assigned. Factor value assignment may utilize user intervention, or may rely upon measurable matrices. For example, win ratios from previous deals found in Deal History Database 114 may be a measured pricing power factor.

Weights are then applied to the pricing power factors. In some embodiments, the weights may initially be set to an equal value, thus counting each power factor equally in the determination of the pricing power score. Alternatively, some default weighing preset may be applied. The default may be industry specific. Also, in some embodiments, the client may provide input for guidance of the weighing factors.

The weighted factors are then averaged within the Segment Pricing Power Determiner 624 to generate a weighted average pricing power score for each of the generated segments. The Generated Pricing Power Scores 608 may then be output for raw consumption or for client reconciliation.

Figure 7:
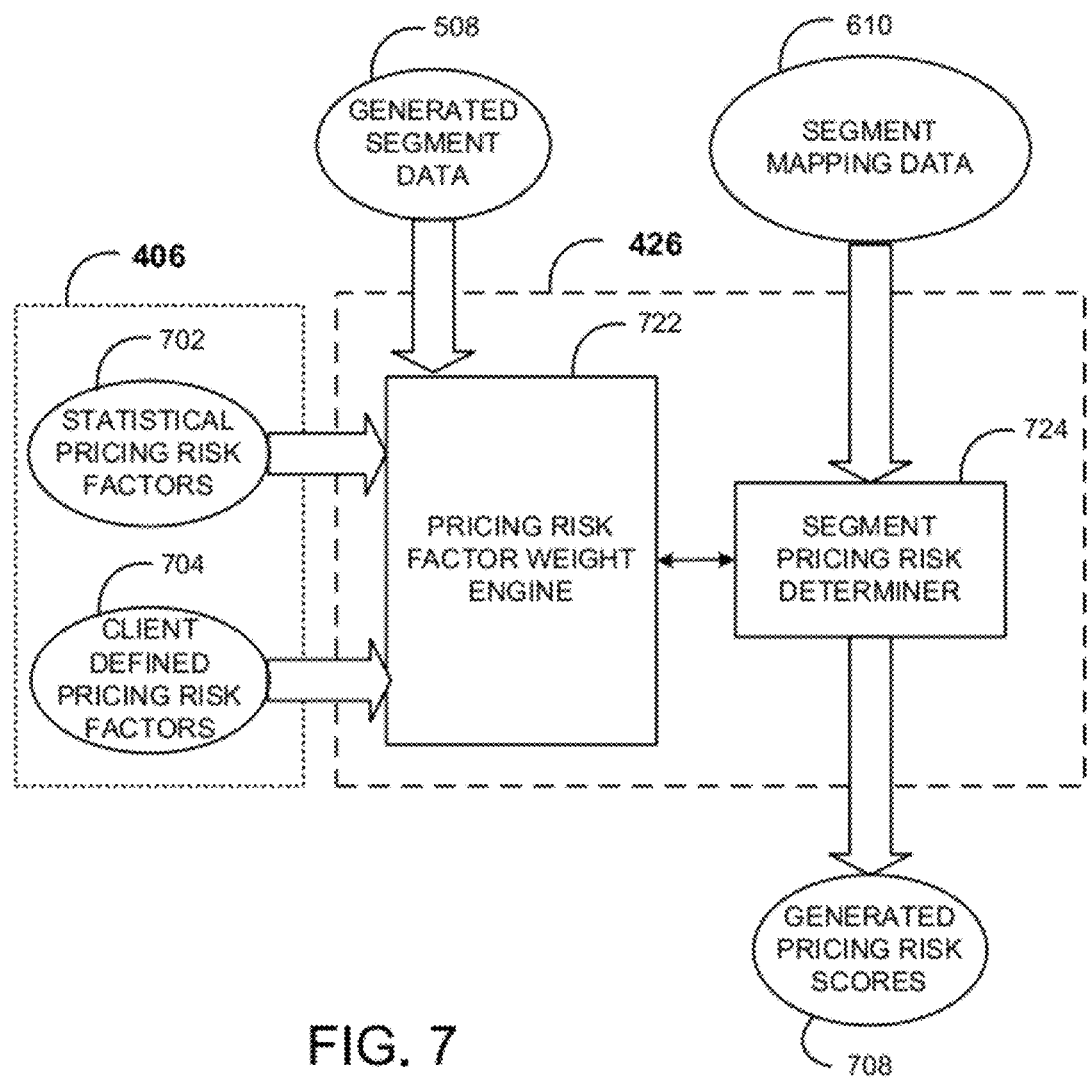
FIG. 7 is an exemplary segment pricing risk analyzer for use with the product segment price generator of the price optimizer in the integrated price management system in accordance with an embodiment of the present invention.

FIG. 7 is an exemplary illustration of the Segment Pricing Risk Analyzer 426 for use with the Segment Price Generator 316 of the Price Optimizer 270 in the Integrated Price Management System 250. Structurally, the Segment Pricing Risk Analyzer 426 is very similar to the Segment Pricing Power Analyzer 424 discussed above. The Segment Pricing Risk Analyzer 426 may include a Pricing Risk Factor Weight Engine 722 coupled to a Segment Pricing Risk Determiner 724. The Segment Pricing Risk Determiner 724 receives Segment Mapping Data 610 from the Segment Cartographer 428. This segment data may be also provided to the Pricing Risk Factor Weight Engine 722 so that pricing risk factors are generated for the proper segments.

The Pricing Risk Factor Weight Engine 722 may receive the Generated Segment Data 508 and the Pricing Risk Factors 406. The Pricing Risk Factors 406 may include Statistical Pricing Risk Factors 702 and Client Defined Pricing Risk Factors 704. All of these factors are input into the Pricing Risk Factor Weight Engine 722 where values for the factors are assigned. Factor value assignment may utilize user intervention, or may rely upon measurable matrices.

Weights are then applied to the pricing risk factors. In some embodiments, the weights may initially be set to an equal value, thus counting each risk factor equally in the determination of the pricing risk score. Alternatively, some default weighing preset may be applied. The default may be industry specific. Also, in some embodiments, the client may provide input for guidance of the weighing factors.

The weighted factors are then averaged within the Segment Pricing Risk Determiner 724 to generate a weighted average pricing risk score for each of the generated segments. The Generated Pricing Risk Score 708 may then be output for raw consumption or for client reconciliation.

Figure 8:
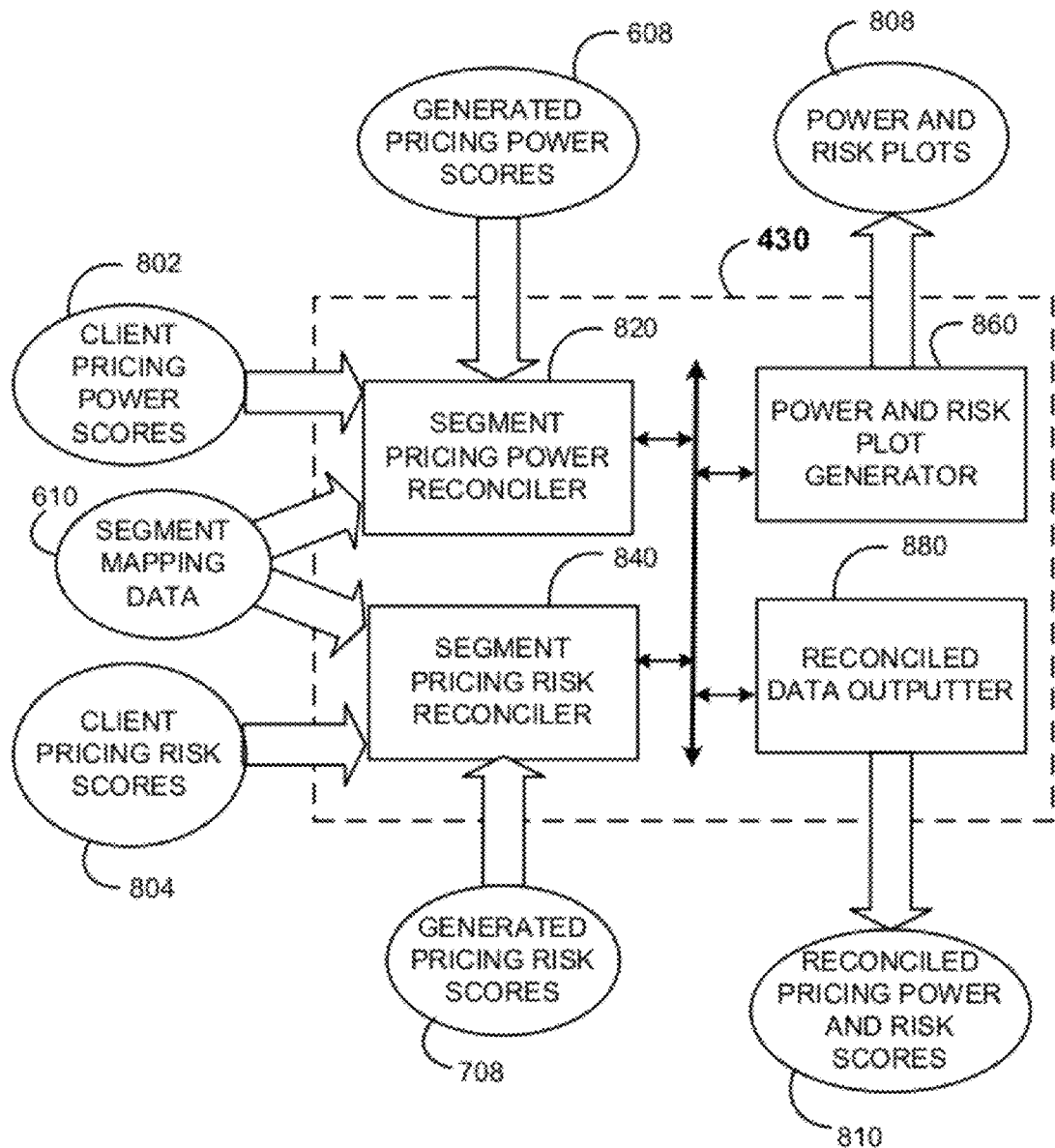
FIG. 8 is an exemplary client reconciliation engine for use with the product segment price generator of the price optimizer in the integrated price management system in accordance with an embodiment of the present invention.

FIG. 8 is an exemplary illustration of the Client Reconciliation Engine 430 for use with the Segment Price Generator 316 of the Price Optimizer 270 in the Integrated Price Management System 250. The Client Reconciliation Engine 430 may include a Segment Pricing Power Reconciler 820, a Segment Pricing Risk Reconciler 840 and a Reconciled Data Outputter 880. Each component of the Client Reconciliation Engine 430 may be coupled to one another by use of a bus. Likewise, a network or computer architecture may provide the coupling of each component of the Client Reconciliation Engine 430.

The Segment Pricing Power Reconciler 820 may receive Client Pricing Power Scores 802 from the Client 302. As previously noted, client segment information tends to be more granular than generated segments. This is due, in part, to the fact that the Integrated Price Management System 250 may generate a large number of segments in order to ensure purchasing behavior is properly modeled. Since a manager at the Client 302 may not be able to determine pricing power and risk scores for so many segments, they may generate their own segments for which to define qualitative pricing power and risk scores for. In addition, by having fewer segments, the time and effort requirements placed upon the Client 302 are greatly reduced. Lastly, since managers at the Client 302 decide client segments, they are typically able to generate more accurate qualitative pricing power and risk scores for these segments (as opposed to determining pricing power and risk for segments generated elsewhere). It should be noted that the term 'manager' is intended to include any executive, contractor or employee of the Client 302 who is authorized to manage price setting. Thus, in some embodiments, a manager may include a senior sales member, who is not necessarily part of the management team.

Additionally, the Generated Pricing Power Scores 608 and the Segment Mapping Data 610 may be provided to the Segment Pricing Power Reconciler 820. The Segment Pricing Power Reconciler 820 may aggregate the Generated Pricing Power Scores 608 according to the Segment Mapping Data 610 to generate comparable aggregate power scores which are compared to the Client Pricing Power Scores 802.

For this comparison, the segments are then ranked by the size of the gap between the quantitative and the qualitative scores. Segments with small gaps may be accepted, while large gaps may be "drilled into" to determine if there is a segment inconsistency, unknown factor or other reason for the large gap. If such a reason explains the gap, the particular score, be it quantitative or qualitative, may be modified to include the new information. This results in the gap being narrowed and, ideally, making the quantitative score acceptable.

For those segments with large gaps between qualitative and quantitative scores which are not readily attributed to a reason through the drill down, there may be a calibration performed on the quantitative pricing power score to match the qualitative pricing power score. In the calibration, all qualitative scores may be averaged. Likewise, all quantitative scores may be averaged. Average quantitative scores may be compared to the average qualitative scores, and calibration factors may be generated. Again, each quantitative pricing power for each generated segment may then be calibrated using the calibration factor. This calibration may be a linear or nonlinear calibration.

After quantitative scores have been accepted or calibrated the resulting pricing power scores may be known as reconciled pricing power scores. These Reconciled pricing power scores may be provided to the Reconciled Data Outputter 880 for outputting as part of the Reconciled Pricing Power and Risk Data 810. Pricing Power and Risk reconciliation will be described in more detail later in the specification.

Likewise, the Segment Pricing Risk Reconciler 840 may receive Client Pricing Risk Scores 804 from the Client 302. Additionally, the Generated Pricing Risk Scores 708 and the Segment Mapping Data 610 may be provided to the Segment Pricing Risk Reconciler 840. The Segment Pricing Risk Reconciler 840 may aggregate the Generated Pricing Risk Scores 708 according to the Segment Mapping Data 610 to generate comparable aggregate risk scores which are compared to the Client Pricing Risk Scores 804. This comparison may be performed in a manner similar as that described above in relation to power scores.

The reconciled pricing power and risk scores may be compiled by the Reconciled Data Outputter 880. These Reconciled Pricing Power and Risk Scores 810 may then be output for deal guidance and pricing purposes. Likewise, the Power and Risk Plot Generator 860 may generate and output Pricing Power and Risk Plots 808 for user consumption and downstream analysis.

Figure 9:
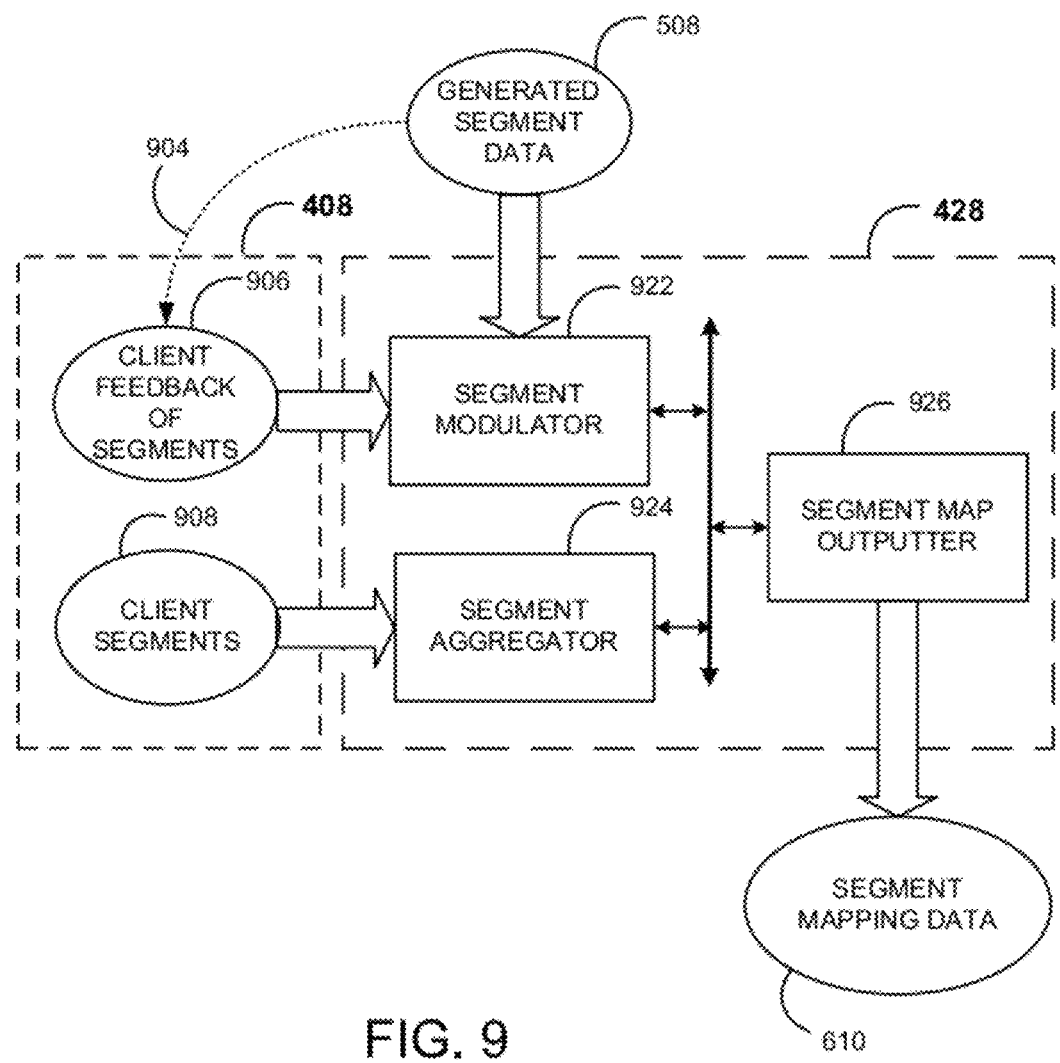
FIG. 9 is an exemplary client segment cartographer for use with the product segment price generator of the price optimizer in the integrated price management system in accordance with an embodiment of the present invention.

FIG. 9 is an exemplary illustration of the Segment Cartographer 428 of the Segment Price Generator 316 of the Price Optimizer 270 in the Integrated Price Management System 250. The Segment Cartographer 428 may receive Client Segment Data 408 and Generated Segment Data 508. The Segment Cartographer 428 may compare the Client Segment Data 408 and Generated Segment Data 508 to produce a segment map. The segment map may be output as Segment Mapping Data 610.

The Segment Cartographer 428 may include, in some embodiments, a Segment Modulator 922, a Segment Aggregator 924, and a Segment Map Outputter 926. Each component of the Segment Cartographer 428 may be coupled by a bus, network or through computer hardware or software architecture.

Again, Client Segment Data 408 may be seen being input into the Segment Cartographer 428. Here, however, the Client Segment Data 408 may be seen as including Client Feedback of Segments 906 and Client Segments 908. The Client 302 may review the Generated Segment Data 508, shown by the arrow labeled 904, in order to generate Client Feedback of Segments 906. The Segment Modulator 922 may receive the Generated Segment Data 508 and Client Feedback of Segments 906. The Segment Modulator 922 may alter the Generated Segment Data 508 in order to comply with the Client Feedback of Segments 906.

In some embodiments, the level of certainty of a segment makeup may be used to provide the user with suggestions as to if a particular segment is "strong" (believed to have a high degree of similar reaction to price changes) or "weak" (less strong similarity, or less certain of the degree of similarity). In this manner the client may be dissuaded from altering well defined, strong segments, and may be more willing to apply business knowledge and expertise to weaker segments.

The Segment Aggregator 924 may receive the Generated Segments 508 from the Segment Modulator 922 along with the Client Segments 908 from the Client 302. The Generated Segments 508 may be compared to the Client Segments 908. Groupings of the generated segments may be determined which are similar to the Client Segments 908. These groupings of segments may be referred to as aggregate segments. The segment grouping data (which segments may be combined to form the aggregate segments) may be used to generate a segment map, which is output by the Segment Map Outputter 926 as Segment Mapping Data 610.

Figure 10A:
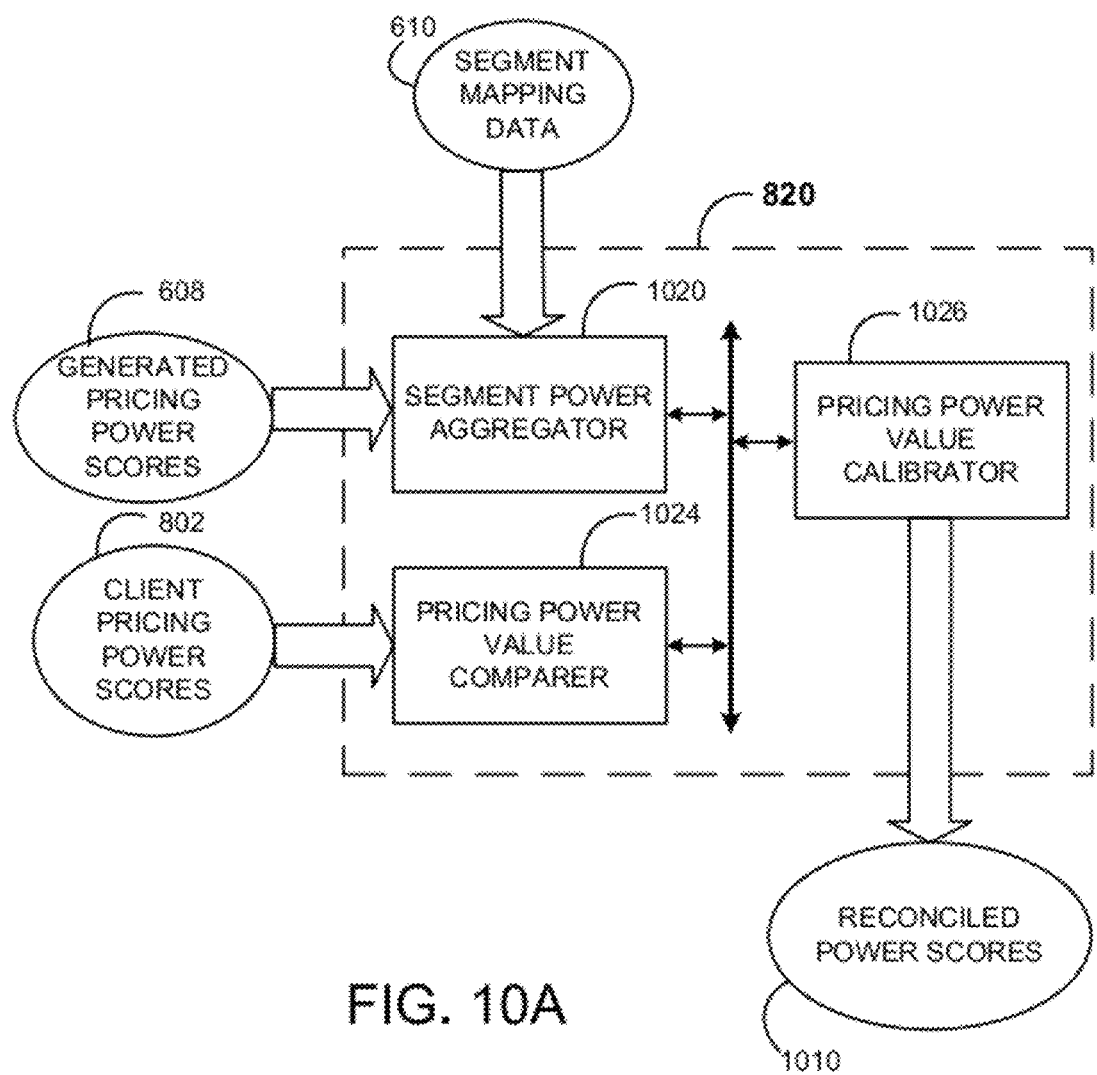
FIG. 10A is an exemplary segment pricing power reconciler for use with the client reconciliation engine of the product segment price generator of the price optimizer in the integrated price management system in accordance with an embodiment of the present invention.

FIG. 10A is an exemplary illustration of the Segment Pricing Power Reconciler 820 for use with the Client Reconciliation Engine 430 of the Segment Price Generator 316 of the Price Optimizer 270 in the Integrated Price Management System 250. Here the Segment Pricing Power Reconciler 820 may be seen as including a Segment Pricing Power Aggregator 1020, a Pricing Power Value Comparer 1024, and a Pricing Power Value Calibrator 1026. Each component of the Segment Pricing Power Reconciler 820 may be coupled to one another by a central bus, network, or computer architecture. The Generated Pricing Power Scores 608, Client Pricing Power Scores 802 and Segment Mapping Data 610 are inputs to the Segment Pricing Power Reconciler 820.

The Generated Pricing Power Data 608 includes the quantitative pricing power scores for each of the generated segments. The Segment Pricing Power Aggregator 1020 may then produce aggregate quantitative pricing power scores for the aggregate segments (those segments comparable to client segments) using the Segment Mapping Data 610.

The aggregate quantitative pricing power scores may then be provided to the Pricing Power Value Comparer 1024. Likewise the Client Pricing Power Scores 802 for each client segment may be provided from the Client 302 to the Pricing Power Value Comparer 1024. The Pricing Power Value Comparer 1024 may compare the qualitative pricing power scores with the aggregate quantitative pricing power scores. Scores may then be ranked according to the size of the gap between the qualitative and quantitative scores. In some embodiments, scores that are within some threshold of one another may be deemed as similar. In these embodiments, the similar quantitative scores may be accepted as accurate scores. In some alternate embodiments, the quantitative scores are still subjected to calibration as is discussed below.

Scores with large gaps between the quantitative and qualitative score may be tagged for reconciliation. These scores may be provided to the Client 302 for additional input, known as a "drill down". Additionally, the qualitative power scores and quantitative power scores may be reconciled by the Pricing Power Value Calibrator 1026.

The calibrated scores and, where applicable, the accepted quantitative scores may then be output as Reconciled Pricing Power Scores 1010. This reconciled data may be consumed directly by the Client 302 for business decision guidance, or may be utilized in a downstream application, such as for price allocation.

Figure 10B:
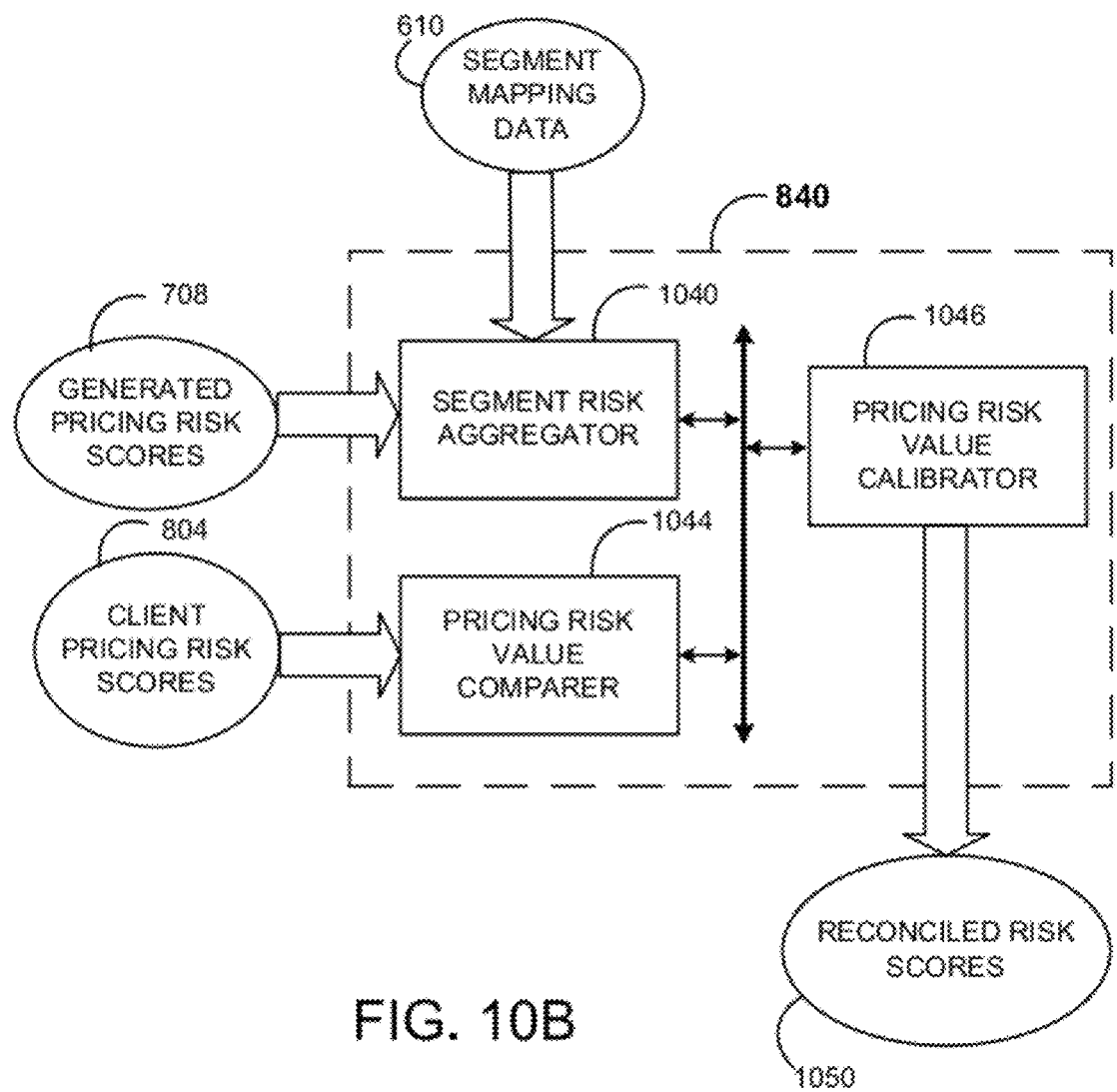
FIG. 10B is an exemplary segment pricing risk reconciler for use with the client reconciliation engine of the product segment price generator of the price optimizer in the integrated price management system in accordance with an embodiment of the present invention.

FIG. 10B is an exemplary illustration of the Segment Pricing Risk Reconciler 840 for use with the Client Reconciliation Engine 430 of the Segment Price Generator 316 of the Price Optimizer 270 in the Integrated Price Management System 250. Here the Segment Pricing Risk Reconciler 840 may be seen as including a Segment Pricing Risk Aggregator 1040, a Pricing Risk Value Comparer 1044, and a Pricing Risk Value Calibrator 1046. Each component of the Segment Pricing Risk Reconciler 840 may be coupled to one another by a central bus, network, or computer architecture. The Generated Pricing Risk Scores 708, Client Pricing Risk Scores 804 and Segment Mapping Data 610 are inputs to the Segment Pricing Risk Reconciler 840.

The Generated Pricing Risk Scores 708 includes the quantitative pricing risk scores for each of the generated segments. The Segment Pricing Risk Aggregator 1040 may then produce aggregate quantitative pricing risk scores for the aggregate segments (those segments comparable to client segments) using the Segment Mapping Data 610.

The aggregate quantitative pricing risk scores may then be provided to the Pricing Risk Value Comparer 1044. Likewise the Client Pricing Risk Scores 804 for each client segment may be provided from the Client 302 to the Pricing Risk Value Comparer 1044. The Pricing Risk Value Comparer 1044 may compare the qualitative pricing risk scores with the aggregate quantitative pricing risk scores. Scores may then be ranked according to the size of the gap between the qualitative and quantitative scores. In some embodiments, scores that are within some threshold of one another may be deemed as similar. In these embodiments, the similar quantitative scores may be accepted as accurate scores. In some alternate embodiments, the quantitative scores are still subjected to calibration as is discussed below.

Scores with large gaps between the quantitative and qualitative score may be tagged for reconciliation. These scores may be provided to the Client 302 for additional input, known as a "drill down". Additionally, the qualitative risk scores and quantitative risk scores may be reconciled by the Pricing Risk Value Calibrator 1046.

The calibrated scores and, where applicable, the accepted quantitative scores may then be output as Reconciled Pricing Risk Scores 1050. This reconciled data may be consumed directly by the Client 302 for business decision guidance, or may be utilized in a downstream application, such as for price allocation.

Figure 11A:
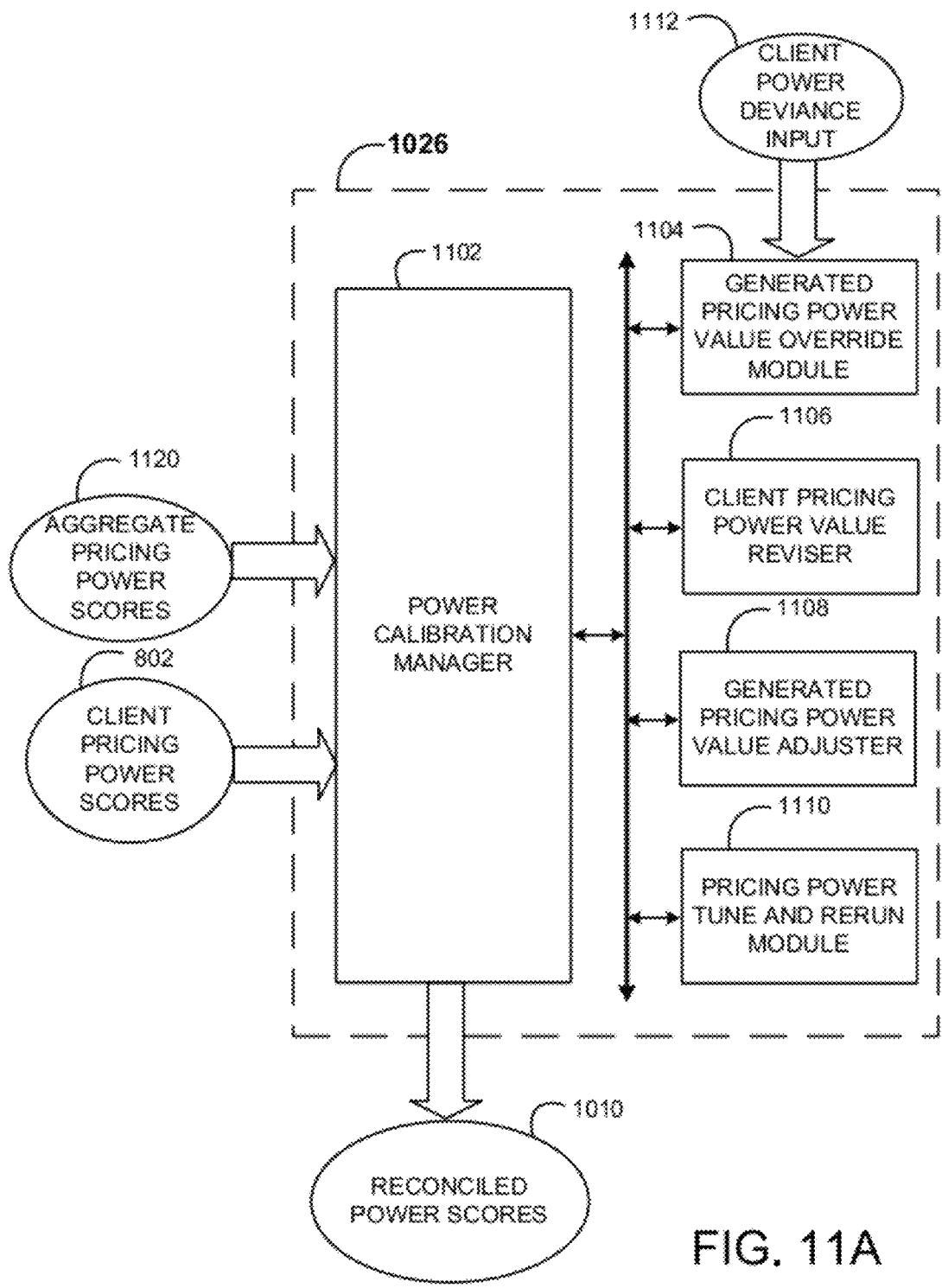
FIG. 11A is an exemplary pricing power value calibrator of the segment pricing power reconciler for use with the client reconciliation engine of the product segment price generator of the price optimizer in the integrated price management system in accordance with an embodiment of the present invention.

FIG. 11A is an exemplary illustration of the Pricing Power Value Calibrator 1026 of the Segment Pricing Power Reconciler 820. The Pricing Power Value Calibrator 1026 may include a Power Calibration Manager 1102, a Generated Pricing Power Value Override Module 1104, a Client Pricing Power Value Reviser 1106, a Generated Pricing Power Value Adjuster 1108, and a Pricing Power Tune and Rerun Module 1110. The Power Calibration Manager 1102 may receive the Aggregate Pricing Power Scores 1120 and the Client Pricing Power Scores 802. The Power Calibration Manager 1102 may also compile and output the final Reconciled Pricing Power Scores 1010.

In some cases the Client 302 may have a reason for the large gap between the quantitative and qualitative scores. Such reasons include, but are not limited to, the qualitative score was based upon a subset of products within the client segment, factors used by the Client 302 in generation of the qualitative score were not used in generation of the quantitative score and vice versa.

When a drill down reason for the large gap is identified, the client may provide Client Pricing Power Deviance Input 1112 which includes this information to the Generated Pricing Power Value Override Module 1104. The Generated Pricing Power Value Override Module 1104 may then modify the quantitative score to incorporate the reason. This effectively causes the qualitative and quantitative scores to become more similar. This process may also be referred to as "closing the gap" between the qualitative and quantitative scores. If scores become similar enough, in some embodiments, the quantitative score may be deemed accurate and is accepted as a reconciled score.

Additionally, in some cases the client may realize mistakes were made in the generation of the qualitative Client Power Score 608. In this case the Client Power Scores 608 may be revised by the Client Pricing Power Value Reviser 1106. Again, this effectively causes the qualitative and quantitative scores to become more similar. If scores become similar enough, in some embodiments, the quantitative score may be deemed accurate and is accepted as a reconciled score.

If none of the above applies, often the quantitative score may be adjusted to better conform to the qualitative score. This adjustment may be performed by the Generated Pricing Power Value Adjuster 1108, and may include comparing the qualitative and quantitative scores to generate calibration factors. The quantitative scores may then be calibrated by the factor in a linear or nonlinear fashion. Also, note that the calibration of the quantitative scores is performed for each quantitative score separately such as to maintain spread of pricing power and risk scores across the generated segments. The calibrated quantitative scores are then output as reconciled scores.

Lastly, in some embodiments, the Pricing Power Tune and Rerun Module 1110 may receive changes in factors or client scores. The Pricing Power Tune and Rerun Module 1110 may then regenerate updated power scores, and compare these updated scores to updated client scores. Thus, the process becomes iterative over small alterations of qualitative and quantitative scores until a reconciled score is reached.

Figure 11B:
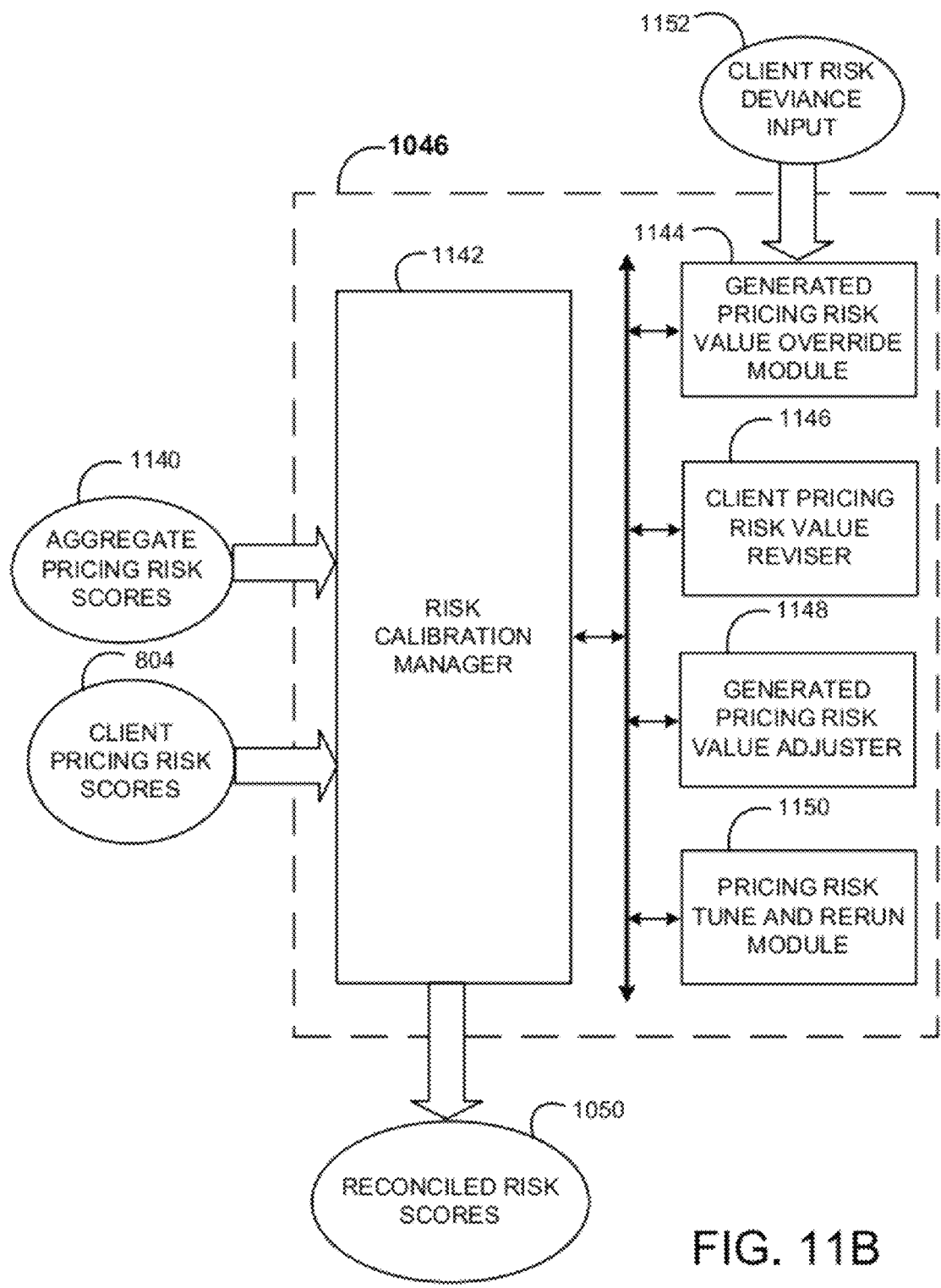
FIG. 11B is an exemplary pricing risk value calibrator of the segment pricing risk reconciler for use with the client reconciliation engine of the product segment price generator of the price optimizer in the integrated price management system in accordance with an embodiment of the present invention.

FIG. 11B is an exemplary illustration of the Pricing Risk Value Calibrator 1046 of the Segment Pricing Power Reconciler 840. The Pricing Risk Value Calibrator 1046 may include a Risk Calibration Manager 1142, a Generated Pricing Risk Value Override Module 1144, a Client Pricing Risk Value Reviser 1146, a Generated Pricing Risk Value Adjuster 1148, and a Pricing Risk Tune and Rerun Module 1150. The Risk Calibration Manager 1142 may receive the Aggregate Pricing Risk Scores 1140 and the Client Pricing Risk Scores 804. The Risk Calibration Manager 1142 may also compile and output the final Reconciled Pricing Risk Scores 1050.

As mentioned above, in some cases the Client 302 may have a reason for the large gap between the quantitative and qualitative scores. Such reasons include, but are not limited to, the qualitative score was based upon a subset of products within the client segment, factors used by the Client 302 in generation of the qualitative score were not used in generation of the quantitative score and vice versa.

When a drill down reason for the large gap is identified, the client may provide Client Pricing Risk Deviance Input 1152 which includes this information to the Generated Pricing Risk Value Override Module 1144. The Generated Pricing Risk Value Override Module 1144 may then modify the quantitative score to incorporate the reason. This effectively causes the qualitative and quantitative scores to become more similar. This process may also be referred to as "closing the gap" between the qualitative and quantitative scores. If scores become similar enough, in some embodiments, the quantitative score may be deemed accurate and is accepted as a reconciled score.

Additionally, in some cases the client may realize mistakes were made in the generation of the qualitative Client Risk Score 708. In this case, the Client Risk Scores 708 may be revised by the Client Pricing Risk Value Reviser 1146. Again, this effectively causes the qualitative and quantitative scores to become more similar. If scores become similar enough, in some embodiments, the quantitative score may be deemed accurate and is accepted as a reconciled score.

If none of the above applies, often the quantitative score may be adjusted to better conform to the qualitative score. This adjustment may be performed by the Generated Pricing Risk Value Adjuster 1148, and may include comparing the qualitative and quantitative scores to generate calibration factors. The quantitative risk scores may then be calibrated by the factor in a linear or nonlinear fashion. Also, note that the calibration of the quantitative risk scores is performed for each quantitative risk score separately such as to maintain spread of pricing risk scores across the generated segments. The calibrated quantitative risk scores are then output as reconciled risk scores.

Lastly, in some embodiments, the Pricing Risk Tune and Rerun Module 1150 may receive changes in factors or client scores. The Pricing Risk Tune and Rerun Module 1150 may then regenerate updated risk scores, and compare these updated scores to updated client risk scores. Thus, the process becomes iterative over small alterations of qualitative and quantitative scores until a reconciled risk score is reached.

Figure 12:
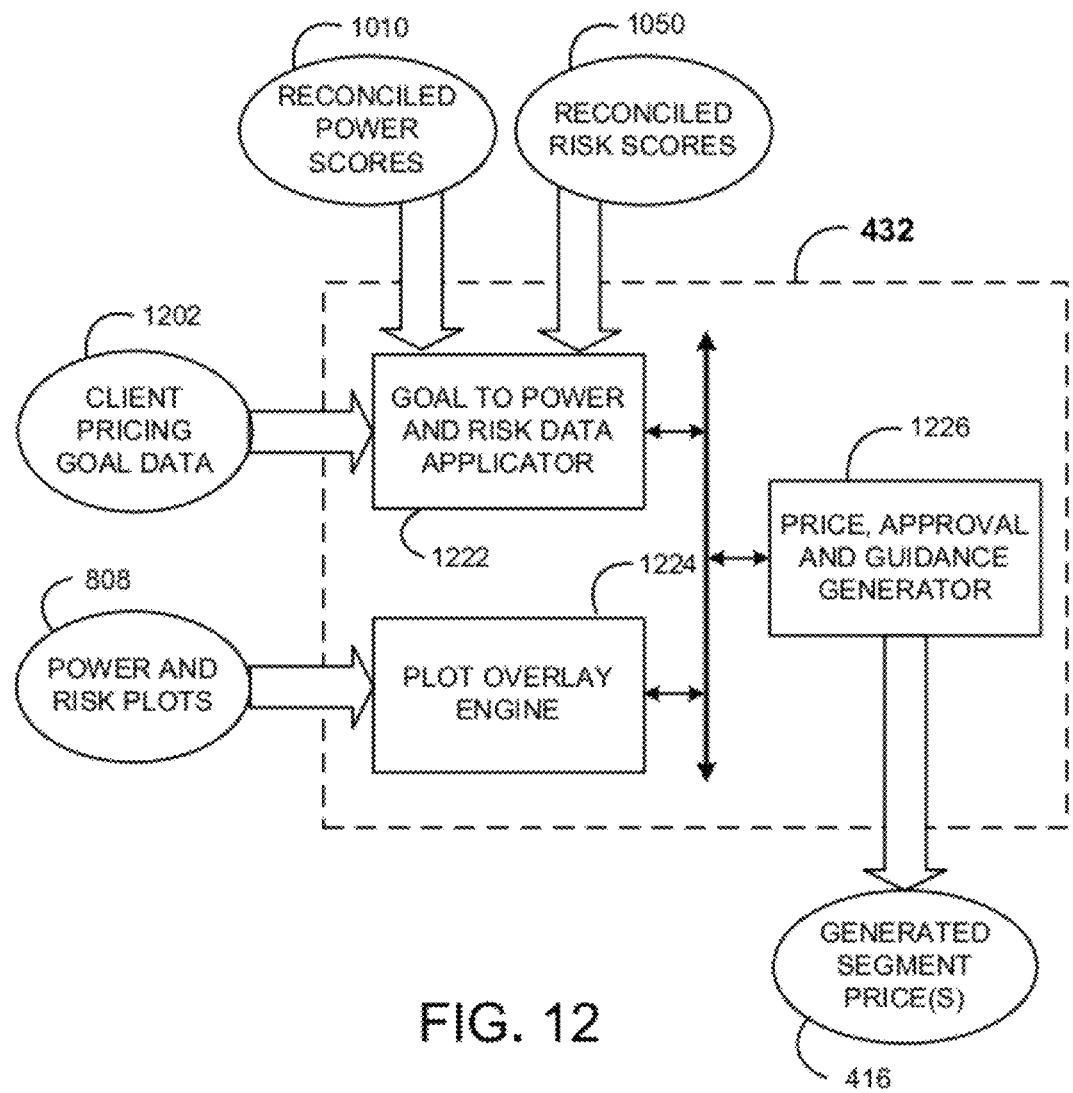
FIG. 12 is an exemplary segment price setter for use with the product segment price generator of the price optimizer in the integrated price management system in accordance with an embodiment of the present invention.

FIG. 12 is an exemplary illustration of the Segment Price Setter 432 for use with the Segment Price Generator 316 of the Price Optimizer 270 in the Integrated Price Management System 250. The Segment Price Setter 432 may be seen as including a Goal to Pricing Power and Risk Data Applicator 1222, a Plot Overlay Engine 1224 and a Price, Approval and Guidance Generator 1226. Each component of the Segment Price Setter 432 may be coupled to one another by a bus, a network, or by computer hardware or software architecture.

The Reconciled Pricing Power Scores 1010 and Reconciled Pricing Risk Scores 1050 may be provided to the Goal to Pricing Power and Risk Data Applicator 1222 along with Client Pricing Goal Data 1202 from the Client 302. The Client Pricing Goal Data 1202 may include information such as price change goals, pricing risk minimization goals, pricing power maximization goals, risk/power combination goals, particular prices, or any other goal which may influence price setting. The Reconciled Pricing Power Scores 1010 and Reconciled Pricing Risk Scores 1050 may then be applied to the Client Pricing Goal Data 1202 to generate suggested price changes by segment.

For example, suppose the Client 302 were to provide goals including a global 3% price increase, while minimizing pricing risk, and while decreasing the price of certain selected widgets to $5. The Goal to Pricing Power and Risk Data Applicator 1222 may reduce widget price to $5, and apply a varied price increase to all other products in a total amount of 3%. The price increase, however, will not be applied equally to all products. Thus, products in segments with low pricing risk values may experience greater price increases than those of higher pricing risk. Thus 'doodads', with a low pricing risk, may receive an 8% price increase, and 'thingamabobs', which have a higher pricing risk, may receive a marginal 1% price increase.

The Goal to Pricing Power and Risk Data Applicator 1222 may utilize rule based engines, and multifactor equations in the generation of pricing suggestions. The Plot Overlay Engine 1224, on the other hand, uses the Pricing Power and Risk Plots 808 to generate pricing suggestions. In some embodiments, the Goal to Pricing Power and Risk Data Applicator 1222 and the Plot Overlay Engine 1224 are the same component, but in this example, for sake of clarity, these components have been illustrated separately.

The Plot Overlay Engine 1224 may apply one or more overlays to the Pricing Power and Risk Plots 808. The overlays may include any of a price change matrix, or tradeoff price change contours. Examples of these are provided below in FIGS. 35 and 36 and accompanying text. The matrix operations or contour location, shape and value may depend upon the goals provided by the Client 302.

Pricing suggestions created by the Goal to Pricing Power and Risk Data Applicator 1222 and Plot Overlay Engine 1224 may be compiled to generate a set of prices for each product of the segment. This Generated Segment Price(s) 416 may then be output for direct Client 302 consumption, or for downstream operations such as deal evaluation.

The Approval and Guidance Generator 1226 may apply reconciled risk and power scores by segment, along with suggested price changes to generate Segment Prices 416. Segment Prices 416 is intended to include approval level prices, target prices, floor prices and pricing guidance.

Figure 13:
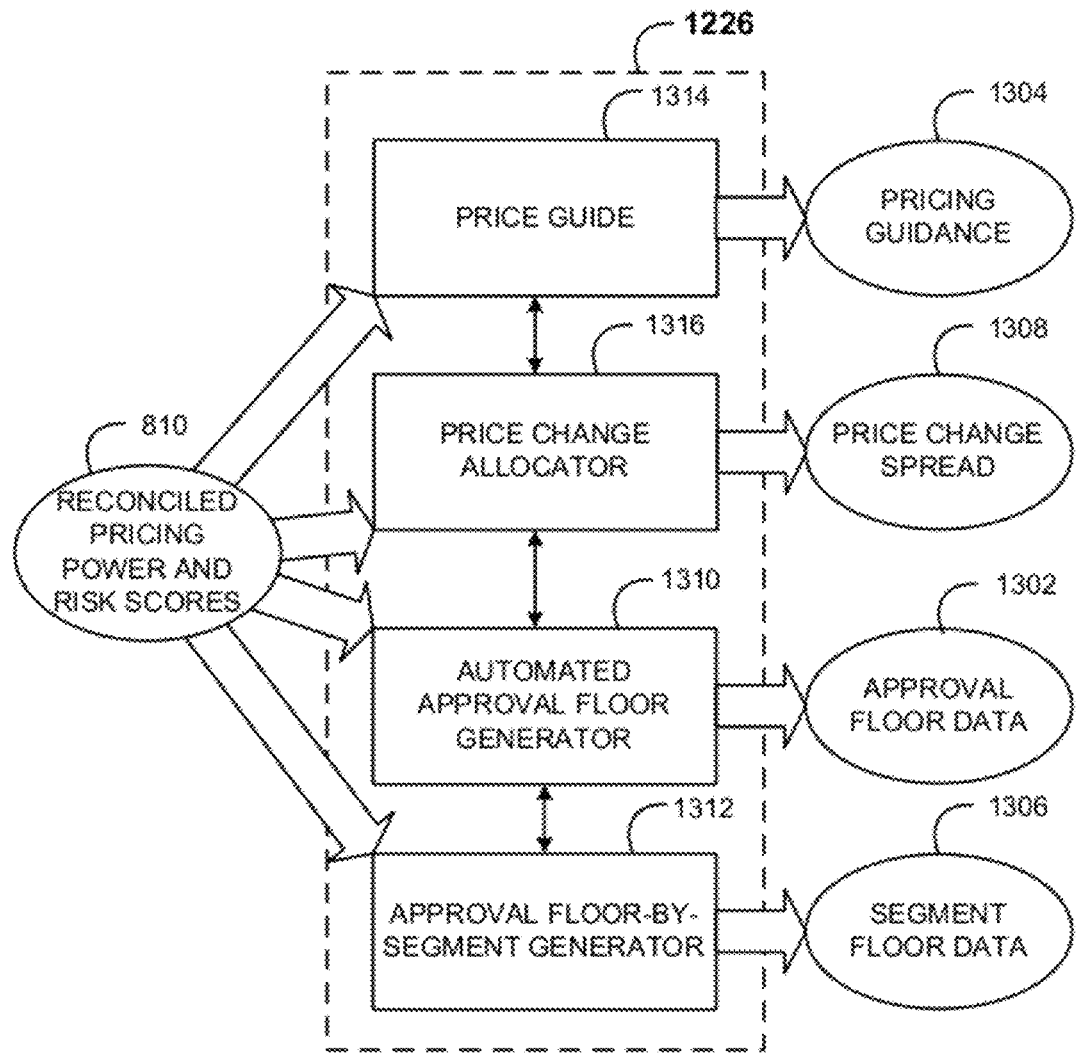
FIG. 13 is an exemplary price, approval and guidance generator for use with the segment price setter of the product segment price generator of the price optimizer in the integrated price management system in accordance with an embodiment of the present invention.

FIG. 13 is an exemplary illustration of the Approval and Guidance Generator 1226. The Approval and Guidance Generator 1226 may include a Price Guide 1314, a Price Change Allocator 1316, an Automated Approval Floor Generator 1310 and an Approval Floor-by-Segment Generator 1312 coupled to one another. Each component of the Approval and Guidance Generator 1226 may receive the Reconciled Pricing Power and Risk Scores 810.

The Price Guide 1314 may generate general Pricing Guidance 1304 for deal negotiations. This may include raw Pricing Power and Risk indices, up sell suggestions, volume suggestions and behavioral cues for the sales force. Additionally, pricing guidance may include approval levels and target prices.

The Price Change Allocator 1316 may receive input from the Goal to Pricing Power and Risk Data Applicator 1222 and Plot Overlay Engine 1224 in order to generate a Price Change Spread 1308.

The Automated Approval Floor Generator 1310 may set approval floors by any of a myriad of ways, including percentage of cost, percentage of prior transactions, and percentage of competitor pricing. Of course additional known, and future known, methods of generating approval floors are considered within the scope of the invention. Likewise, the Automated Approval Floor Generator 1310 may generate target pricing in similar ways. The Approval Floor Data 1302 may then be output for quote analysis, or sales force guidance.

The Approval Floor-by-Segment Generator 1312 may be, in some embodiments, the same component as the Automated Approval Floor Generator 1310. In the present illustration, however, these components are illustrated separately for clarity. The Approval Floor-by-Segment Generator 1312 may receive Reconciled Pricing Power and Risk Data 810 in order to generate target and approval values by segment. In addition to the methods described above, the Approval Floor-by-Segment Generator 1312 may include modulation of target and approval levels depending upon pricing power and risk of the given segment a product belongs. For example, high pricing power values for a given segment may cause target and approval levels to increase. High pricing risk, on the other hand, may reduce the approval floor.

The Approval Floor-by-Segment Generator 1312 may generate approval and target data that is impacted by segment. The Segment Floor Data 1306 may then be output for quote analysis, or sales force guidance.

D. Deal Evaluator

Figure 14:
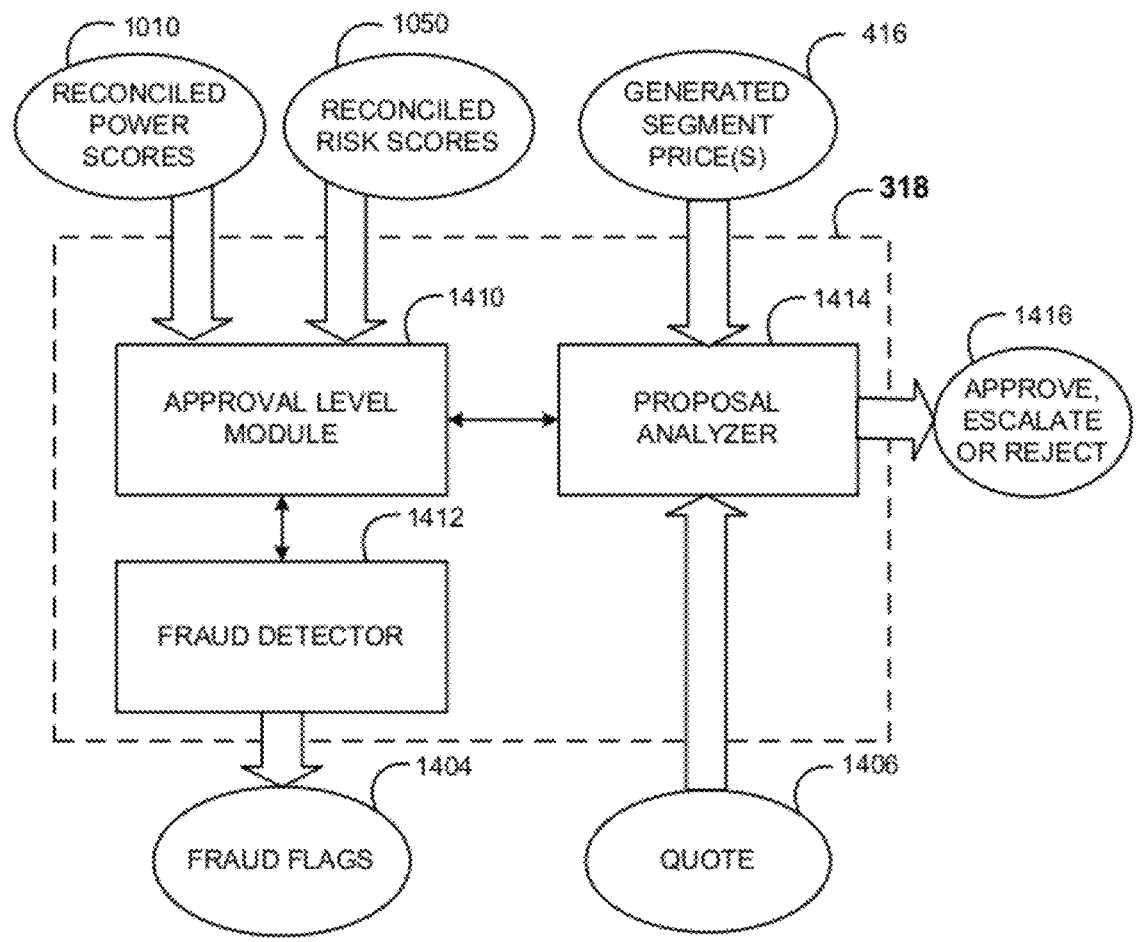
FIG. 14 is an exemplary deal evaluator for use with the integrated price management system in accordance with an embodiment of the present invention.

FIG. 14 is an exemplary illustration of the Deal Evaluator 318 of the Integrated Price Management System 250. The Deal Evaluator 318 may include an Approval Level Module 1410, a Fraud Detector 1412 and a Proposal Analyzer 1414. The Approval Level Module 1410 may couple to the Fraud Detector 1412 and the Proposal Analyzer 1414. The Approval Level Module 1410 may receive the Reconciled Pricing Power Scores 1010 and Reconciled Pricing Risk Scores 1050. The Approval Level Module 1410 may receive approval levels for each of the segments from the Segment Prices 416. Approval levels include approval floors, a plurality of approval levels and target pricing. Deals are classified as wins or losses based upon a comparison between deal transactions (quotes and/or contracts) and order transactions. The matching logic compares things like deal effective date (from and to date), specific product or product group, customer account, ship-to or billed-to.

Transaction data, along with the approval level data may be provided to the Fraud Detector 1412 for detection of fraud. Thus, individuals within the Client 302 who statistically generate deals below the approval floors may receive a Fraud Flag 1404. These individuals, or groups, within the Client 302 may then be subject to more scrutiny or oversight by the management of the Client 302.

Approval floors, target pricing and Generated Segment Price(s) 416 may be provided to the Proposal Analyzer 1414 for analysis of the Quote (or proposal) 1406. The Proposal Analyzer 1414 may then output one of an Approval, Escalation or Rejection 1416 of the deal terms, based upon a comparison of the Quote 1406 and Generated Segment Price(s) 416.

III. Method for Generating Quantitative Pricing Power and Risk Scores

A. Integrated Pricing Management

Figure 15:
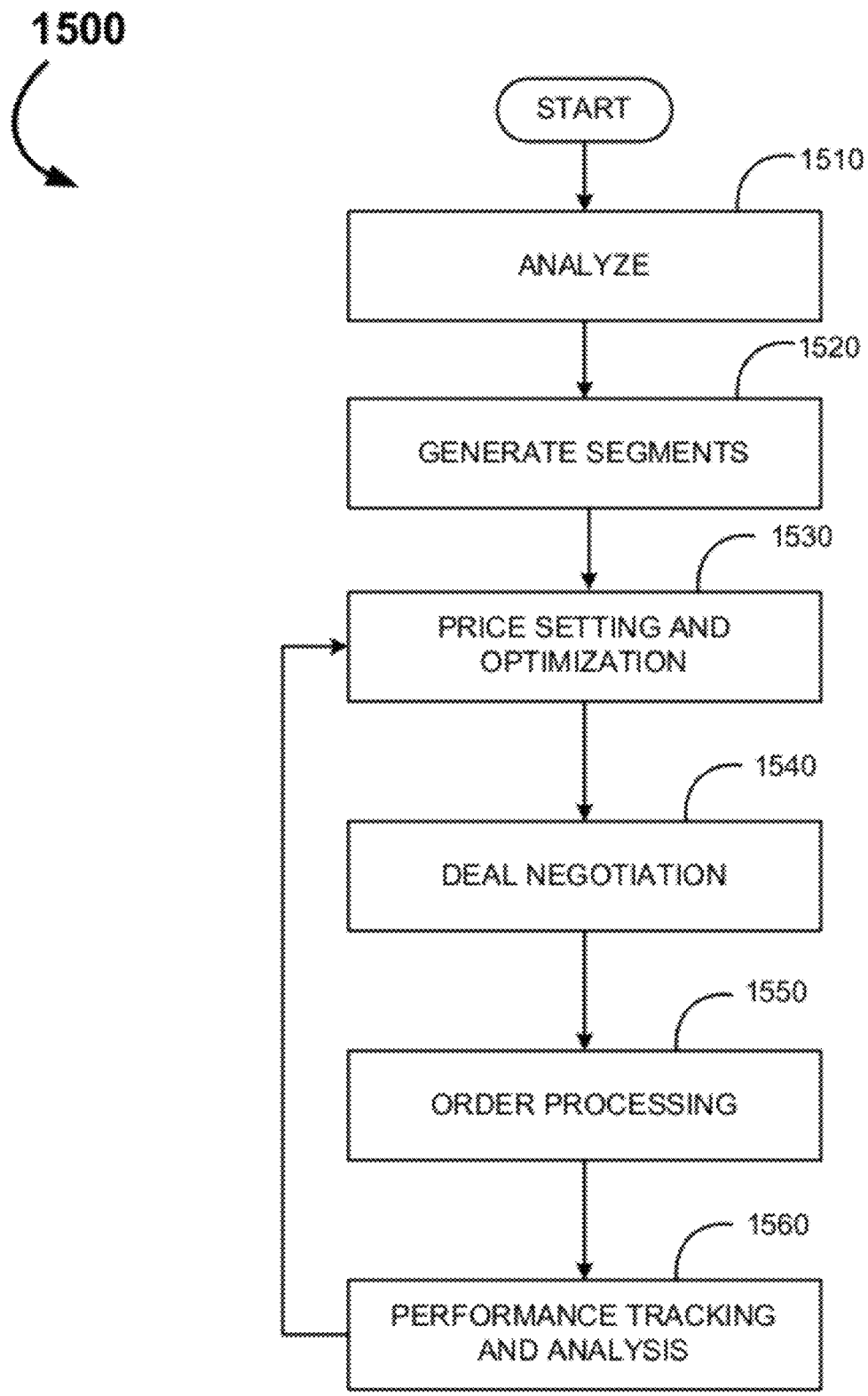
FIG. 15 is a flow chart illustrating an exemplary method for providing price and deal guidance for a business to business client in accordance with an embodiment of the present invention.

FIG. 15 is a flow chart illustrating an exemplary method for providing price and deal guidance for a business to business client in accordance with an embodiment of the present invention, shown generally at 1500. The process begins and then progresses to step 1510 where the client is analyzed. This analysis includes understanding business context, analyzing prior pricing results and developing segment hypotheses. From these hypotheses, rich data sets may be generated in order to test and refine the hypotheses.

Analysis, or assessment, may be performed by the Price and Margin Analyzer 260. Particularly, clients may self report and perform much of the analysis in-house. In some embodiments, data crawlers may mine corporate and transaction databases to facilitate analysis. Lastly, external consultants may undergo investigation into the client to perform analysis.

The process then progresses to step 1520 where segmentation occurs. Segmentation has already been discussed in some detail above. The effectiveness of both the demand modeling and price optimization for the selected segment is dependent upon proper segmentation. Segmentation is defined so as to identify clusters of transactions which have similar characteristics and should produce similar outcomes during the negotiation process by analyzing products, customers and transaction attributes. Segmentation may be performed at the transaction level using quantitative analysis. Segment robustness may also be continually monitored and validated.

The process then progresses to step 1530 where prices are set and optimized. Any price setting and optimization is considered; however, the present invention centers on the usage of pricing power and risk values to generate pricing and business guidance.

The process then progresses to step 1540 where deal negotiation is performed. Deal negotiation may be performed by a sales force or, in some embodiments, be an automated process. As has been previously discussed, deal negotiation is more common in the business to business environment, where slim margins account for the bulk of sales. The prices set at step 1530, as well as optimizations, guidance and quotes may be utilized at the deal negotiation step to improve the profits of any particular deal.

At step 1550 orders are processed in response to the negotiated deals. Order processing enables the finalized deals to be examined for changes in profit, margin and volume. These shifts in customer behavior may be referenced to the provided pricing and guidance. Then, at step 1560, this performance tracking may be analyzed for successful activities. Demand models (where utilized) may be updated. Likewise, segments may be updated as to fit the available data. Pricing power and risk values for each segment may be modified by changing the pricing power and pricing risk factors, as well as factor weight. Of course, additional performance analysis and updates may be performed at step 1560.

These updates may then be applied to the next iteration of price setting and optimizations at step 1530. The process may be concluded at any point when desired. Typically conclusion will occur when deals with a particular customer concludes.

B. Price Setting

Figure 16:
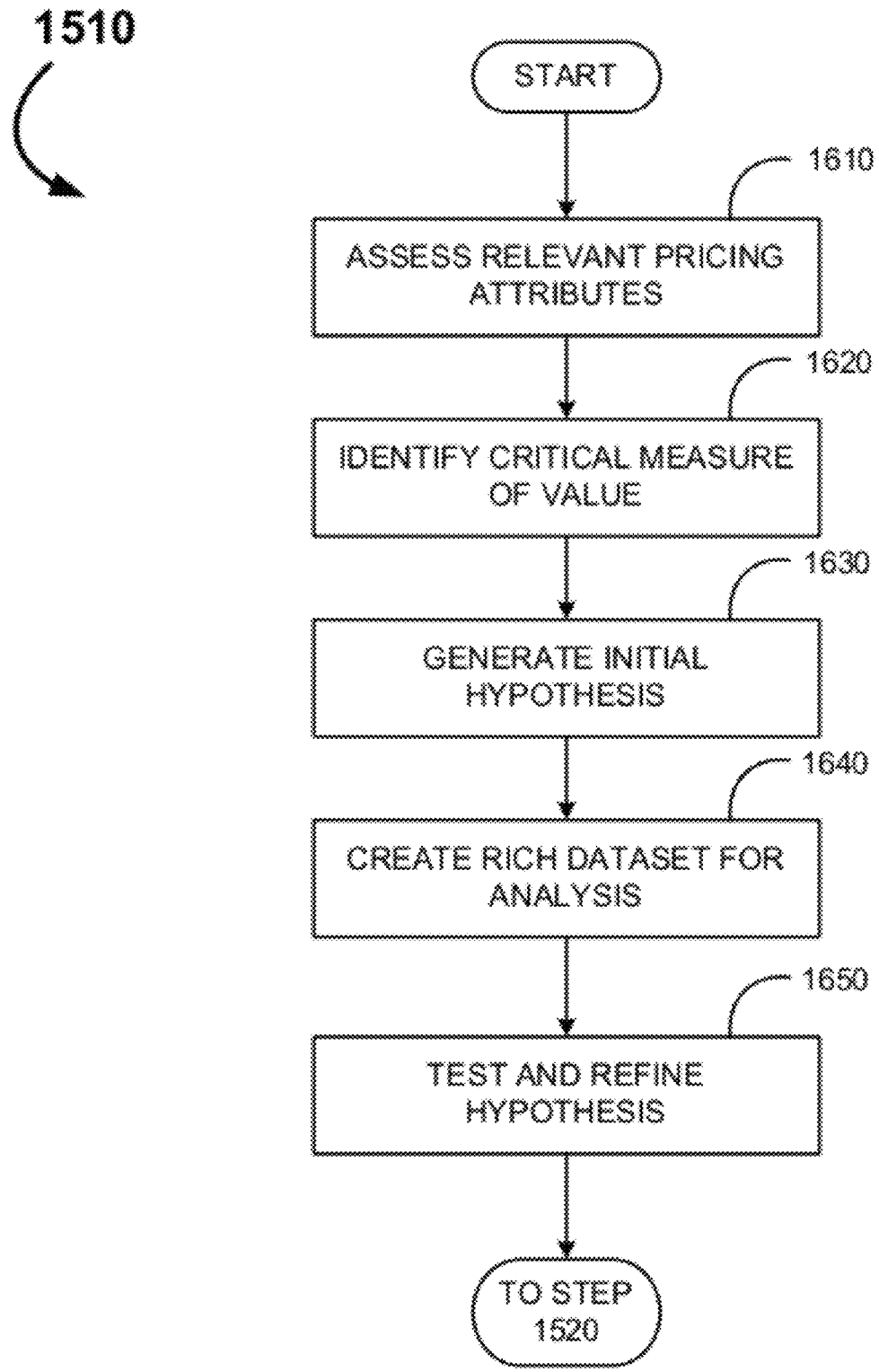
FIG. 16 is a flow chart illustrating an exemplary method for analyzing a business to business client of FIG. 15.

FIG. 16 is a flow chart illustrating an exemplary method for analyzing a business to business client of FIG. 15, shown generally at 1510. The process begins and progresses to step 1610 where relevant pricing attributes are assessed. Assessment of pricing attributes includes the identification of these attributes and developing an understanding of the degree of impact that they may have upon the client business.

The process then progresses to step 1620 where critical measures of value are identified. One or more metrics (ex. margin %, invoice price yield, etc.) can be used to perform the statistical analysis of the business transactions and to identify the critical drivers of value for the client business.

Then, at step 1630, an initial set of hypotheses for segmentation is generated. A rich dataset may then be constructed for the purpose of testing the initial hypotheses, at step 1640.

The process then progresses to step 1650 where the segment hypotheses are tested and refined. In some embodiments, these refined hypotheses may be utilized to create the initial segmentation for the given client. In some alternate embodiments, these hypotheses merely influence segmentation. The process then concludes by progressing to step 1520 of FIG. 15.

Figure 17:
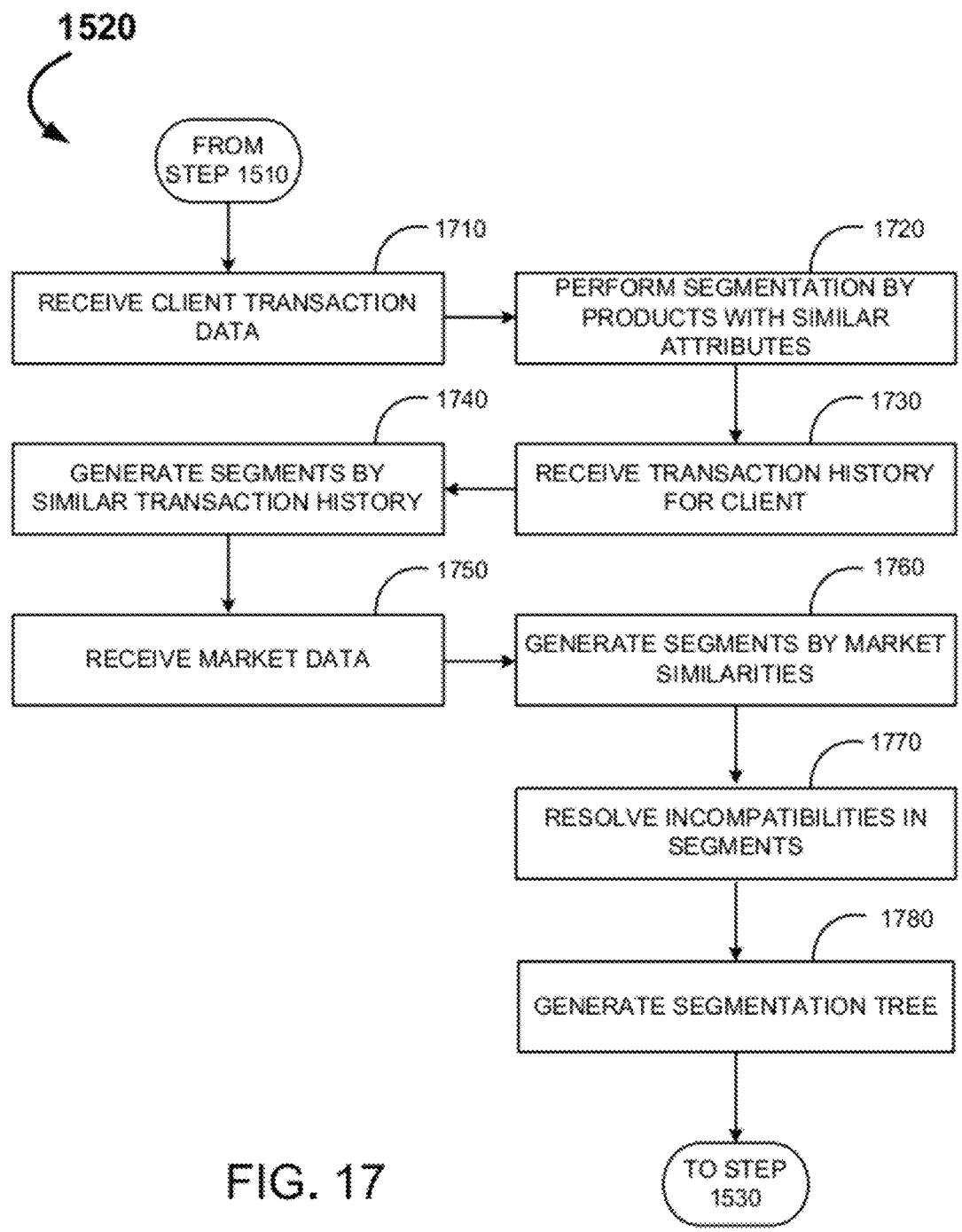
FIG. 17 is a flow chart illustrating an exemplary method of generating segments of FIG. 15.

FIG. 17 is a flow chart illustrating an exemplary method for segmenting products, shown generally at 1520. Note that this method of segment generation is intended to be exemplary in nature, as there are other segmentation processes which may be utilized to enable the present invention.

The process begins from step 1510 of FIG. 15. The process then progresses to step 1710 where transaction data is received. Transaction data may be received from the Data Warehouse 132. Transaction data, as used in this specification, includes information regarding customers, sales channels, product attributes and other relevant segmentation data. As previously discussed, segmentation analysis is performed at the 'transaction level', where a single transaction's details are analyzed to find similarities across product, customer and transaction attributes. The intent is to create a common base of comparison across seemingly unrelated records and extract insights on what is really driving better price and margin realization.

The process then progresses to step 1720 where similarities in the product dimensions are analyzed. Then, transaction history from the client may be received at step 1730. The transaction history may be utilized, in some embodiments, to identify attributes relevant to the segmentation, at step 1740.

Market data may likewise be received at step 1750. Similarities in a client's markets attributes may also be used to determine relevant segment dimensions, at step 1760.

Each of these exemplary segmentation techniques may be performed alone or in any combination. In addition, while the segmentation has been illustrated as a serial process, any of these segmentation techniques may be performed in any order or even in parallel.

In some cases, there may be inconsistencies between segments generated by one or more of these methods. Such incompatibilities may be resolved at step 1770. Segment incompatibility resolution may involve the degree of similarity within the given segments, segmentation rules, user feedback or other method.

Although not shown, in some embodiments, the client's segment requirements may be received. These requirements may include initial directives. An example of client segment requirements is that all MP3 accessories be grouped together as a single segment.

The client segment requirements may be applied to the segments. Typically client segment demands take priority over generated segments. Yet, in some embodiments, client requirements could be ignored.

After the segments are generated, they may be provided to the client for feedback (not shown). Typically client feedback of segmentation is followed, however, in some embodiments, the strength of any given segment may be provided to the client prior to client segment feedback, thus dissuading clients from adjusting segments that have been validated as accurate.

While several segmentation techniques and algorithms can be used to perform a quantitative segmentation on the client dataset (ex. cluster analysis, CART tree, multivariate regression, latent class analysis, etc.), the end result is typically a portfolio of segments that can be used for downstream use. An example of a possible output at step 1780 is a segment tree (not illustrated). The process then concludes by progressing to step 1530 of FIG. 15.

Figure 18:
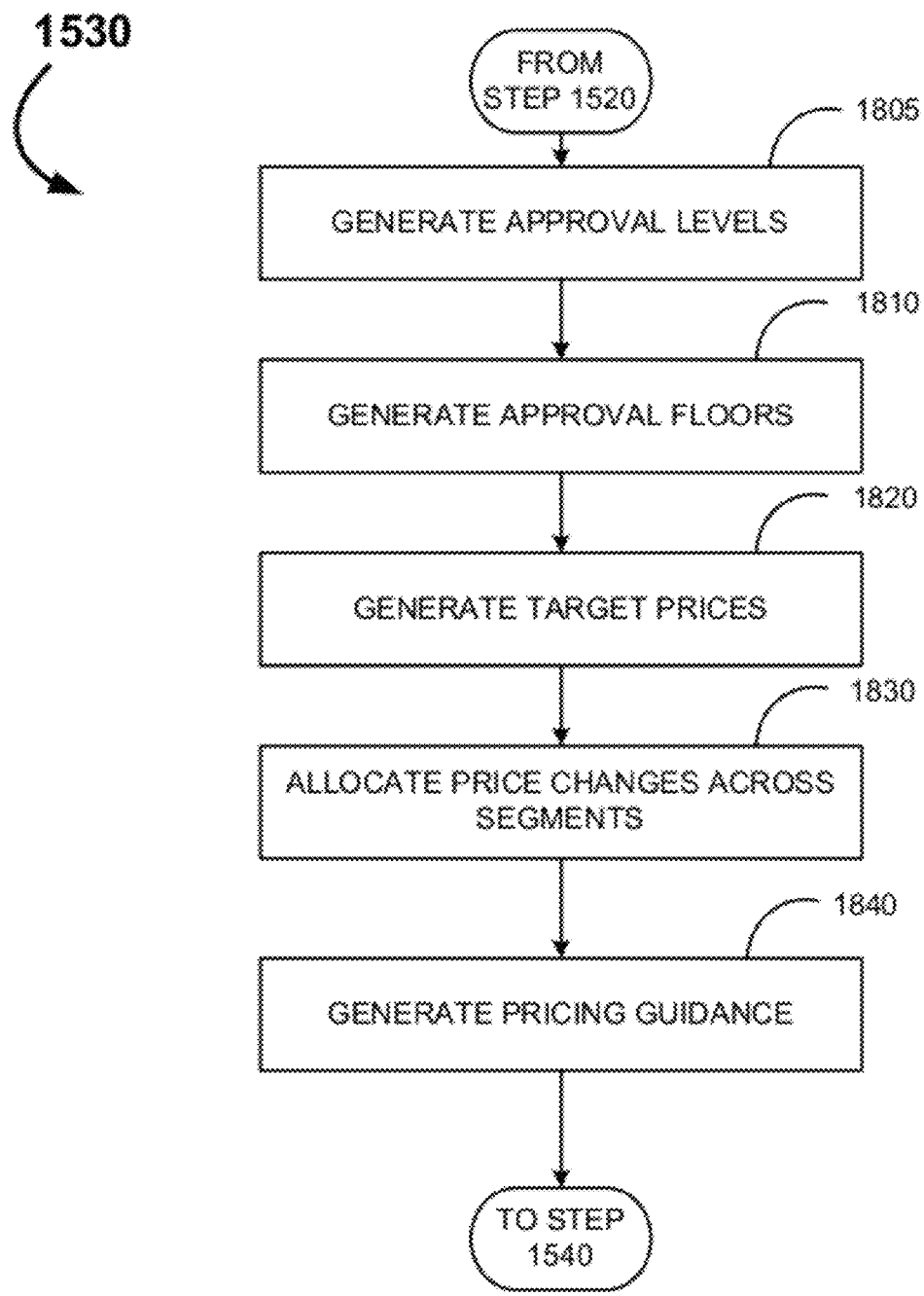
FIG. 18 is a flow chart illustrating an exemplary method for price setting and guidance optimization of FIG. 15.

FIG. 18 is a flow chart illustrating an exemplary method for optimizing prices, shown generally at 1530. The process begins from step 1520 of FIG. 15. The process then progresses to step 1805 where approval levels are generated for given segments. Then the process progresses to step 1810 where approval floors are generated for the given segments. Approval levels and floors may additionally be assigned to each product, channel and customer specifically. The approval levels and floors are determined by considering the specific Pricing Power and Risk of the segment/deal/line item considered for the optimization. Sometime approval levels incorporate specific client requests and constraints (ex. all the deals submitted for the top 3 customers have to be reviewed by the SVP of Sales). The degree of approval floor and level granularity may, in some embodiments, be configured to achieve the needs of the particular client.

The process then progresses to step 1820 where target prices may be generated. Setting target prices includes setting and communicating specific goals to the sales team. Target prices may include a sales team incentive structure. The goal of target pricing is to drive an overall increase in price realization. Target prices may or may not have a trial period. In situations where a trial period is implemented, target prices are adjusted according to the effect target prices have on overall profits.

Next, at step 1830, price change goals may be allocated across segment in an intelligent manner to drive increased profit realization. Also, at step 1840 pricing guidance for the sales team may be generated. The process then concludes by progressing to step 1540 of FIG. 15.

In each of steps 1805, 1810, 1820, 1830 and 1840 segmentation, pricing power and risk concepts may be utilized to enhance the process. Particularly, price change allocation may rely heavily upon segment Pricing Power and Risk analysis, as will be seen below.

Figure 19:
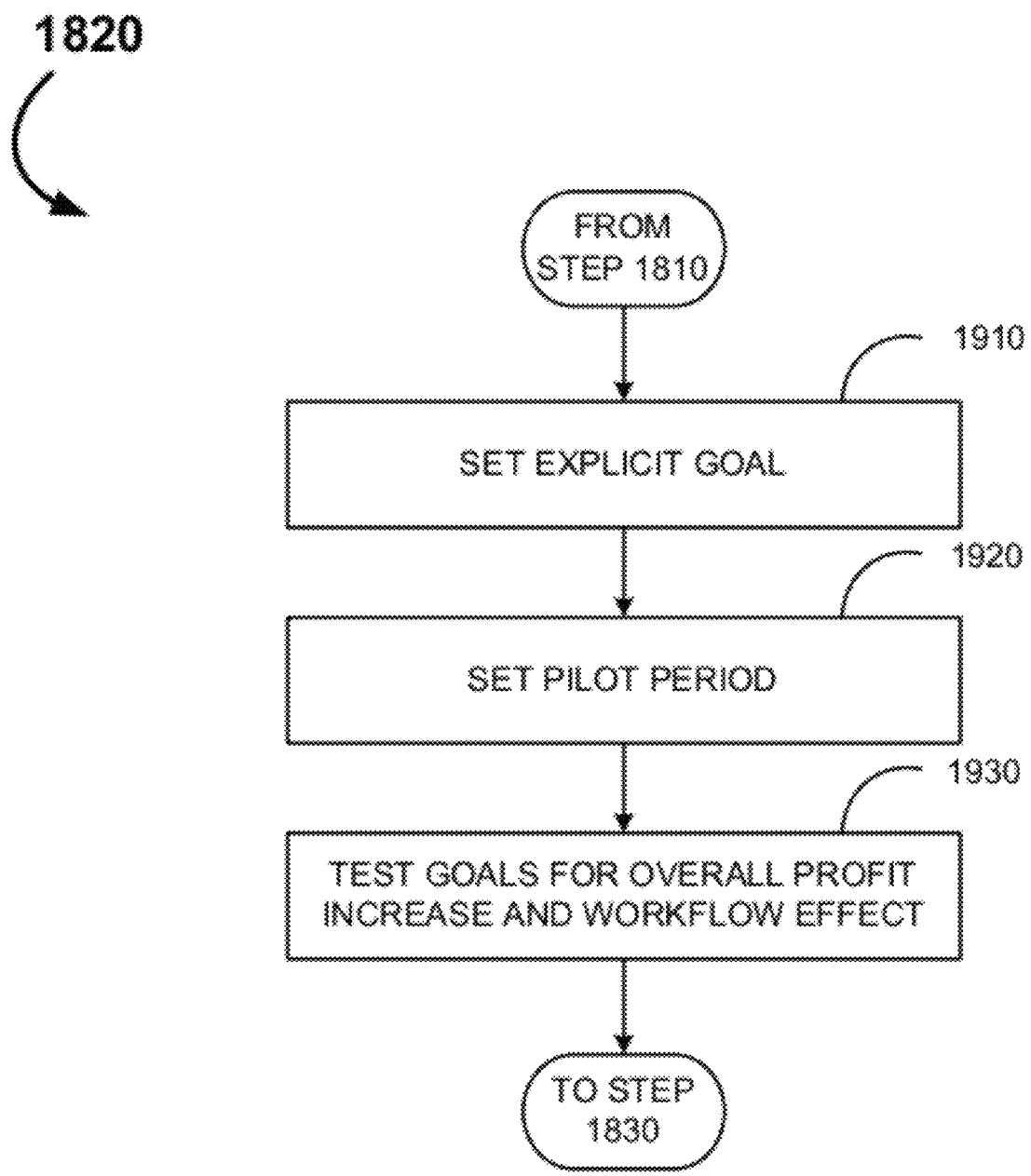
FIG. 19 is a flow chart illustrating an exemplary method for generating target prices of FIG. 18.

FIG. 19 is a flow chart illustrating an exemplary method for generating target prices, shown generally at 1820. Note that this exemplary embodiment of target price setting does not utilize pricing power and risk scores. Other methods for setting target prices may incorporate pricing power and risk factors in their determination.

The process begins from step 1810 of FIG. 18. The process then progresses to step 1910 where explicit target goals are set. These goals may sometimes be communicated to the sales force. These goals may be generated by managers, or sales executive, or may be generated by the price change allocation. Also, traditional price optimization techniques may be used in some situations to generate target goals.

At step 1920 a trial period may be set for the implementation of the prior mentioned goals. Typically, the time period set may be long enough as to generate meaningful data as to the effectiveness of the target prices, but in the event of harmful target prices, not long enough to damage profit level in a significant manner.

The process then progresses to step 1930 where the goals are tested using the collected transaction and deal data for profit changes. The results may then be used to revise the targets until an optimal target price is achieved. The process then concludes by progressing to step 1830 of FIG. 18.

C. Price Setting and Guidance Optimization Using Pricing Power and Risk

Figure 20:
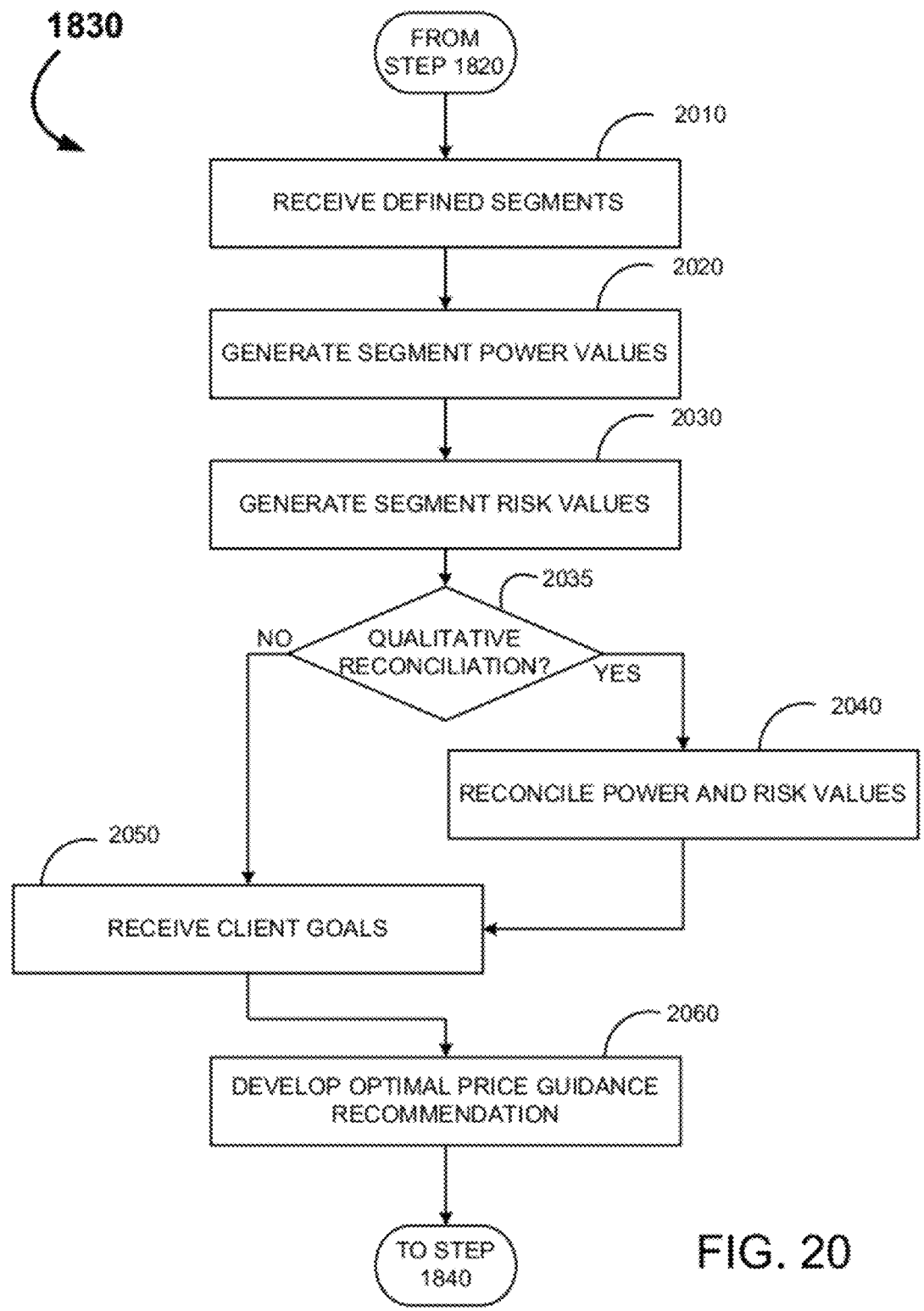
FIG. 20 is a flow chart illustrating an exemplary method for allocating price changes across the segments of FIG. 18.

FIG. 20 is a flow chart illustrating an exemplary method for allocating price changes across the segments, shown generally at 1830. The process begins from step 1820 of FIG. 18. The process then progresses to step 2010 where the defined segments are received. As previously mentioned, segments were defined at step 1520 of FIG. 17.

Then, at step 2020 initial quantitative pricing power values are generated for each of the given segments. Likewise, at step 2030 initial quantitative pricing risk values are generated for each of the given segments.

The process then progresses to step 2035 where an inquiry is made whether to perform a qualitative reconciliation on the initial quantitative pricing power and pricing risk values. If reconciliation is desired at step 2035, the process then progresses to step 2040 where qualitative and quantitative pricing power and risk scores are reconciled. This may also be referred to as calibration of the quantitative scores. Reconciliation of pricing power and risk scores will be discussed in more detail below.

After reconciliation of qualitative and quantitative scores, the process then progresses to step 2050 where client goals are received.

Else, if at step 2035 a qualitative score reconciliation is not desired, the process also progresses to step 2050 where the client goals, strategies and policies are received. As previously discussed, client goals, strategies and policies may include specific prices, price changes for one or more product or category, segment wide goals, pricing risk minimization, pricing power maximization, pricing power and pricing risk combination goals, global price changes, margin goals and volume goals.

After client goals are received the process then progresses to step 2060 where the pricing power and risk values are compared to the goals in order to develop optimal price guidance recommendations. This comparison may include pricing power and risk plot manipulation, mathematical manipulation of prices using pricing power and risk variables, or other desired technique. The process then concludes by progressing to step 1840 of FIG. 18.

Figure 21:
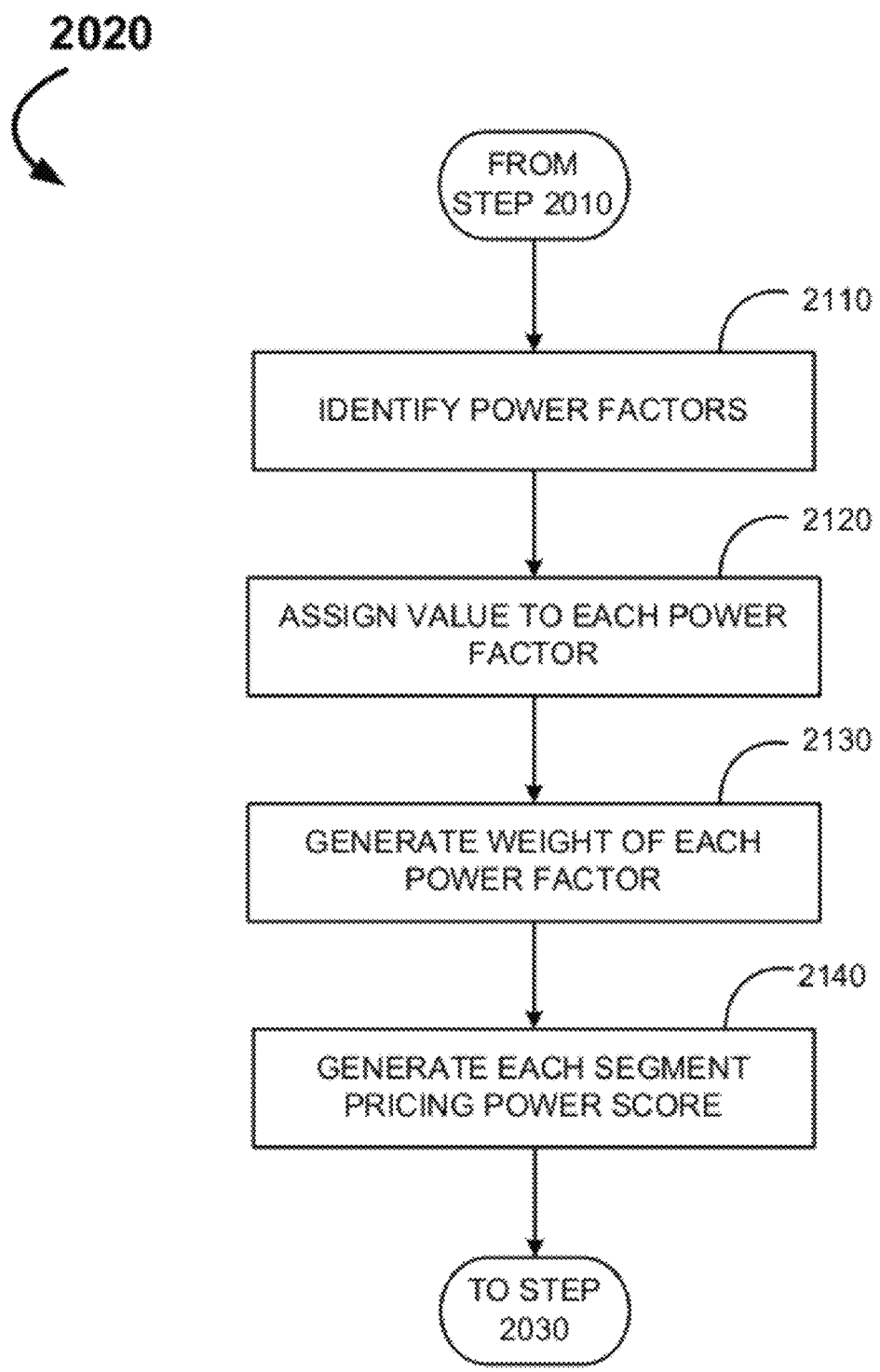
FIG. 21 is a flow chart illustrating an exemplary method for generating segment pricing power values of FIG. 20.

FIG. 21 is a flow chart illustrating an exemplary method for generating segment pricing power values, shown generally at 2020. The process begins from step 2010 of FIG. 20. The process then progresses to step 2110 where pricing power factors are identified. Pricing power factors may include any number of factors, including, but not limited to, price variances, approval escalations, win ratios, and elasticity to name a few. Pricing power factors may be identified by statistical means or may be generated by individuals with extensive business knowledge.

Initial values may then be assigned to each of the pricing power factors at step 2120. Some initial values may be readily quantified, such as win ratios. Other pricing power factor values may not be readily determined, and a generic value may be utilized instead. Alternatively, a value may be generated from related factors or by an experienced individual with extensive business knowledge.

The process then progresses to step 2130 where weights are generated for each pricing power factor. In some embodiments, the weightings are assigned according to a default configuration or industry experience. Other times, initial weights may be equal for all factors.

The weight for the pricing power factors may be used to take a weighted average of the pricing power factors for each segment at step 2140, thereby generating power scores for each segment. This weighted average of pricing power factors for the segment is the initial quantitative pricing power value for that segment. The process then concludes by progressing to step 2030 of FIG. 20.

Figure 22:
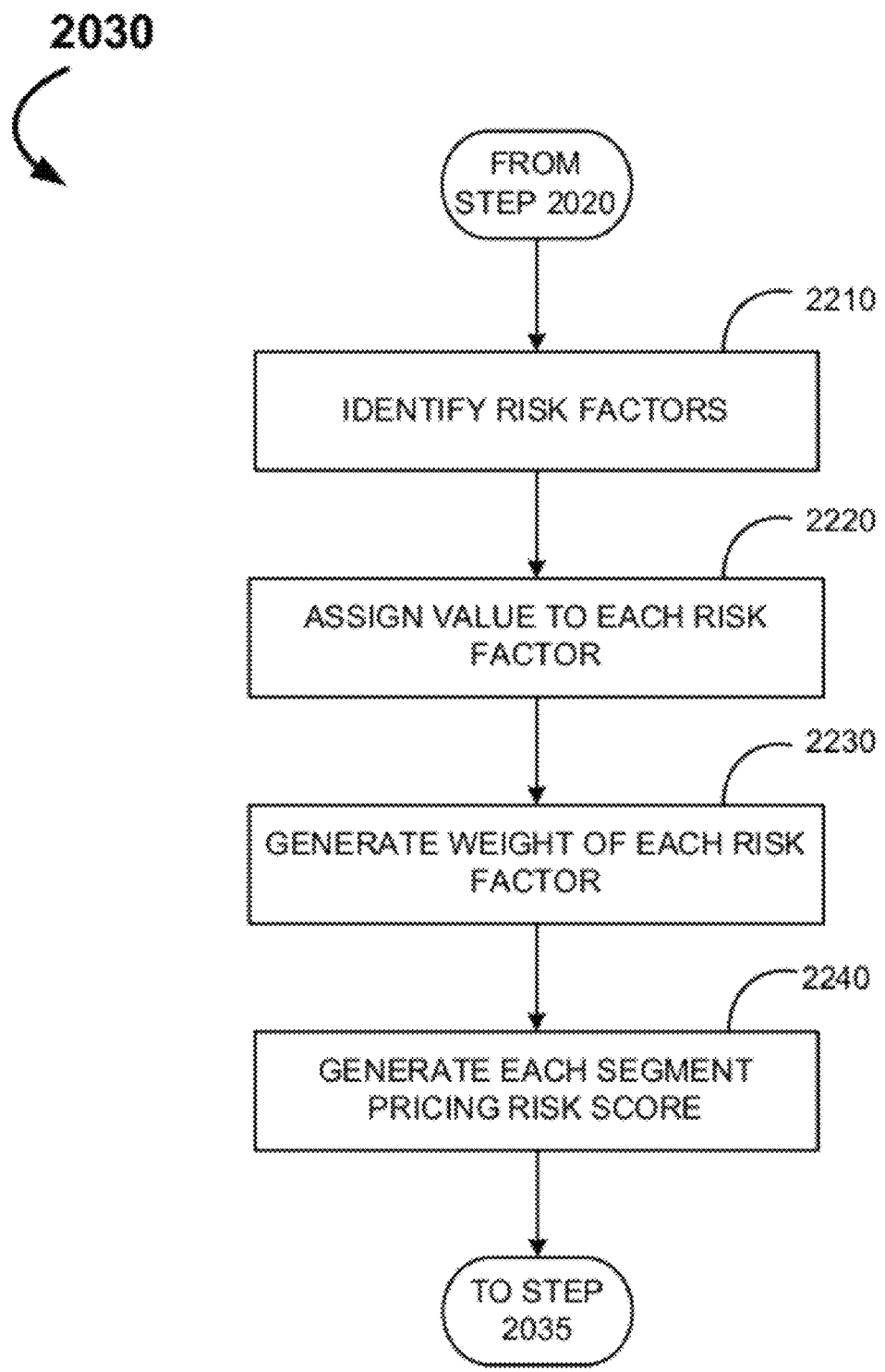
FIG. 22 is a flow chart illustrating an exemplary method for generating segment pricing risk values of FIG. 20.

FIG. 22 is a flow chart illustrating an exemplary method for generating segment pricing risk values, shown generally at 2030. Pricing Risk value generation is, in many ways, very similar to the generation of a pricing power value. The primary difference between generation of the pricing power and risk score is the factors considered.

The process begins from step 2020 of FIG. 20. The process then progresses to step 2210 where pricing risk factors are identified. Pricing Risk factors may include any number of factors, including, but not limited to, total sales, sales trends, margin and percent of total spend, to name a few. Pricing Risk factors may be identified by statistical means or may be generated by individuals with extensive business knowledge.

Initial values may then be assigned to each of the pricing risk factors at step 2220. Some initial values may be readily quantified, such as total sales. Other pricing risk factor values may not be readily determined, and a generic value may be utilized instead. Alternatively, a value may be generated from related factors or by an experienced individual with extensive business knowledge.

The process then progresses to step 2230 where weights are generated for each pricing risk factor. In some embodiments, the weightings are assigned according to a default configuration or business experience. Other times, initial weights may be equal for all factors.

The weight for the pricing risk factors may be used to take a weighted average of the pricing risk factors for each segment at step 2240, thereby generating risk scores for each segment. This weighted average of pricing risk factors for the segment is the initial quantitative pricing risk value for that segment. The process then concludes by progressing to step 2035 of FIG. 20.

Figure 23:
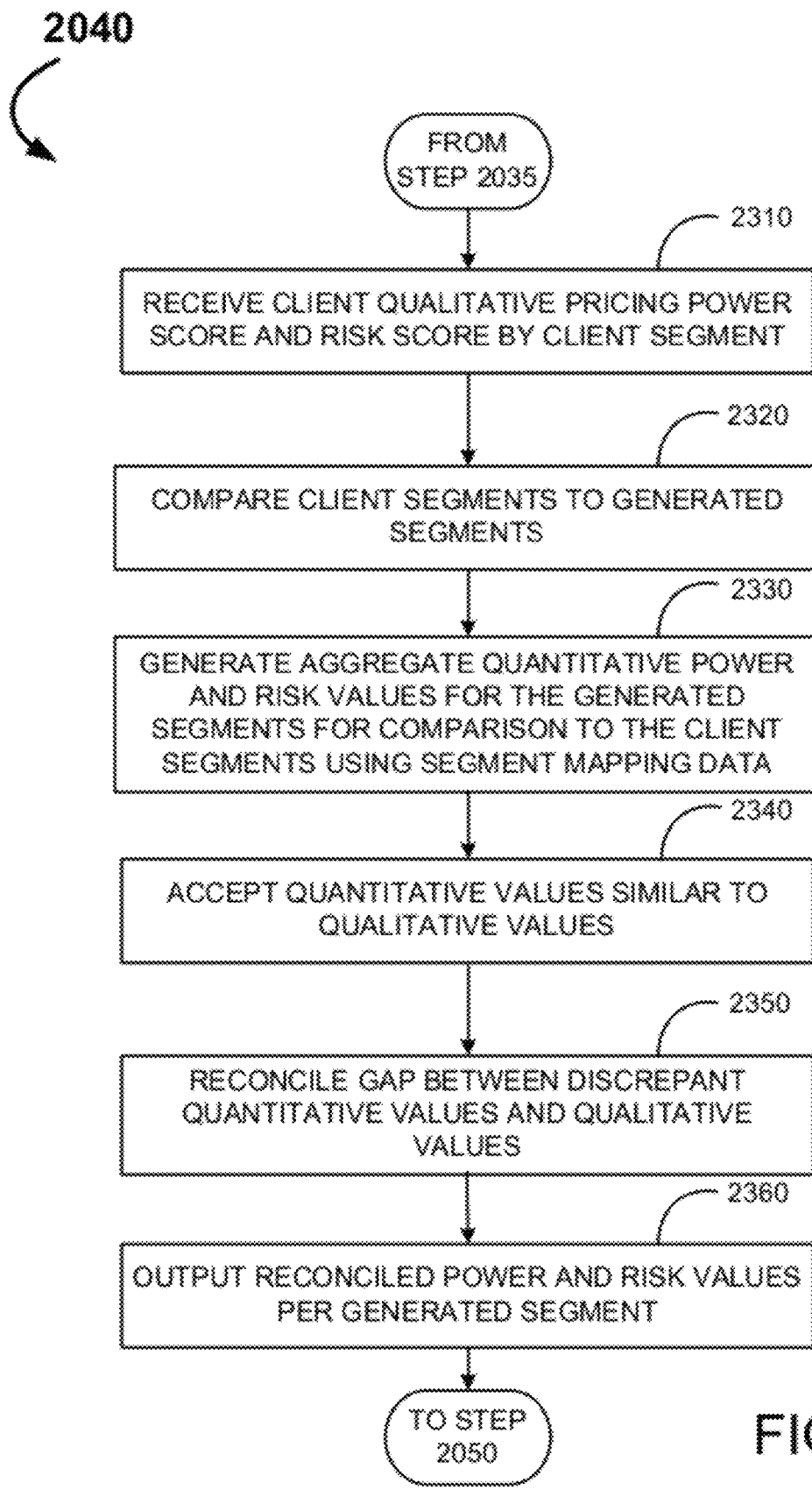
FIG. 23 is a flow chart illustrating an exemplary method for reconciling pricing power and risk values of FIG. 20.

FIG. 23 is a flow chart illustrating an exemplary method for reconciling pricing power and risk values, shown generally at 2040. The process begins from step 2035 of FIG. 20. The process then progresses to step 2310 where client qualitative pricing power and risk scores by client segment are received.

As previously mentioned, the clients typically have fewer "segments" in mind when viewing the business. This is due to the fact that humans are less capable for generating the fine level of segment granularity that the present invention is adept at performing. Moreover, for humans, larger, more distinct and identifiable segments are more easily analyzed. Thus, while the present invention may generate many hundreds, if not thousands, of segments, a human may divide the business up into a mere handful of segments. In order to keep these segments separate, the fewer human derived segments will be referred to as 'client segments', whereas the segments created by the present invention may be referred to as 'generated segments'.

Thus, the clients may provide pricing power and risk scores for each client segment. These client segment pricing power and risk scores may be referred to as qualitative scores. The qualitative pricing power and risk scores may be generated from the extensive business knowledge of the client.

The process then progresses to step 2320 where the generated segments are compared to the client segments. As there are many fewer client segments than generated segments, it may be found that many generated segments must be combined in order to include the same dimensions as a client segment. The grouping required to generate these 'aggregate segments' may be stored for the aggregation of quantitative pricing power and risk scores as detailed below.

At step 2330, the aggregate quantitative pricing power and risk scores are generated which correspond to the aggregate segments. The purpose of generating the aggregate quantitative scores is to have a comparable for the qualitative scores.

The aggregate quantitative pricing power score for each aggregate segment is generated by taking weighted averages of all the quantitative pricing power scores for each generated segment composing the aggregate segment. Likewise, the aggregate quantitative pricing risk score for each aggregate segment is generated by taking weighted averages of all the quantitative pricing risk scores for each generated segment composing the aggregate segment. The aggregates may be determined by using the segment mapping data.

The purpose of weighting the scores when performing the averages is that some generated segments tend to be of different sizes than other generated segments. Thus, the weighting may reflect these different sized segments. Weighting may be by segment profit, revenue, volume or other index of segment size.

The process then progresses to step 2340 where the aggregated quantitative scores for the aggregate segment are compared to the qualitative scores for the corresponding client segment. Scores which are similar may be accepted as accurate. Similarity of pricing power scores may be determined by comparing the difference between pricing power scores to a pricing power difference threshold. Likewise, similarity of pricing risk scores may be determined by comparing the difference between pricing risk scores to a pricing risk difference threshold. Scores with large gaps between the qualitative and quantitative scores may undergo further analysis.

At step 2350 the gap between qualitative scores and quantitative score may be reconciled. This reconciliation may involve modifying scores and ultimately calibrating the quantitative scores to the qualitative scores, in some embodiments.

The process then progresses to step 2360 where the reconciled pricing power and risk values for each generated segment are outputted. Reconciled pricing power and risk scores may include accepted quantitative scores, as well as calibrated quantitative scores. The process then concludes by progressing to step 2050 of FIG. 20.

Figure 24:
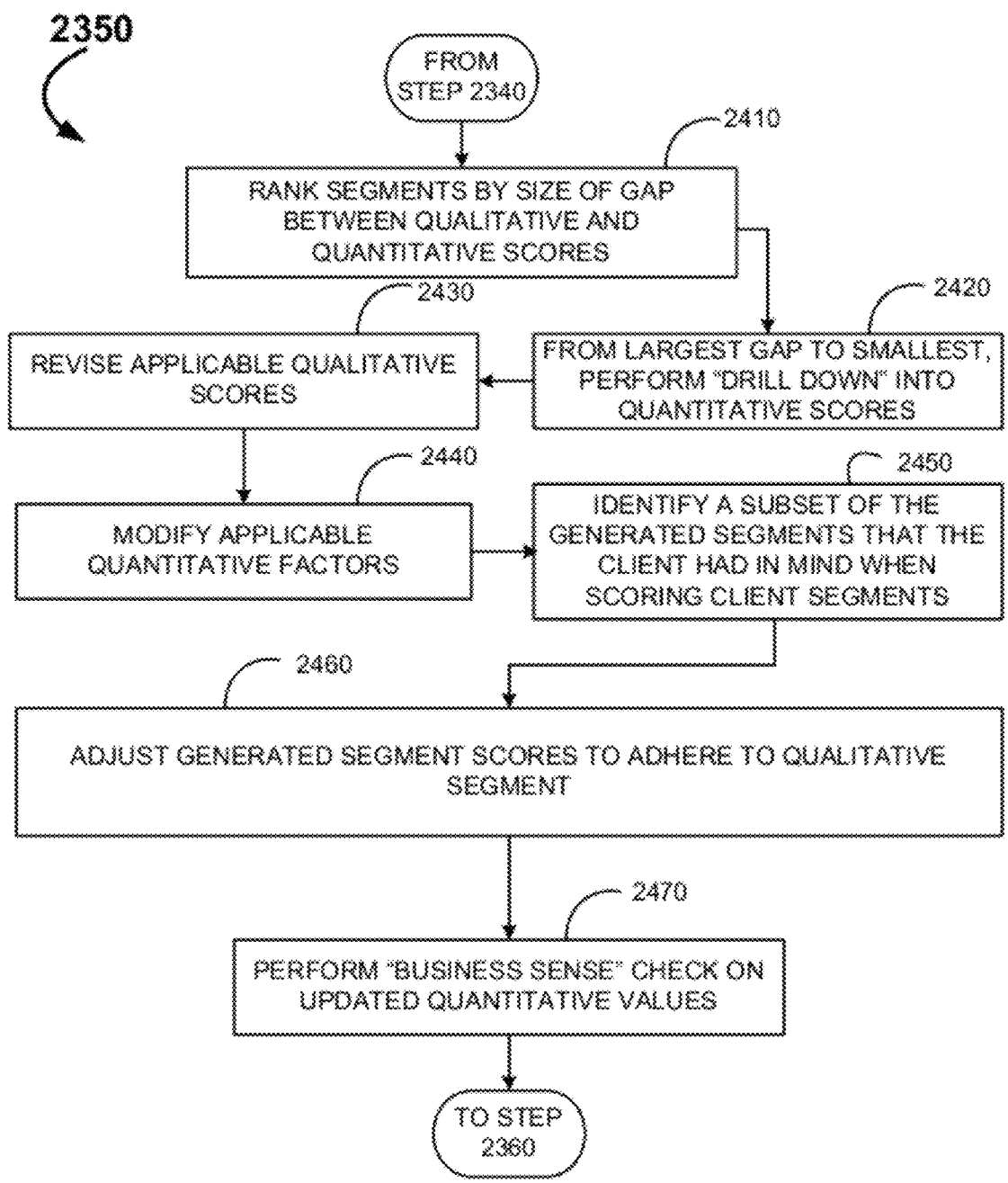
FIG. 24 is a flow chart illustrating an exemplary method for reconciling gap between discrepant quantitative values and qualitative values of FIG. 23.

FIG. 24 is a flow chart illustrating an exemplary method for reconciling gap between discrepant quantitative values and qualitative values, shown generally at 2350. The process begins from step 2340 of FIG. 23. The process then progresses to step 2410 where segments are ranked by the size of the gap between the quantitative scores and the qualitative scores.

In some embodiments, a "drill down" may be performed on each segment from the segment with the largest gap to that of the smallest gap, at step 2420. Of course drill down may occur in any order in some other embodiment. Likewise, in some alternate embodiments, drill down may occur for each segment in parallel.

A drill down includes an analysis of the driving factors behind the qualitative score and contrasting them to the factors driving the quantitative score. Often client input is desirous at this step. The purpose is to isolate and identify the cause(s) of the large gap between the qualitative score and the quantitative score. Often a factor was included, or overly relied upon, in the generation of one of the quantitative score or the qualitative score that was not adequately represented in the other score. Also, often the qualitative score was based upon some subset of the client segment, such as items that are most visible or the highest selling items.

A determination is made if a factor mistake was made and the mistake is corrected for. This may include adding or removing factors to one or both of the scores. Thus, applicable qualitative scores may be revised at step 2430, and applicable quantitative scores may be revised at step 2440.

Also, as noted above, segment inclusion may be checked at step 2450. The segment used in generating the qualitative score may be compared with the aggregate segment. A subset of the generated segments which the client had in mind when scoring the qualitative segment may then be identified. Ideally, the subset of generated segments includes all of the segments that were aggregated; however, often, due to human limitations, the qualitative segment may only account for a small portion of the segment, such as large ticket or highly visible items. The quantitative score may thus be adjusted such as to adhere to the qualitative scores at step 2460. This adjustment may be referred to as calibration of the quantitative scores. In some embodiments, the calibration of quantitative scores may be performed by reweighting the individual factors used to generate the quantitative scores. In some alternate embodiments, the calibration may be performed by a simple shift of all scores. Score shifts may include linear shifts, or nonlinear shifting.

At step 2470 a 'business sense' check may be performed on the updated quantitative values. Such a business sense check may actually involve an individual with extensive business knowledge reviewing the updates, or may include a check by a computer application which identifies and correct negative weights or similar aberrations. The process then concludes by progressing to step 2360 of FIG. 23.

Figure 25:
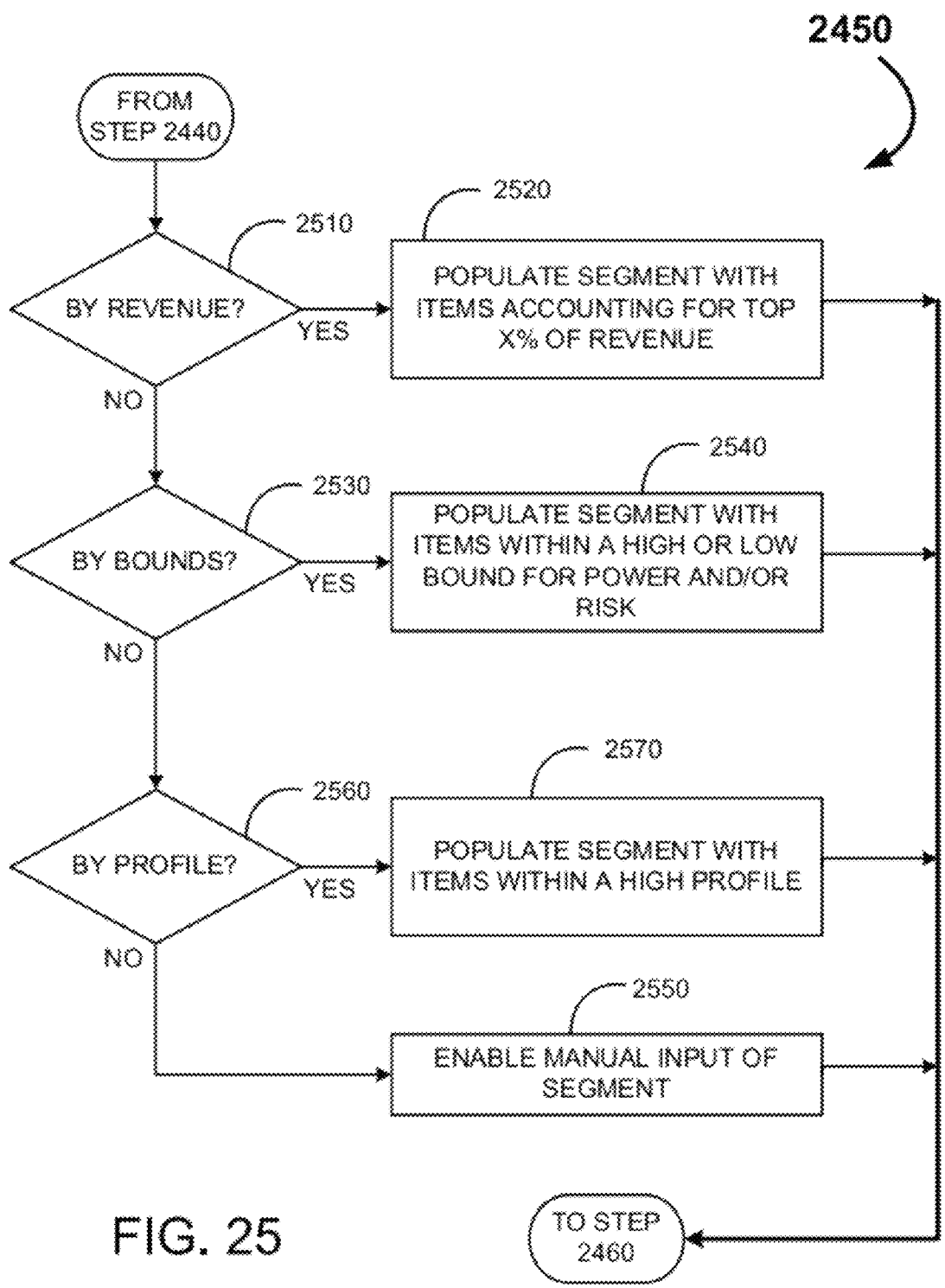
FIG. 25 is a flow chart illustrating an exemplary method for identifying a subset of quantitative segments to reflect what the client had in mind when generating qualitative scores of FIG. 24.

FIG. 25 is a flow chart illustrating an exemplary method for modifying quantitative segments to reflect client segments, shown generally at 2450. Note that this method for modifying segments to match the subset utilized to determine the qualitative segment is exemplary in nature. Additional methods may be utilized as is desirous.

The process begins from step 2440 of FIG. 24. The process then progresses to step 2510 where an inquiry is made whether to select the subset of generated segments to reflect the client segment using products accounting for the top revenue earned. If a revenue segment subset selection is desired, the process then progresses to step 2520 where the segment subset is populated with products which account for the top X % of revenue. The exact percentage cutoff for revenue may be configured to match the client segment subset. After the quantitative segment subset has been thus identified, the quantitative pricing power and risk scores may be calibrated such that the weighted averages of power and risk for the subset adheres to the qualitative scores. The process then concludes by progressing to step 2460 of FIG. 24.

Else, if at step 2510 a revenue modification is not desired, the process then progresses to step 2530 where an inquiry is made whether to populate the subset of the quantitative segment by bounds. If a bound based subset is desired the process then progresses to step 2540 where the segment subset is populated with products within some high or low bound for pricing power and/or pricing risk value. This situation arises when, in generating the qualitative segment, the client particularly relies upon a limited number of products in the segment that are particularly memorable. For example, if one product in the segment is sold to a single customer, generates a large profit margin, and is highly competitive, the client may be particularly worried about the loss of this subset of the segment. As a result, the qualitative pricing risk score may be set much higher due to the concern over this memorable segment subset.

After the quantitative segment subset has been thus identified by bounds, the quantitative pricing power and risk scores may be adjusted such that the weighted averages of power and risk for the subset adheres to the qualitative scores for. The process then concludes by progressing to step 2460 of FIG. 24.

Otherwise, if a bound segment subset selection is not desired at step 2530, the process then progresses to step 2560 where an inquiry is made whether to populate the subset of the quantitative segment by profile. If a profile based subset is desired, the process then progresses to step 2570 where the segment is populated with products within some high profile. This may be new or highly publicized segments, which tend to dominate the mind. This situation arises when, in generating the qualitative segment, the client particularly relies upon a limited number of products in the segment that are particularly memorable due to profile. For example, iPods or other "cool" or "hot" items may qualify as high profile items.

After the quantitative segment has been thus modified by profile, the quantitative pricing power and risk scores may be calibrated such that the weighted averages of power and risk for the subset adheres to the qualitative scores. The process then concludes by progressing to step 2460 of FIG. 24.

Else, if a profile selection of a segment subset is not desired at step 2560, the process then progresses to step 2550 where a manual segment subset selection is enabled. In this way an administrator, client user, or statistical factor identifier may assign the segment subset which reflects what was relied upon by the client in generation of the qualitative scores. After the quantitative segment subset has been thus identified, the quantitative pricing power and risk scores may be adjusted such that the weighted averages of power and risk for the subset adheres to the qualitative scores. The process then concludes by progressing to step 2460 of FIG. 24.

Figure 26:
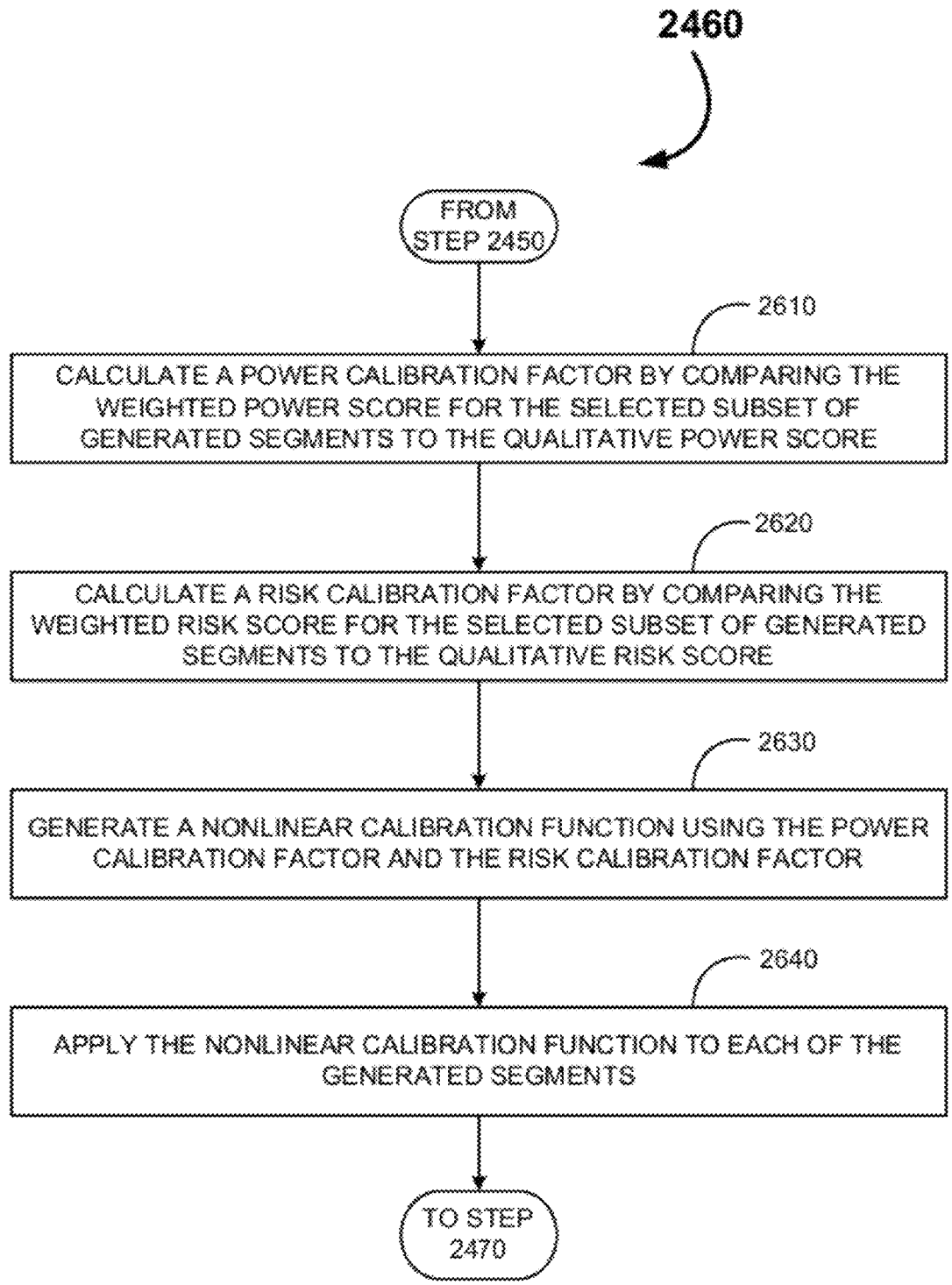
FIG. 26 is a flow chart illustrating an exemplary method for adjusting item level scores such that quantitative scores adhere to qualitative scores of FIG. 24.

FIG. 26 is a flow chart illustrating an exemplary method for adjusting item level scores such that quantitative scores adhere to qualitative scores, shown generally at 2460. The process begins from step 2450 of FIG. 24. The process then progresses to step 2610 where a power calibration factor is calculated by comparing the weighted power score for the selected subset of generated segments to the qualitative power score. Again, the selected subset of the generated segments is those segments the client had in mind when generating the client pricing power and risk scores (qualitative scores).

Likewise, at step 2620 a risk calibration factor is calculated by comparing the weighted risk score for the selected subset of generated segments to the qualitative risk score. The generated power calibration factor and risk calibration factor may then be used to define a calibration function, at step 2630.

Adjustment by the calibration function may include a linear adjustment, where all pricing power scores are shifted and/or scaled by some value, and each pricing risk score is likewise shifted and/or scaled by some value (ex. new risk score=$c_1+c_2$*old risk score). In some alternate embodiments, the adjustment may be nonlinear as to prevent scores from being shifted to out of bounds (i.e. less than 0% or greater than 100%).

The calibration function may then be applied to all of the generated segments (not just the subset) at step 2640. An important result of this calibration technique is that the spread of the pricing power and risk values for each generated segment is maintained after calibration. Thus, while each generated segment's quantitative pricing power and risk scores may be adjusted, these adjustments occur for all generated segments making up the aggregate segment, thereby preserving the relative differences in pricing power and risk scores for each segment.

Figure 27:
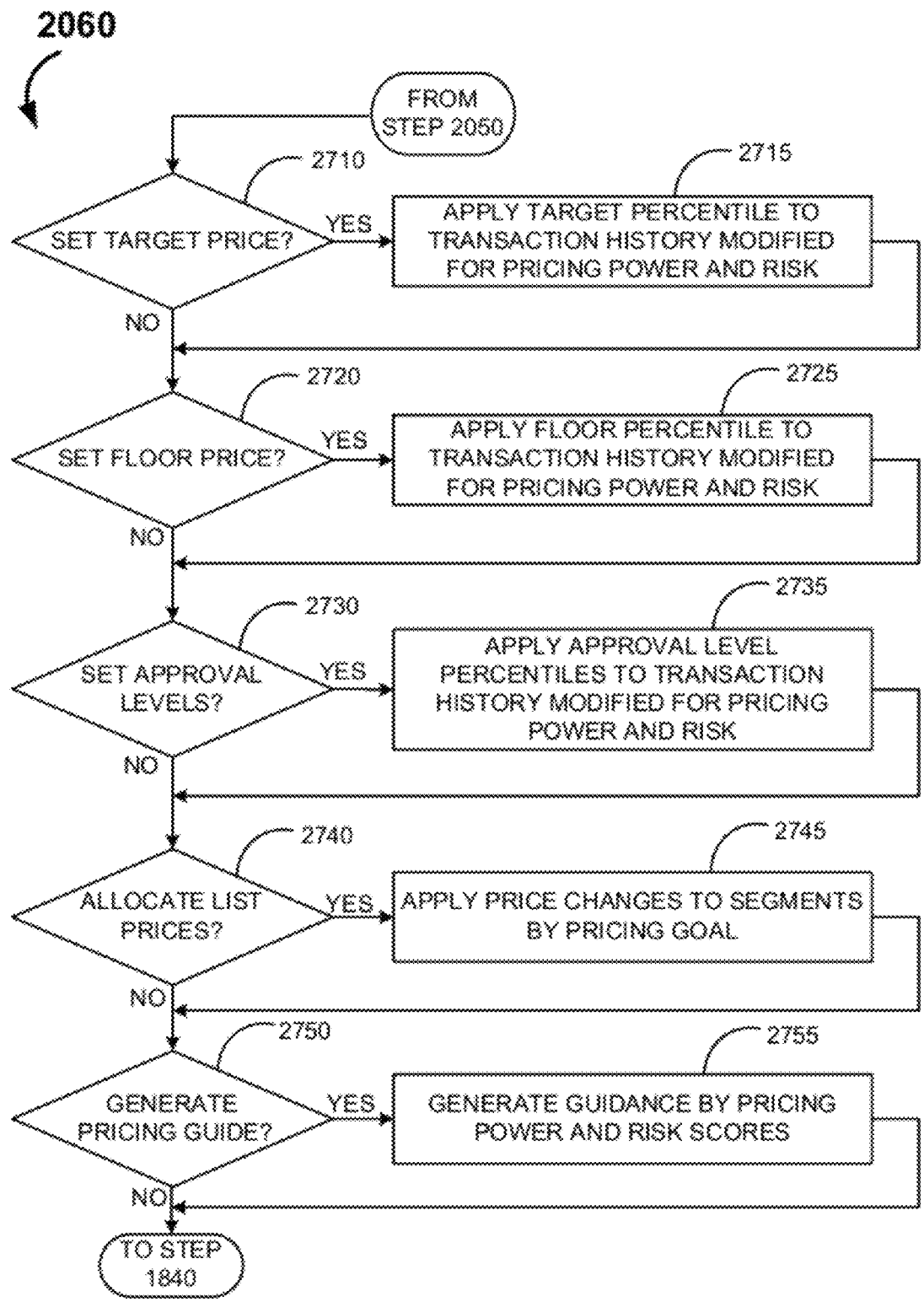
FIG. 27 is a flow chart illustrating an exemplary method for comparing pricing power and risk values to business goals to develop pricing suggestions of FIG. 20.

FIG. 27 is a flow chart illustrating an exemplary method for comparing pricing power and risk values to business goals to develop optimal pricing guidance, shown generally at 2060. The process begins from step 2050 of FIG. 20. The process then progresses to step 2710 where an inquiry is made whether to set target prices. If target prices are to be set, then the process progresses to step 2715 where the target prices are determined by looking up transaction history. The transaction history may be plotted as a curve of successful deals frequency by the deal price. A percentile is selected for the target price. Target price percentiles are typically high, such as the $80^{th}$ percentile. This percentile is applied to the transaction curve and the target price is selected. Thus, continuing the example, the target price is one in which 80% of the prior successful deals have a price below the target price. Selection of the target percentile may, in some embodiments, include analysis of the pricing power and risk of the given segment. Thus, for segments with high pricing risk and low pricing power, the target percentile may be lower, at $70^{th}$ percentile for example. Likewise, segments with low pricing risk and high power may be set higher, at $90^{th}$ percentile for example.

After target price is set, or if target price setting is not desired, the process may progress to step 2720 where an inquiry is made whether to set floor prices. If floor prices are to be set, then the process progresses to step 2725 where the floor prices are determined by looking up transaction history. As with target prices, the transaction history may be plotted as a curve of successful deals frequency by the deal price. A percentile is selected for the floor price. Floor prices are the absolute minimum deal price that may be accepted, thus floor price is typically relatively low, such as the $20^{th}$ percentile. The floor percentile is applied to the transaction curve and the floor price is selected. Selection of the floor percentile may, in some embodiments, include analysis of the pricing power and risk of the given segment.

After floor price is set, or if floor price setting is not desired, the process may progress to step 2730 where an inquiry is made whether to set approval level prices. If approval level prices are to be set, then the process progresses to step 2735 where the approval level prices are determined by looking up transaction history. As with floor and target prices, the transaction history may be plotted as a curve of successful deals frequency by the deal price. One or more percentiles are selected for the approval levels price. Each approval level corresponds to a price where escalation to a higher management level is required. Thus, for example, an approval level of $60^{th}$ percentile may require an escalation to a manager, while an approval level of $40^{th}$ percentile may require escalation to a vice president or higher. The approval percentiles are applied to the transaction curve and the approval level prices are selected. Selection of the approval level percentiles may, in some embodiments, include analysis of the pricing power and risk of the given segment.

After approval level prices are set, or if approval level price setting is not desired, the process may progress to step 2740 where an inquiry is made whether to allocate list prices. If list price allocation is desired, then the process progresses to step 2745 where a set price change is applied to segments by a pricing goal. Details of price allocation are discussed below.

After prices are allocated, or if price allocation is not desired, the process may progress to step 2750 where an inquiry is made whether to generate guidance. If guidance generation is desired, then the process progresses to step 2755 where pricing power and risk scores may be utilized to generate guidance for the sales force. This may include presentation of the raw pricing power and/or risk, or may include generating verbal pricing suggestions. For example, high pricing power for a given segment may translate to a phrase 'be aggressive in the deal negotiation' which may be presented to the sales force. Likewise, a high risk score may translate to the phrase 'be willing to make some concessions when asked.'

After guidance is generated, or if price guidance is not desired, the process may end by progressing to step 1840 of FIG. 18.

Figure 28:
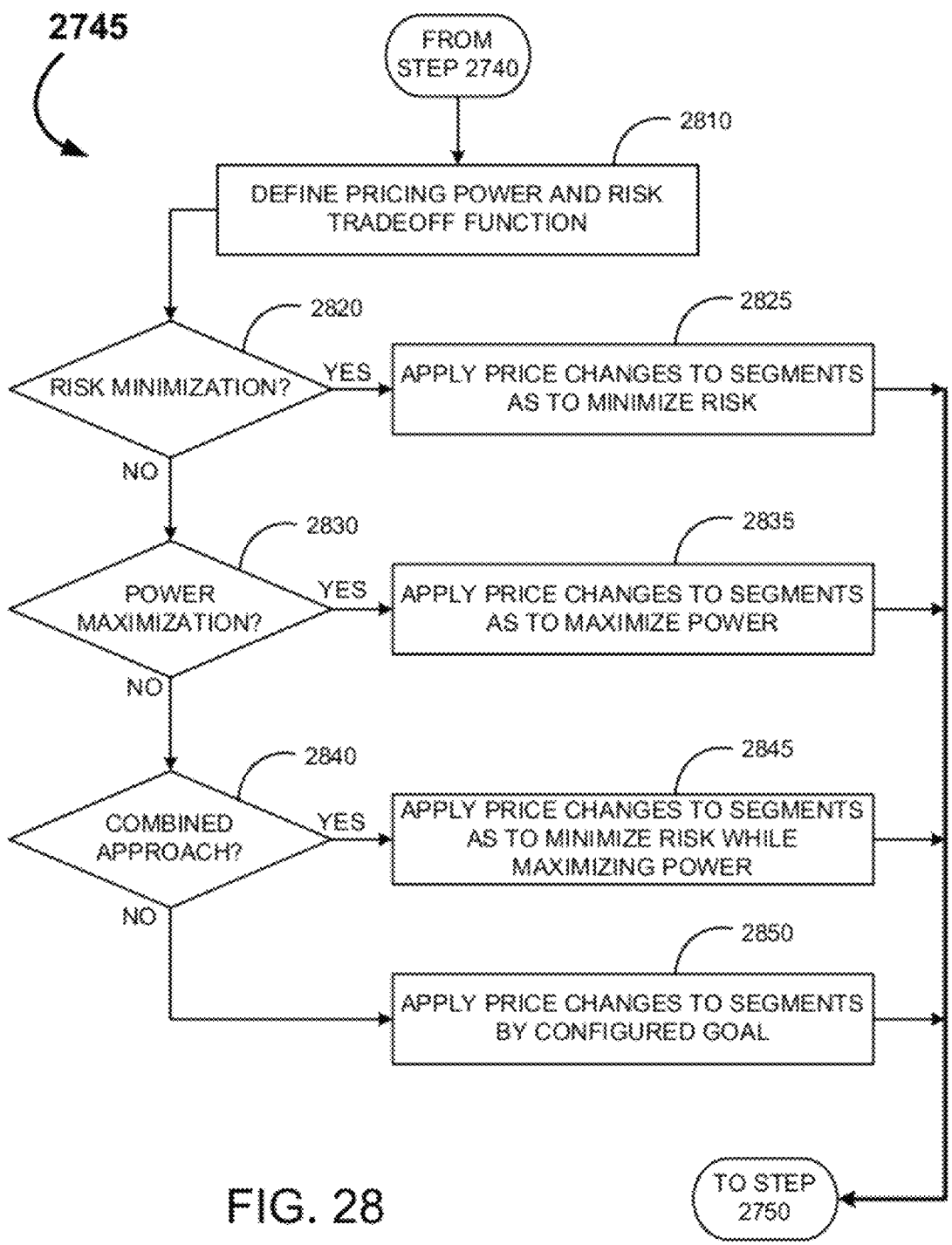
FIG. 28 is a flow chart illustrating an exemplary method for applying price changes to segments by pricing goals of FIG. 27.

FIG. 28 is a flow chart illustrating an exemplary method for applying price changes across segments, shown generally at 2745. The process begins from step 2740 of FIG. 27. The process then progresses to step 2810 where a pricing power and risk tradeoff function is defined. (ex. hyperbolic function). The pricing power and risk tradeoff function indicates the degree in which either pricing power or pricing risk is considered in the generation of tradeoff curves.

The process then progresses to step 2820 where an inquiry is made whether a pricing risk minimization goal has been provided. If pricing risk minimization is a goal, the process then progresses to step 2825 where price changes are applied across segments, utilizing the calibrated pricing risk scores for each segment, as to minimize the pricing risk of the price changes. Thus, typically, segments of low pricing risk may receive greater price increases, while high pricing risk segments may receive little or no price increase. In some situations, prices may actually be decreased for the segments exhibiting the largest pricing risk. After price changes are applied, the process then concludes by progressing to step 2750 of FIG. 27.

Else, if pricing risk minimization is not a goal at step 2820, the process then progresses to step 2830 where an inquiry is made whether a pricing power maximization goal has been provided. If pricing power maximization is a goal, the process then progresses to step 2835 where price changes are applied across segments, utilizing the calibrated pricing power scores for each segment, as to maximization the pricing power of the price changes. Thus, typically, segments of high pricing power may receive greater price increases, while low pricing power segments may receive little or no price increase. In some situations, prices may actually be decreased for the segments exhibiting the lowest pricing power. After price changes are applied, the process then concludes by progressing to step 2750 of FIG. 27.

Otherwise, if pricing power maximization is not a goal at step 2830, the process then progresses to step 2840 where an inquiry is made whether a combined approach goal has been provided. If using a combined approach is a goal, the process then progresses to step 2845 where price changes are applied across segments, utilizing the calibrated pricing power and pricing risk scores for each segment, as to maximize the pricing power and minimize pricing risks of the price changes. Thus, typically, segments of high pricing power and low pricing risk may receive greater price increases. Segments with low pricing power yet low pricing risk may receive marginal price increases, as will high pricing power and high pricing risk segments. Those segments with low pricing power and high pricing risk may receive little or no price increase. In some situations, prices may actually be decreased for the segments exhibiting the lowest pricing power and the highest pricing risk. The combined approach may utilize mathematical operations, or pricing power and pricing risk plot overlays. After price changes are applied, the process then concludes by progressing to step 2750 of FIG. 27.

Else, if a combined approach is not desired at step 2840, the process then progresses to step 2850 where any additional configured goal may be utilized to apply the price changes. This may include changing prices for segments including only particular products, sold to specific customers, or of a particular size. After price changes are applied, the process then concludes by progressing to step 2750 of FIG. 27.

Figure 29:
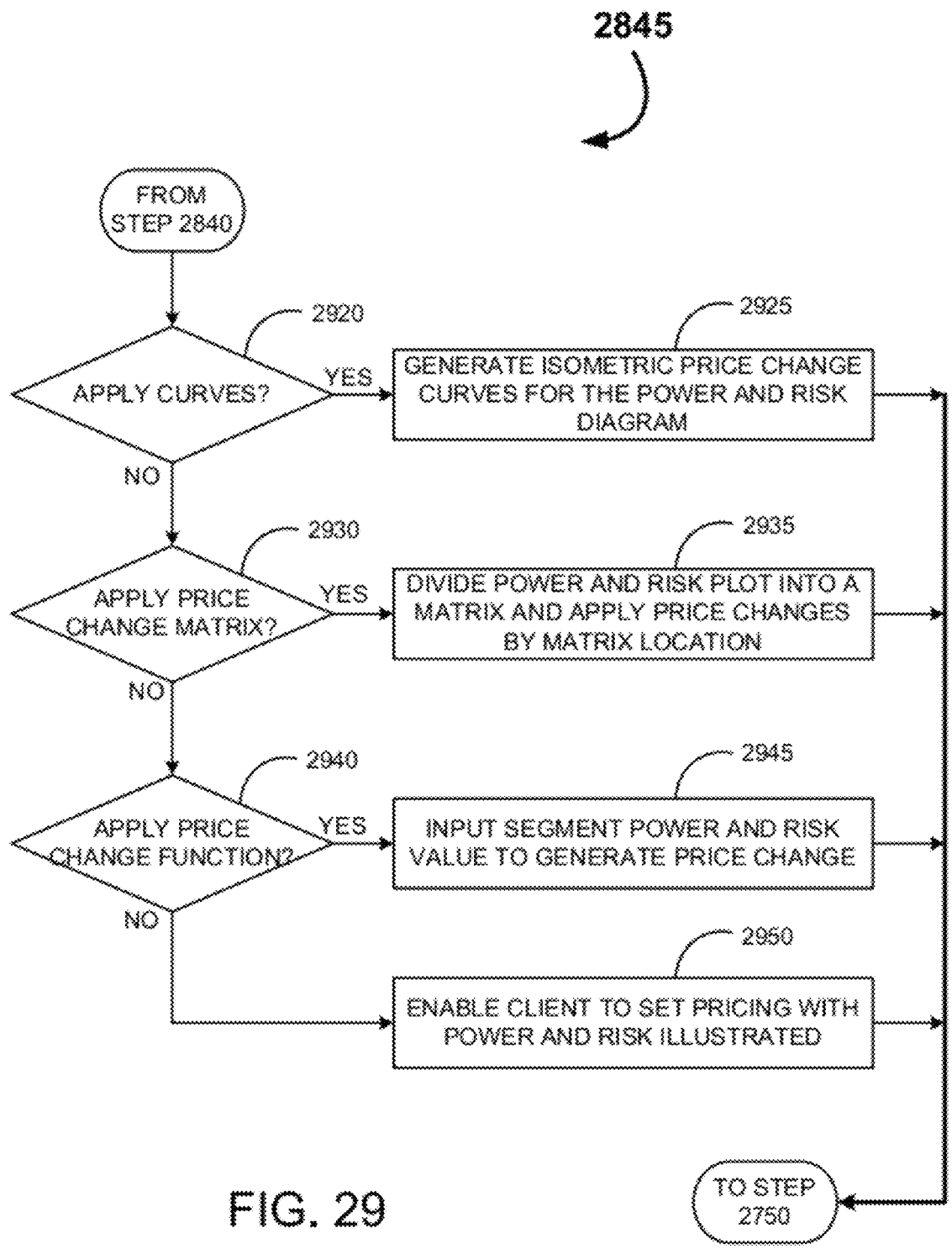
FIG. 29 is a flow chart illustrating an exemplary method for applying price changes to segments as to minimize pricing risk while maximizing pricing power of FIG. 28.

FIG. 29 is a flow chart illustrating an exemplary method for applying price changes to segments as to minimize pricing risk while maximizing pricing power, shown generally at 2845. The process begins from step 2840 of FIG. 28. The process then progresses to step 2920 where an inquiry is made whether to apply tradeoff curves to the pricing power and risk plot. If curve application is desired, the process then progresses to step 2925 where tradeoff curves may be applied to the pricing power and risk plot. For pricing risk minimization, curves are typically vertically oriented lines across the x-axis. For pricing power maximization, curves are typically horizontally oriented lines across the y-axis. For a combined approach, the curves are typically diagonal or radial curves across pricing power and pricing risk dimensions. Price changes may then be generated by referencing the segment location on the pricing power and risk plot in relation to the price change curve. After price setting, the process then concludes by progressing to step 2750 of FIG. 27.

Else, if curve application is not desired at step 2920, the process then progresses to step 2930 where an inquiry is made whether to apply a price change matrix to the pricing power and risk plot. If using a price change matrix is desired, the process then progresses to step 2935 where the pricing power and risk plot may be subdivided into a matrix of a configurable number of boxes. In some embodiments, every 10% of pricing power or risk change may be used to subdivide the pricing power risk plot, thereby resulting in a 100 point matrix. Of course other numbers of matrix blocks and division are considered within the scope of the invention. Price changes may be assigned to each box of the matrix. Price changes may then be generated by referencing the segment location on the pricing power and risk plot in relation to the price change matrix. After price setting, the process then concludes by progressing to step 2750 of FIG. 27.

The benefit of tradeoff curve and matrix usage for assigning price changes is that a highly intuitive and graphical representation of the price change operation may be provided to the client, as well as to the sales force.

Otherwise, if at step 2930 a price change matrix is not desired, the process then progresses to step 2940 where an inquiry is made whether to apply a function to derive price changes. If a function approach is desired, the process then progresses to step 2945 where segment pricing power and risk scores may be inputted into a function, along with the total price change goals. The function may then provide an output of the applicable price change by segment. After price setting, the process then concludes by progressing to step 2750 of FIG. 27.

Else, if at step 2940 a price change function is not desired, the process then progresses to step 2950 where the client may be provided with the segment pricing power and risk scores. The client may then be enabled to set prices. After price setting the process then concludes by progressing to step 2750 of FIG. 27.

D. Deal Evaluation

Figure 30:
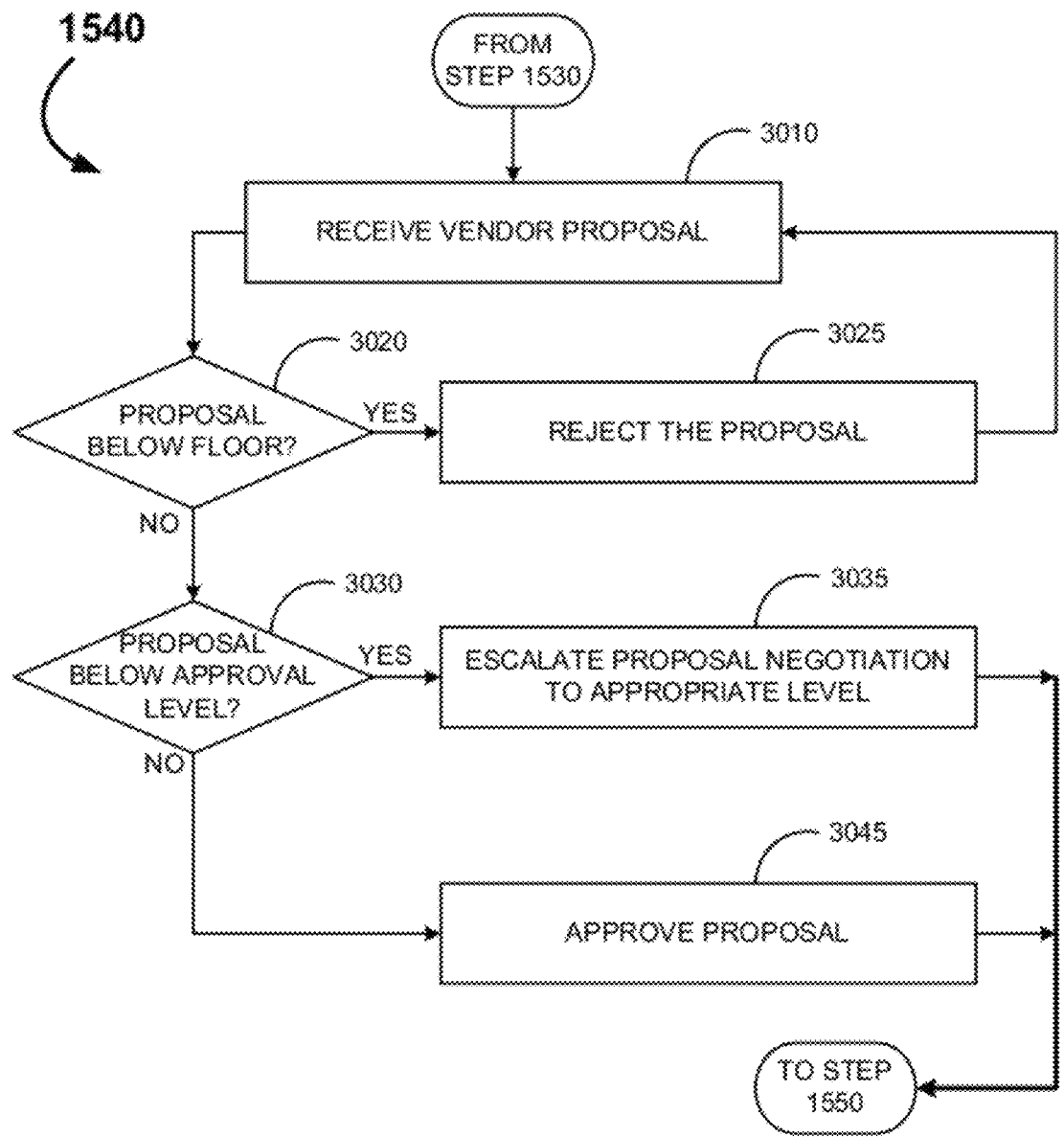
FIG. 30 is a flow chart illustrating an exemplary method for evaluating a vendor proposal of FIG. 29.

FIG. 30 is a flow chart illustrating an exemplary method for negotiating a deal, shown generally at 1540. The process begins from step 1530 of FIG. 15. The process than progresses to step 3010 where a vendor proposal is received. A vendor proposal represents an initial step in a negotiation process that may encompass many transactions. A vendor proposal generally may contain enough relevant information for the proposal to be properly evaluated. Relevant information may include without limitation, account name, user name, general terms, shipping terms, bid type, bid date, pricing, product descriptions, and other generally known terms well known in the art. Guidance may be presented along with the proposals.

An inquiry is then made if the proposal is below the floor price, at step 3020. If the proposal is below the floor price, the proposal may be rejected at step 3025. If the proposal is rejected, negotiations may terminate. However, if negotiations continue, a new renegotiated proposal may be again received at step 3010.

Else, if the proposal is above the floor price at step 3020, the process continues to step 3030 where an inquiry is made as to whether the proposal is below one or more of the approval level prices. If the proposal is below an approval level, the process progresses to step 3035 where the proposal negotiation is escalated to the appropriate level. Escalation may be to an immediate superior or to a higher level depending upon the proposal price, vendor class, and deal size. Thus, for an important customer, in a large deal, with a low approval level, escalation may even reach CEO or Board levels. The escalation results in the approval or rejection of the proposal. After escalation, the process ends by progressing to step 1550 of FIG. 15.

Otherwise, if the proposal is above the approval levels at step 3030, the process may progress to step 3045 where the proposal is approved. After approval, the process ends by progressing to step 1550 of FIG. 15.

IV. Examples

A. Pricing Power and Risk Plots and Manipulations

Figure 31:
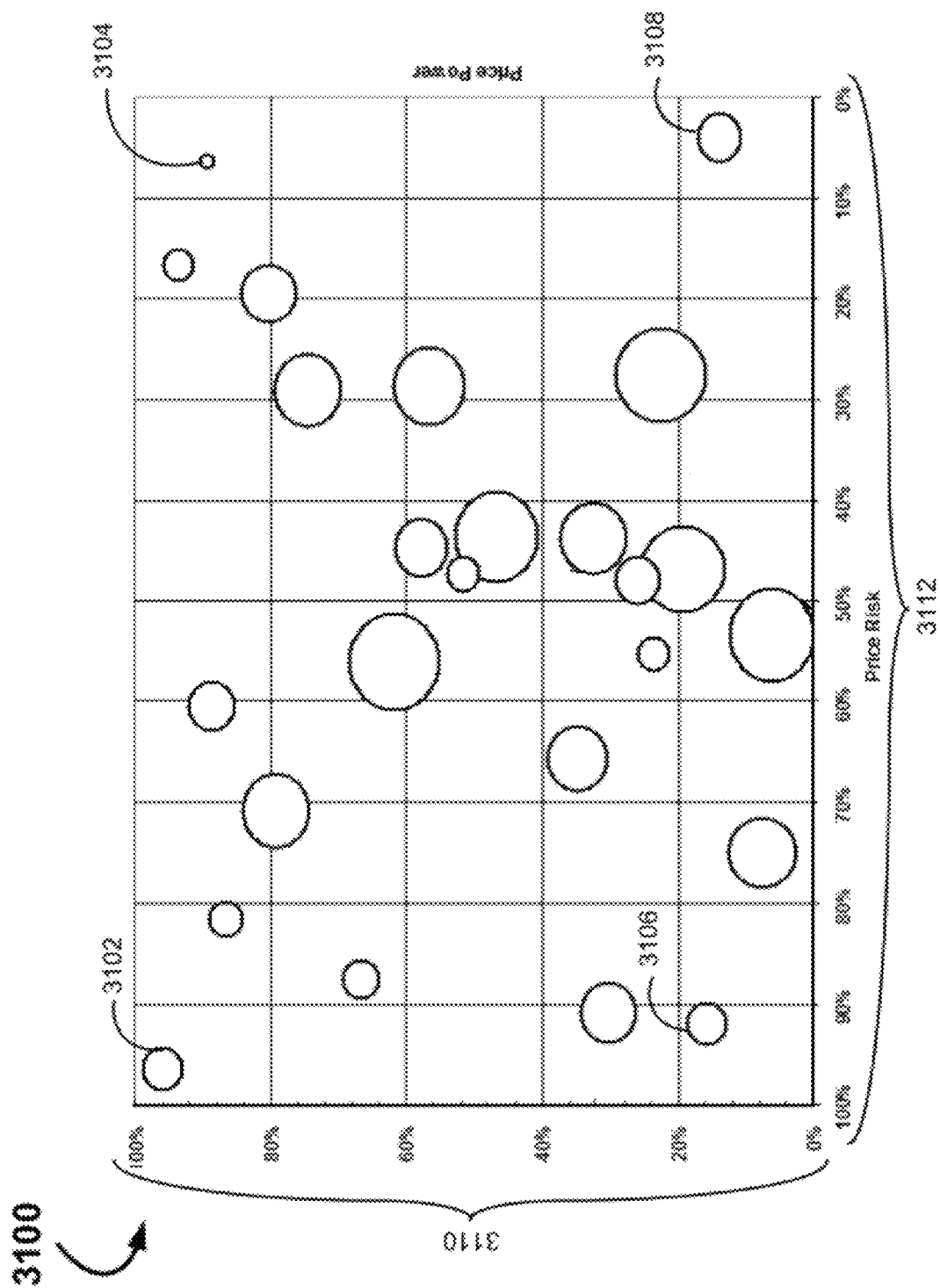
FIG. 31 is an illustrative example of a pricing power and risk segment plot in accordance with an embodiment of the present invention.

FIG. 31 is an illustrative example of a pricing power and risk segment plot in accordance with an embodiment of the present invention, shown generally at 3100. As may be seen, Price Power 3110 may be a percentage value and is assigned to the vertical axis of the pricing power and risk plot. Likewise, Price Risk 3112 may be in a percentile score and may span the horizontal axis.

Segments may be seen as circles, or 'bubbles', on the pricing power and risk plot. Some example segments have been labeled as 3102, 3104, 3106 and 3108, respectively. The location of the segment bubble may indicate the relative pricing power and risk score for the segment. The varying size of the segment bubble may indicate the size of the segment. As previously noted, segment size may be determined by revenue, profit, volume, margin or any other viable indices.

Thus, for example, segment 3104 is a small segment with a relatively low pricing risk and high pricing power score. Price changes will be most successful for segments such as 3104. Segment 3102, a mid-sized segment, also has a high pricing power, but also has a high pricing risk. On the opposite side of the spectrum, segment 3108, a mid-sized segment, has very low pricing power, but also very low pricing risk. Lastly, exemplary segment 3106 has both high pricing risk and low pricing power. Prices for segments like 3106 typically are not increased and may even be decreased in some situations.

FIG. 32 is an illustrative example of a pricing power and risk table for exemplary segments in accordance with an embodiment of the present invention, shown generally at 3200. This segment table is simplified for the sake of clarity. Identification Columns 3202 may indicate the segment's sub family and segment ID. Provided are examples of segments in an accessory subfamily.

Qualitative scores for pricing power and risk may be received by the client and displayed at Qualitative Columns 3204. Likewise, the aggregate quantitative scores for pricing power and risk generated for the aggregate segments may be provided at the Quantitative Columns 3206.

The gap between the qualitative scores and the quantitative scores may be provided at Gap Columns 3208. Thus, the segment labeled 'A1' is seen to have relatively small gaps at 10 for pricing power and 8 for pricing risk. Contrary, segment 'other' has relatively large gaps at 53 for pricing power and 20 for pricing risk.

Figure 33:
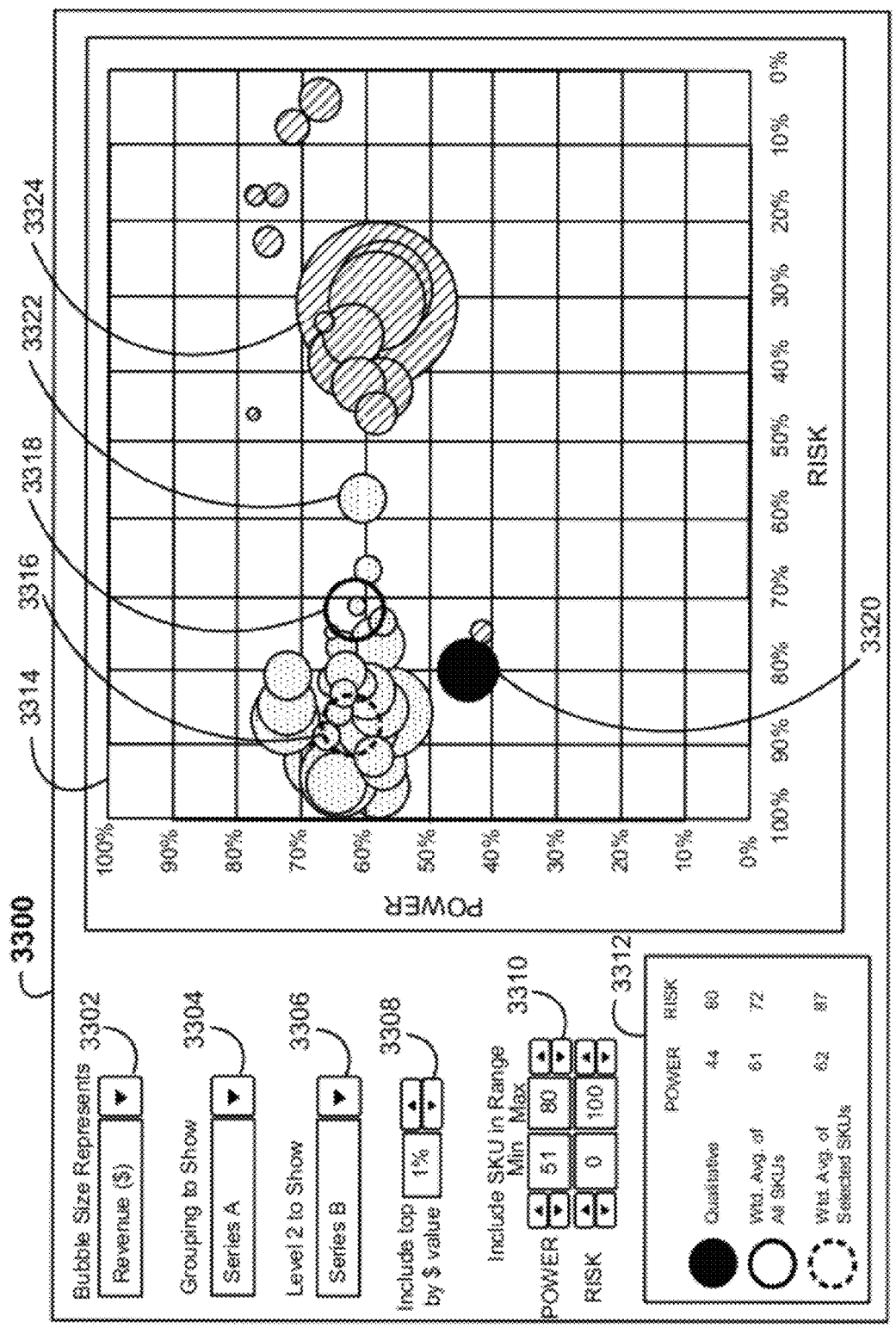
FIG. 33 is an illustrative example of a pricing power and risk segment plot in an interface in accordance with an embodiment of the present invention.

FIG. 33 is an illustrative example of a pricing power and risk segment plot in an Interface Screen 3300 in accordance with an embodiment of the present invention. The Interface Screen 3300 may include a Pricing Power and Risk Plot 3314, a Plot Key 3312 and various controls. The controls may include a Sizing Selector 3302, which determines how the segment sizing is determined. Here the revenue of the segments is used to determine size.

Show Controls 3304 and 3306 provide user control of which segment groupings to display on the Pricing Power and Risk Plot 3314. Here a 'Series A' Segment Grouping 3322 is displayed (dot filled segment bubbles) using Show control 3304. Also, a 'Series B' Segment Grouping 3324 is displayed (line filled segment bubbles) using Show control 3306.

The displayed segments may be narrowed by those segments representing a certain level of value at the Value selector 3306. The displayed segments may be further narrowed by the Bounds Selector 3310. The Bounds Selector 3310 may indicate cutoffs for pricing power and risk scores for segments that are to be displayed on the Pricing Power and Risk Plot 3314.

As identified in the Plot Key 3312, a Qualitative Score 3320 may be seen on the Pricing Power and Risk Plot 3314. This Qualitative Score 3320 may be for the client segment. All other segments shown on the Pricing Power and Risk Plot 3314, including the 'Series A' Segment Grouping 3322 and the 'Series B' Segment Grouping 3324, may be generated segments which when combined may equal an aggregate segment that is equal to the client segment. Thus, the Aggregated Quantitative Pricing Power and Risk Scores 3318 for all the illustrated generated segments may be seen. Alternatively, the aggregated quantitative pricing power and risk scores for 'Series A' Segment Grouping 3322 may be seen at 3316.

In some situations, the 'Series A' Segment Grouping 3322 may be a more visible set of products, and thus the Qualitative Score 3320 may have been generated with this segment grouping, rather than both 'series A and B', in mind. This may be of importance when reconciling scores as is illustrated below.

Figure 34:
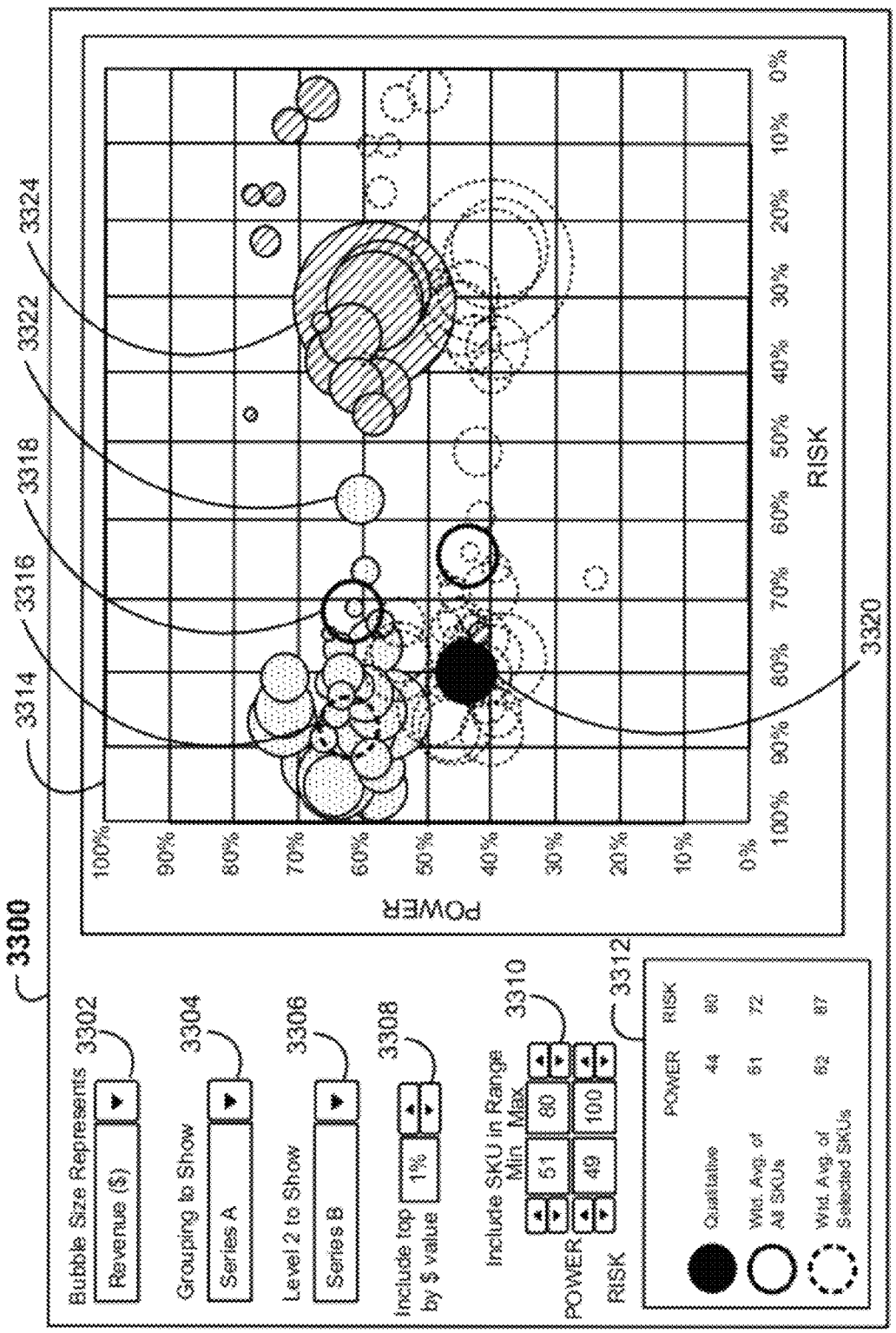
FIG. 34 is an illustrative example of the pricing power and risk segment plot in the interface and illustrating a pricing power and risk reconciliation in accordance with an embodiment of the present invention.

FIG. 34 is an illustrative example of the pricing power and risk segment plot in the Interface Screen 3300 and illustrating a pricing power and risk reconciliation in accordance with an embodiment of the present invention. As noted above, the 'Series A' Aggregate Quantitative Score 3316 is the comparable score to the Qualitative Score 3320. Thus, for pricing power and risk score calibration the 'Series A' Aggregate Quantitative Score 3316 may be compared to the Qualitative Score 3320 to generate a calibration factor. This calibration factor may then be applied to all generated segments (including both 'series A' and 'series B'). The resulting calibrated quantitative scores may be seen as dotted outlines below and to the right of the original positions. These calibrated quantitative scores may be provided for price allocation and business guidance.

Figure 35:
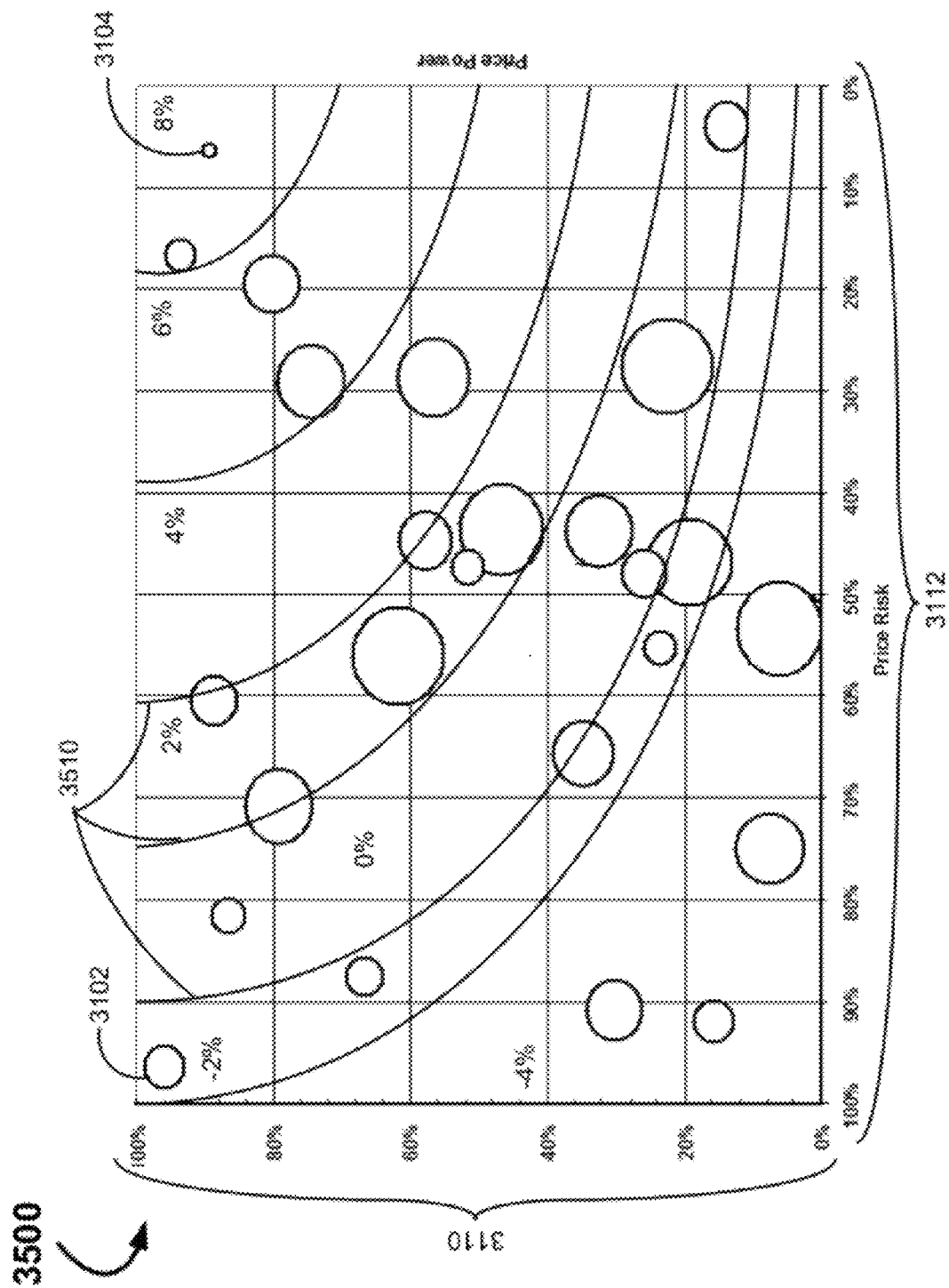
FIG. 35 is an illustrative example of a pricing power and risk segment plot with price change guidance tradeoff contours in accordance with an embodiment of the present invention.

FIG. 35 is an illustrative example of a pricing power and risk segment plot with price change guidance Tradeoff Contours 3510 in accordance with an embodiment of the present invention, shown generally at 3500. Again the Price Power 3110 and Price Risk 3112 may be seen. Between the Contours 3510 is the applied price change. Thus, the exemplary segment 3102 may receive a −2% price change, whereas segment 3104 may be increased by 6%. Such a tradeoff contour layout may reflect a combined approach, thereby taking into account both pricing power and pricing risk in determining price changes. Note that this tradeoff contour map is merely exemplary in nature and not intended to limit the invention in any way.

Figure 36:
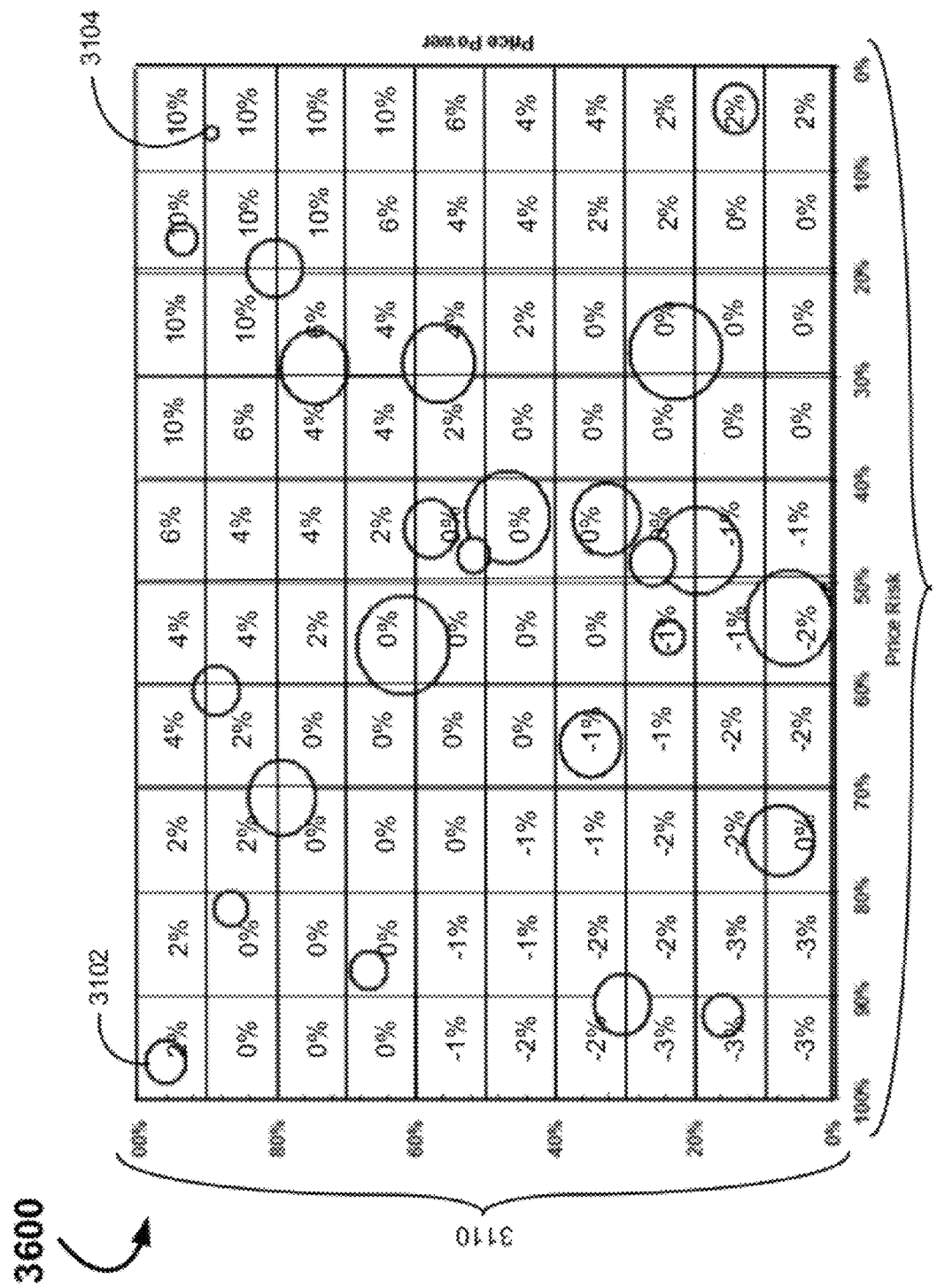
FIG. 36 is an illustrative example of a pricing power and risk segment plot with an applied price change matrix in accordance with an embodiment of the present invention.

FIG. 36 is an illustrative example of a pricing power and risk segment plot with an applied price change matrix in accordance with an embodiment of the present invention, shown generally at 3600. Again the Price Power 3110 and Price Risk 3112 may be seen. In this example, the matrix is divided by increments of 10% both in the pricing power and risk dimensions. Of course, additional divisions of the matrix are possible.

Price change values are assigned to each block of the matrix. Thus, depending upon where any given segment falls, the appropriate price change may be applied. In this example, segment 3104 may receive a 10% pricing increase. Note that this exemplary matrix overlay is merely exemplary in nature and not intended to limit the invention in any way.

B. Vehicle Price Optimization

All remaining FIGS. 37 to 46 pertain to a cohesive example of particular generated and client segments for vehicles. Values for pricing risk, power, revenue factors for these exemplary segments is likewise provided. It is noted that all segment data relating to this example are intended to be illustrative in nature and do not represent limitations of the present invention.

Figure 37:
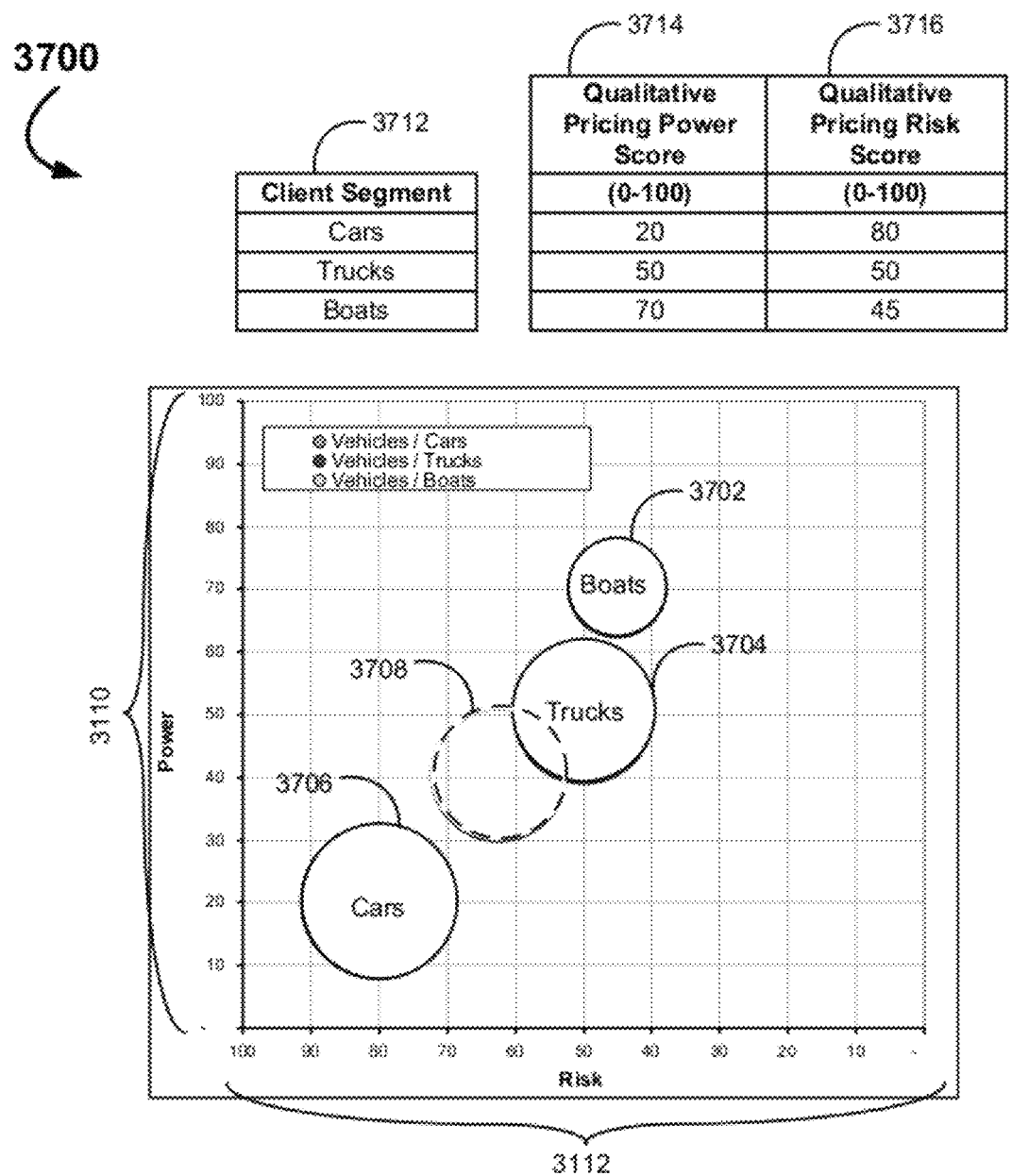
FIG. 37 is an illustrative example of a pricing power and risk segment plot for three exemplary client segments in accordance with an embodiment of the present invention.

FIG. 37 is an illustrative example of a pricing power and risk segment plot for three exemplary client segments, shown generally at 3700. Here a Table 3712 of the client segments is provided. The client in this particular example may be a distributor of automotive and aquatic vehicles. These Client segments, defined as the segments the client selects as representing her business, include cars, truck and boats.

The client has provided qualitative pricing power scores for the client segments, illustrated at the Qualitative Power Table 3714. Likewise, the client has provided qualitative pricing risk scores for the client segments, illustrated at the Qualitative Risk Table 3716. These qualitative pricing power and risks scores have been plotted on the illustrated power and risk plot.

The power and risk plot may include Risk on the X-axis, illustrated by 3112. Pricing power, on the Y-axis, may be seen illustrated by 3110. A bubble plot may be seen, where the size of the bubble corresponds to the revenue size of the particular client segment. Thus, Cars are plotted at 3706 as having low qualitative risk and power, and the bubble is large since this segment composes a large portion of the client's revenue. Trucks are seen at 3704 and Boats are illustrated at 3702. A weighted average of the qualitative pricing power and risk scores may be seen at 3708.

FIG. 38 is an exemplary table of quantitative pricing power and risk factors and scores for exemplary generated segments, shown generally at 3800. The generated segments typically are more finely segmented as compared to client segments. The generated segments, in this example, may include sedans, roadsters, hatchbacks, SUVs, pickup trucks, vans, yachts, speedboats and cruisers. Of these generated segments, they may be aggregated into aggregate segments which correspond to the client segments. Thus, sedans, roadsters and hatchbacks may be aggregated to be the equivalent to the 'cars' client segment. SUVs, pickup trucks and vans may be aggregated to be the equivalent to the 'trucks' client segment. And lastly, yachts, speedboats and cruisers may be aggregated to be the equivalent to the 'boats' client segment. This segment aggregation is illustrated at 3802.

The number of customers purchasing from each generated segment, as well as the profit contribution of each generated segment may be seen at 3804. These, for this example, have been identified as the pricing risk factors. Profit contribution may be automatically calculated from transaction history. The higher profit contribution may be related to a higher pricing risk as loss of the segment may be very damaging to the overall profitability of the client. The number of customers per generated segment may likewise be determined from transaction history. The greater the number of customers, the less risk exposure since loss of one of the customers may not significantly reduce sales within the segment.

Similarly, the capacity utilization and Coefficient of Variation (CoV) of unit price of each generated segment may be seen at 3806. These, for this example, have been identified as the pricing power factors. Higher capacity utilization results in an increase in pricing power. Capacity utilization is typically an entered value of 0-100%. The Coefficient of Variation of the unit price may be calculated from the transaction history. Typically, larger variation in unit price relates to a greater pricing power.

Weights are assigned to the pricing power and risk factors. The risk factors are then normalized, as seen at 3808. Weights are applied to the normalized risk factors and the resulting Raw Quantitative Risk scores are displayed at 3808. Likewise, the power factors are then normalized, as seen at 3810. Weights are applied to the normalized power factors and the resulting Raw Quantitative Power scores are displayed at 3810.

Figure 39:
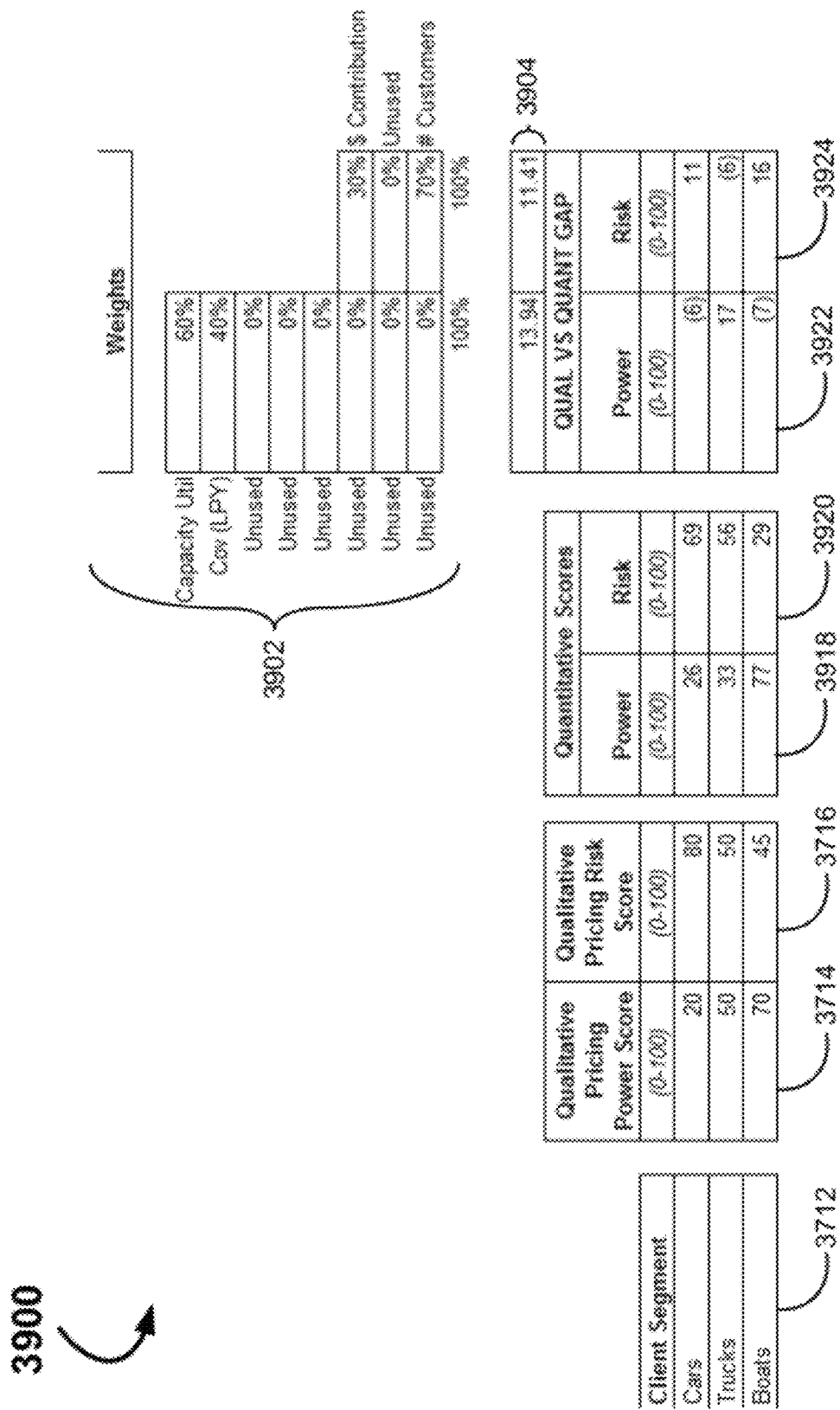
FIG. 39 is an exemplary table of quantitative versus qualitative pricing power and risk scores for the exemplary client segments of FIG. 37.

FIG. 39 is an exemplary table of quantitative versus qualitative pricing power and risk scores for the exemplary client segments of FIG. 37, seen generally at 3900. The client segments are listed at 3712. Qualitative pricing power scores for the client segments are shown at 3714. Qualitative pricing risk scores for the client segments are shown at 3716. The raw quantitative power and risk scores may be aggregated for each of the client segments. This aggregation may include a revenue weighted average of the quantitative scores for each generated segment. The aggregated quantitative pricing power scores for the aggregate segments are shown at 3918. The aggregated quantitative pricing risk scores for the aggregate segments are shown at 3920.

Next, the difference between the qualitative and quantitative pricing power and risk scores may be calculated and displayed. Differences in pricing power are illustrated at 3922, and differences in pricing risk are illustrated at 3924. Likewise, standard deviations of the gap between qualitative and quantitative scores may be seen.

The table at 3902 once again shows the breakdown of factor weights in determining quantitative pricing power and risk scores.

Figure 40:
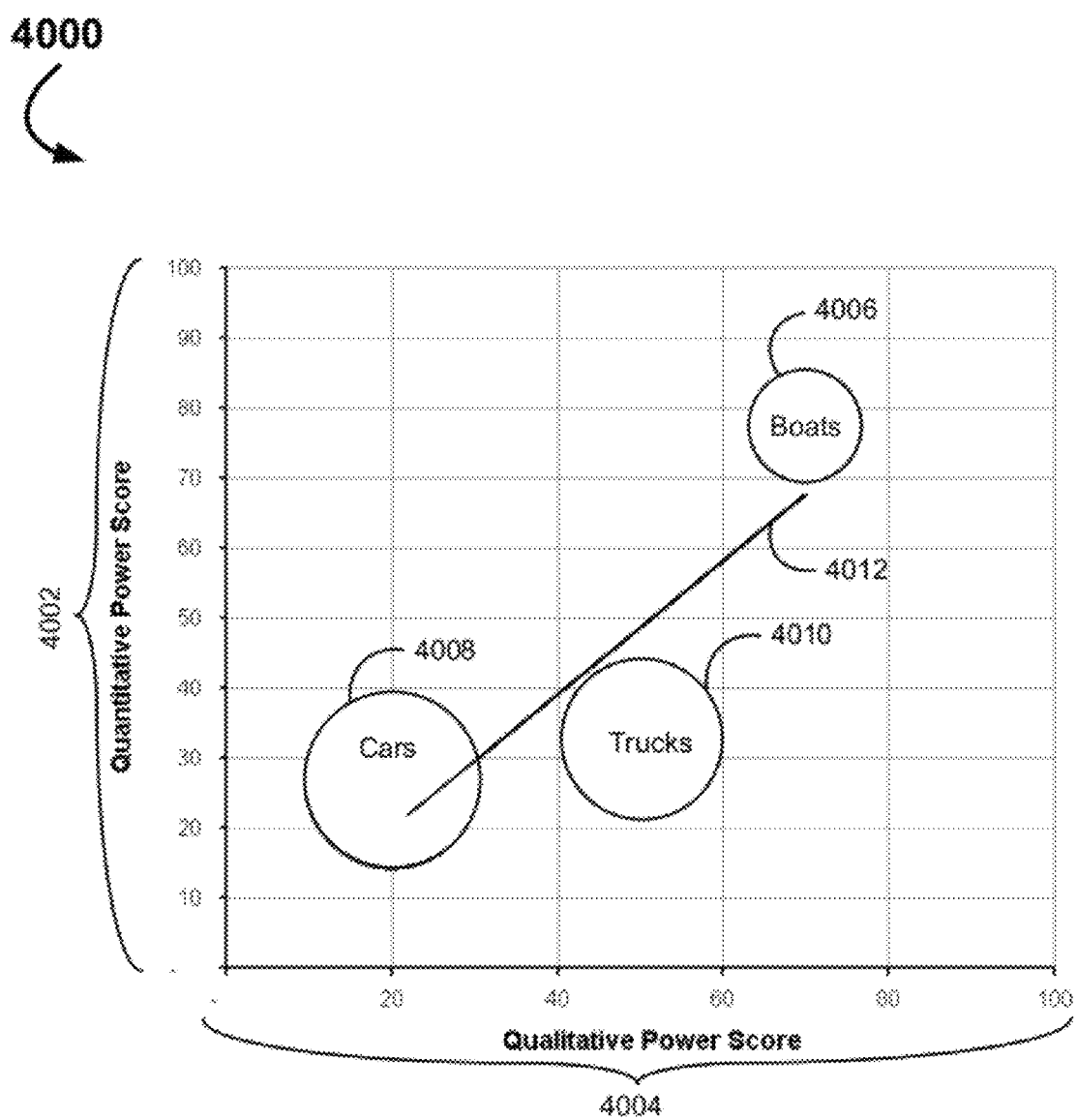
FIG. 40 is an exemplary plot of quantitative versus qualitative pricing power scores for the exemplary client segments of FIG. 37.

FIG. 40 is an exemplary plot of quantitative versus qualitative pricing power scores for the exemplary client segments of FIG. 37, shown generally at 4000. Qualitative power scores may be seen at 4004, on the X-axis. Quantitative power scores may be seen at 4002, on the Y-axis. The client segments may then be plotted as a bubble plot. Again, size of the bubbles may correspond to revenue.

A linear regression line is plotted at 4012. Ideally, segments would fall on the regression line. Cars segment is plotted at 4008, trucks segment at 4010 and boats segment at 4006. As can be seen, for the trucks segment the quantitative power score is much lower than the qualitative power score.

The low quantitative power score of trucks is due, in this example, to vans having the lowest capacity utilization and coefficient of variation of list price of all segments. Having seen this data, the client, in this hypothetical example, may revise its subjective opinion and reduce the qualitative score from 50 to 35.

Figure 41:
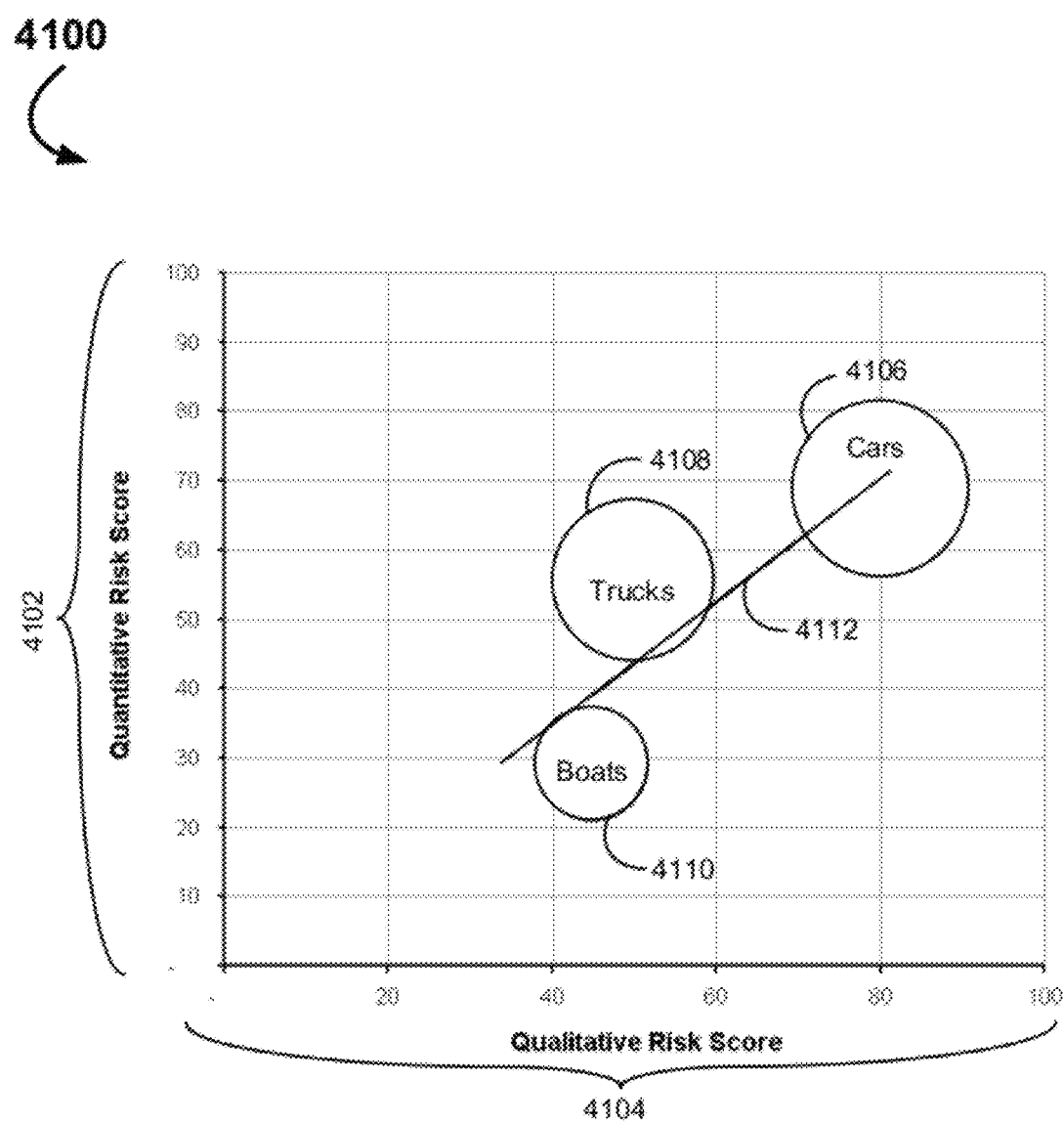
FIG. 41 is an exemplary plot of quantitative versus qualitative pricing risk scores for the exemplary client segments of FIG. 37.

FIG. 41 is an exemplary plot of quantitative versus qualitative pricing risk scores for the exemplary client segments of FIG. 37, shown generally at 4100. Qualitative risk scores may be seen at 4104, on the X-axis. Quantitative risk scores may be seen at 4102, on the Y-axis. The client segments may then be plotted as a bubble plot. Again, size of the bubbles may correspond to revenue.

A linear regression line is plotted at 4112. Ideally, segments would fall on the regression line. Cars segment is plotted at 4106; trucks segment at 4108 and boats segment at

4110. As can be seen, for the boats segment the quantitative risk score is much lower than the qualitative risk score.

The low quantitative risk score for boats, in this example, was due to speedboats and cruisers having small overall profit contributions and many customers. In this example, however, the client may determine that boat sales lend them an "upscale" brand image, therefore making sales of boats more important to the business that profit contributions would indicate. Thus, for this hypothetical example, the client may decide to leave the qualitative risk score at 45.

Figure 42:
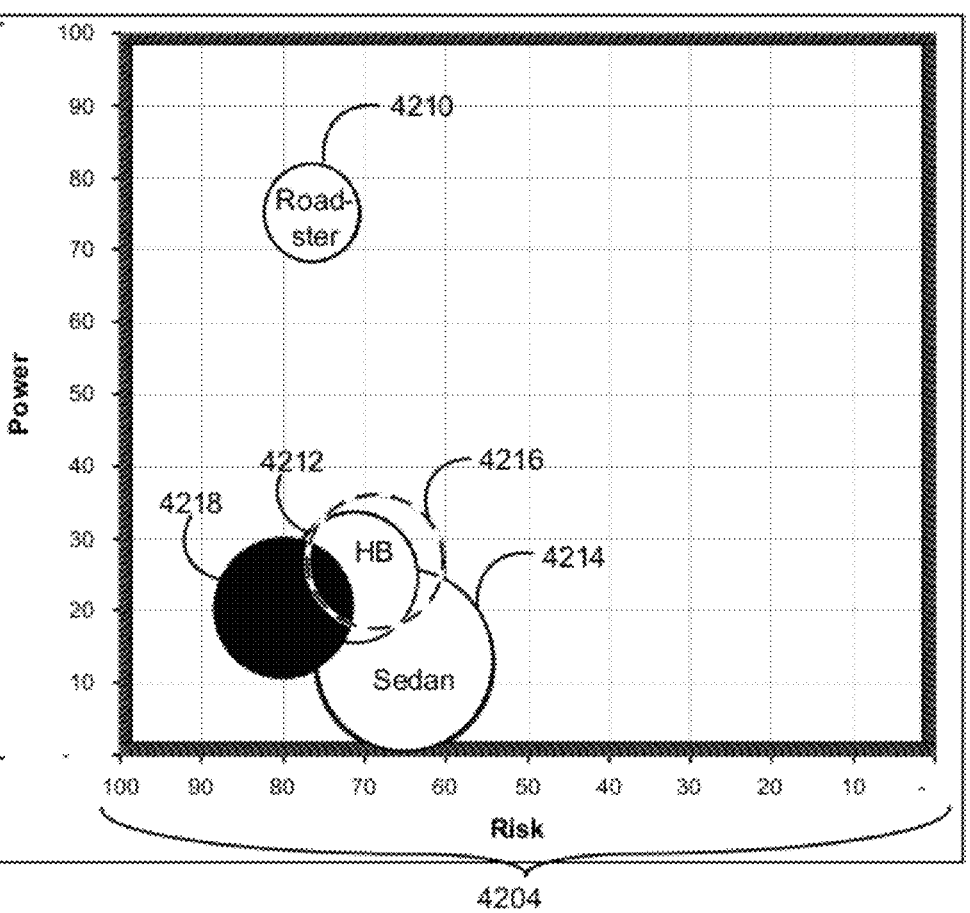
FIG. 42 is an exemplary plot of quantitative pricing power and risk scores for the exemplary generated segments and the and qualitative client scores for the exemplary client segment of FIGS. 37 and 38.

FIG. 42 is an exemplary plot of quantitative pricing power and risk scores for the exemplary generated segments and the qualitative client scores for the exemplary client segment of FIGS. 37 and 38, shown generally at 4200. For this plot, pricing power, at 4202, is on the Y-axis. Pricing risk, at 4204, is on the X-axis.

The qualitative scores for the client segment 'cars' is plotted at 4218. The generated segments quantitative scores are likewise plotted. Thus, the quantitative power and risk scores for Roadsters segment may be seen at 4210. The quantitative power and risk scores for Hatchback segment may be seen at 4212. Lastly, the quantitative power and risk scores for the Sedans segment may be seen at 4214.

The aggregate quantitative power and risk scores for the aggregate 'cars' segment may also be seen at 4216. This aggregate quantitative power and risk score may then be compared to the qualitative scores for the client segment 'cars' that is plotted at 4218.

Figure 43:
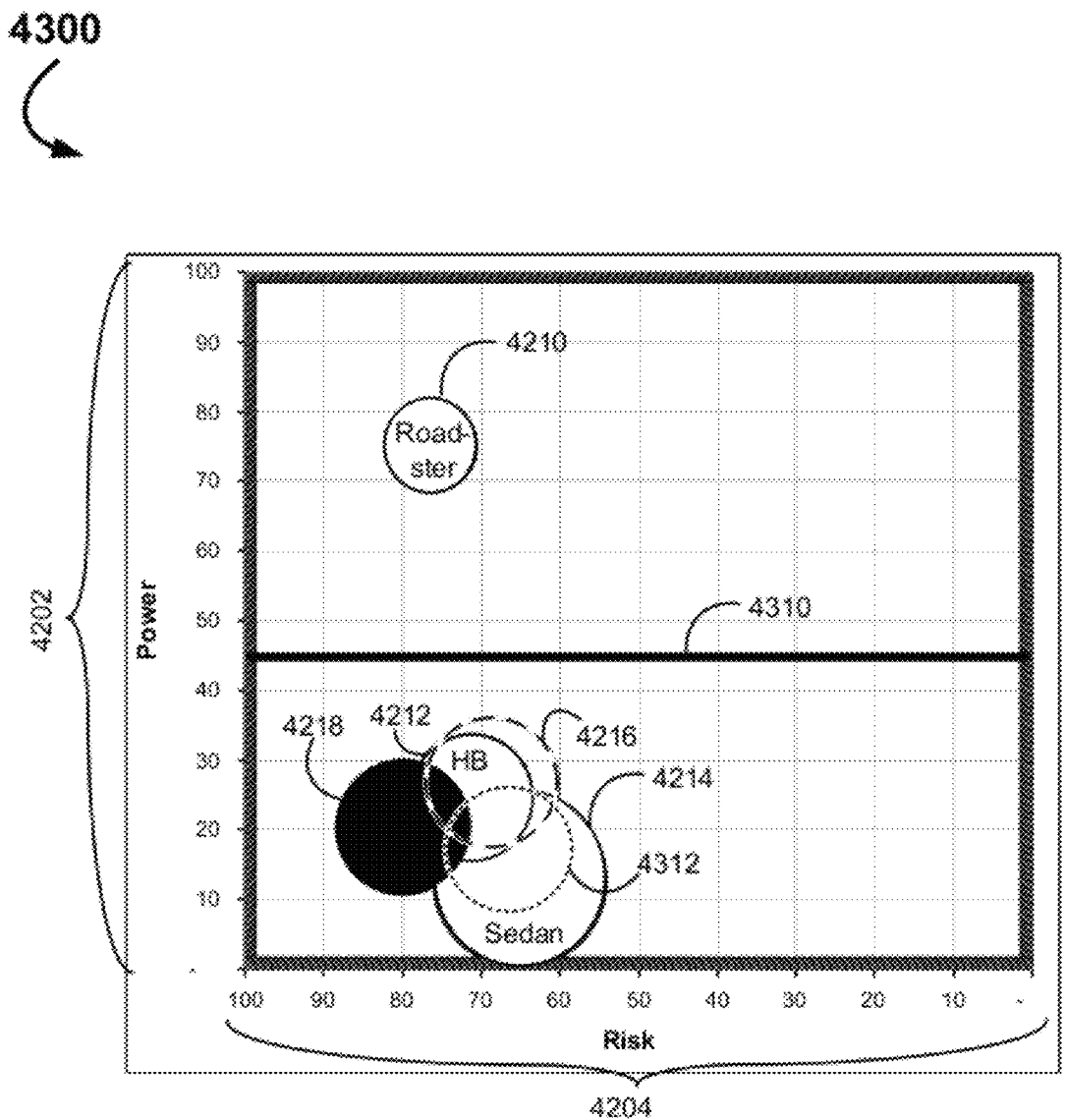
FIG. 43 is the exemplary plot of FIG. 42 wherein a subset of the exemplary generated segments has been selected for the quantitative pricing power and risk scores.

FIG. 43 is the exemplary plot of FIG. 42 wherein a subset of the exemplary generated segments has been selected for the quantitative pricing power and risk scores, shown generally at 4300. In this example, the client realized that it effectively ignored Roadsters when making its qualitative assessment. Thus, Hatchbacks and sedans form the subset of generated segments which are to be aggregated in order to compare to the qualitative scores for the client's car segment.

Thus, a bound is set at a power of 45, above which the segments are not included in the generation of the aggregate segment. This bound is shown at 4310. Thus, a new aggregated quantitative power and risk score may be generated for the subset of generated segments (i.e. hatchbacks and sedans). This updated aggregate quantitative score may be seen at 4312. Since Roadsters were not included in this aggregate, the power scores are lower and risk scores are a little higher as compared to the old aggregate score of 4216.

Figure 44:
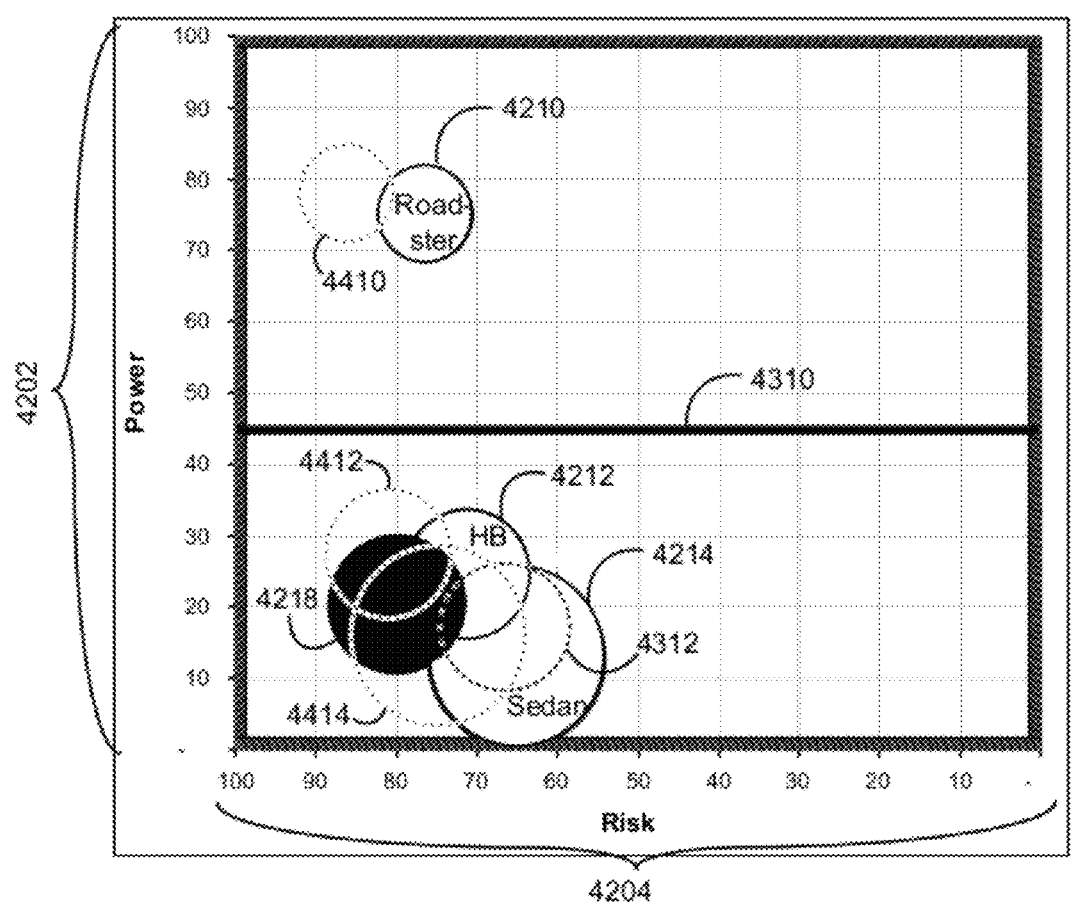
FIG. 44 is the exemplary plot of FIG. 43 wherein a exemplary generated segments quantitative pricing power and risk scores have been calibrated.

FIG. 44 is the exemplary plot of FIG. 43 wherein the exemplary generated segments' quantitative pricing power and risk scores have been calibrated, shown generally at 4400. Here the subset aggregate quantitative power and risk score, seen at 4312, may be compared to the client qualitative score seen at 4218. Calibration factors may then be determined and applied to all generated segments. Application to all segments includes the Roadster segment, shown at 4210, as to maintain spread.

Thus, the adjusted power and risk scores for Roadsters may be seen at 4410. The adjusted power and risk scores for Hatchbacks may be seen at 4412. Lastly, the adjusted power and risk scores for Sedans may be seen at 4414.

Figure 45:
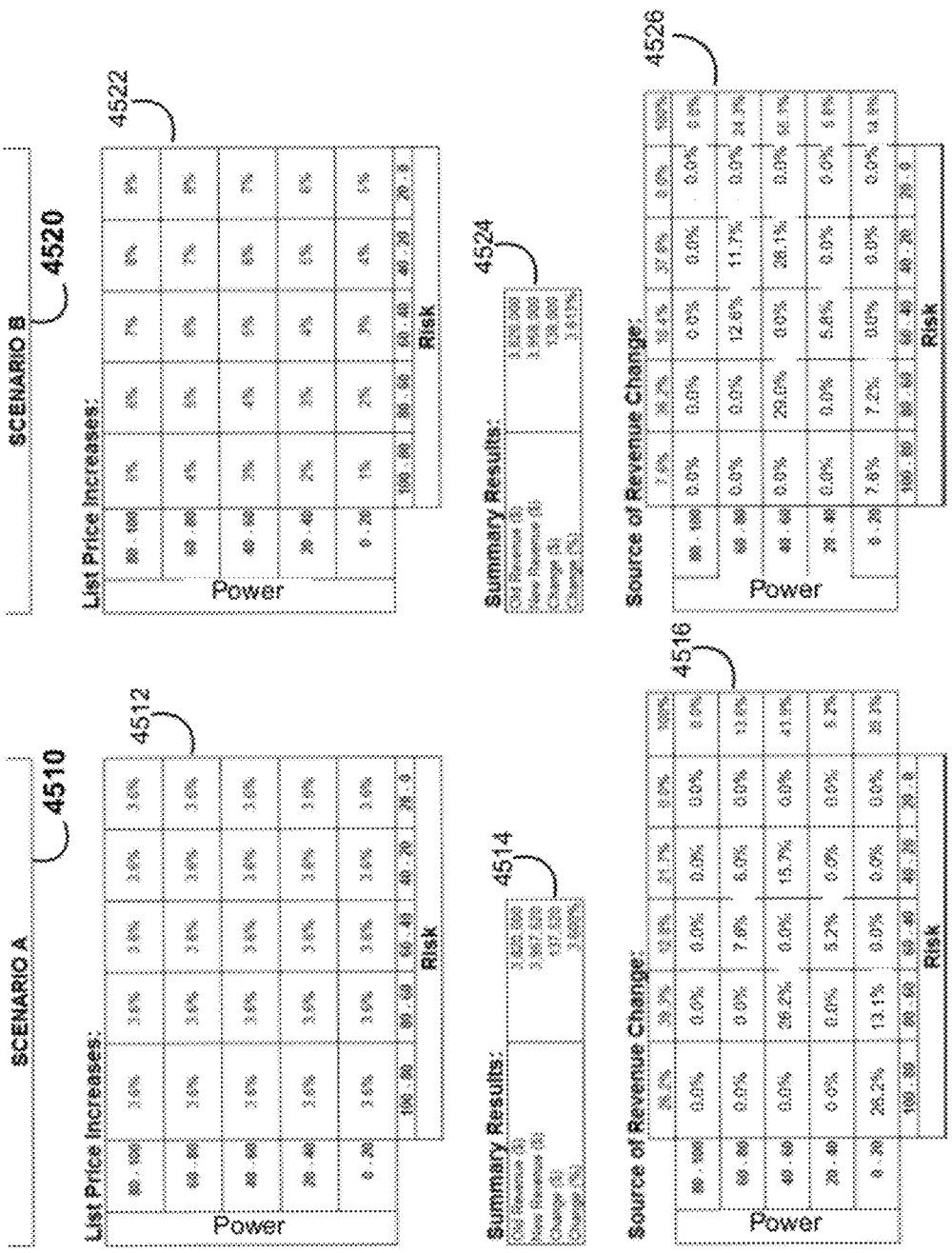
FIG. 45 illustrates a comparison of two exemplary price change scenarios in accordance with an embodiment of the present invention.

FIG. 45 illustrates a comparison of two exemplary price change scenarios in accordance with an embodiment of the present invention. The first price change scenario (Scenario A 4510) includes the application of a price change evenly across all pricing power and risk values, as may be seen in the pricing power and risk plot with a price change matrix overlay illustrated at 4512. This results in a 3.6% list price increase across all segments. Exemplary results of such a price change are illustrated at table 4514. The source of revenue change for this scenario may then be seen at the plot 4516. As can be seen, the bulk of the revenue increase, in this exemplary scenario, comes from higher risk and lower power segments.

On the other hand, the second price change scenario (Scenario B 4520) includes the application of a price change unevenly across pricing power and risk values, as may be seen in the pricing power and risk plot with a price change matrix overlay illustrated at 4522. This results in a maximum of 9% list price increase for the most-power-least-risk segments, and as low as a 1% increase for the lowest power and highest risk segments. Exemplary results of such a price change are illustrated at table 4524. The source of revenue change for this scenario may then be seen at the plot 4526. As can be seen, the bulk of the revenue increase, in this exemplary scenario, comes from less risk and higher power segments.

Figure 46:
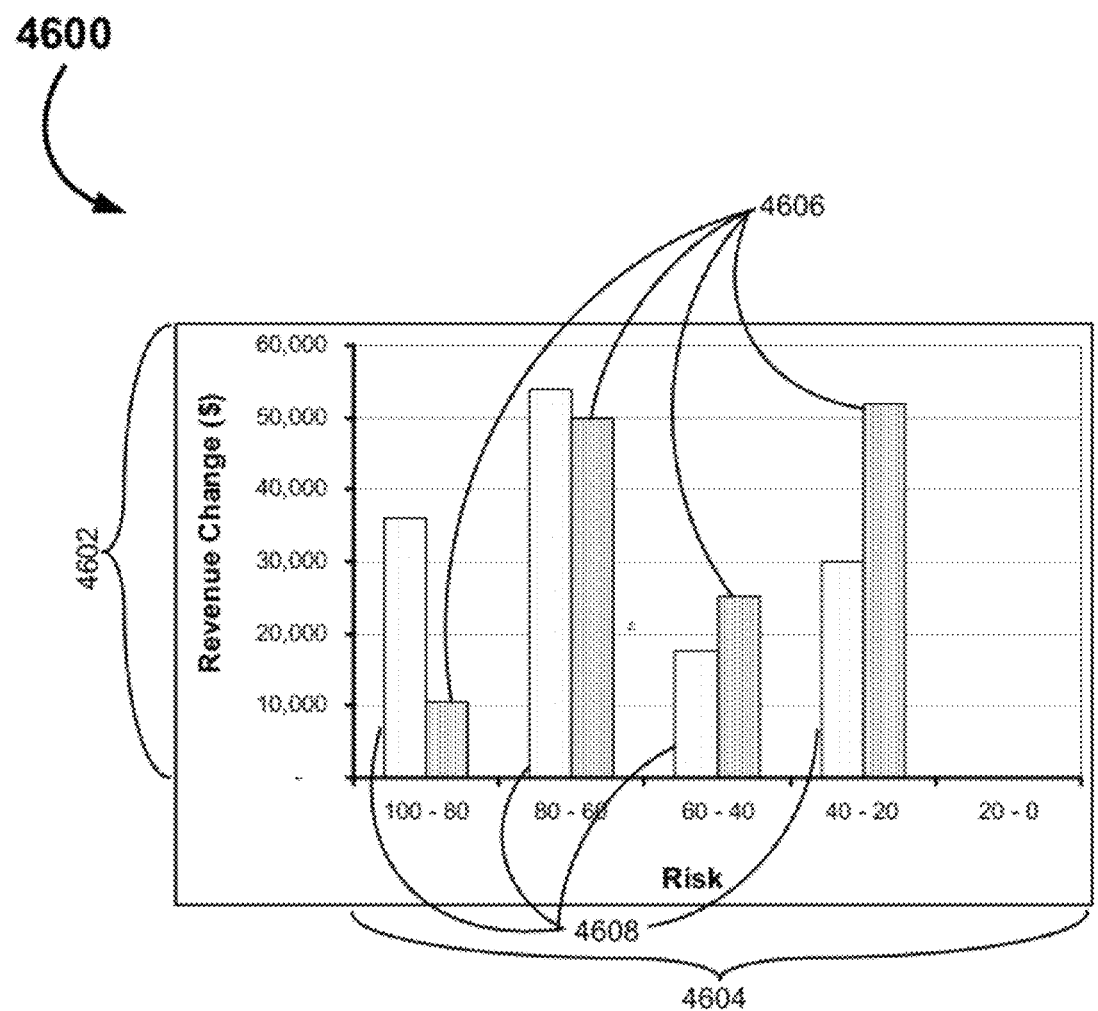
FIG. 46 illustrates an exemplary plot of revenue change to risk for the two exemplary price change scenarios of FIG. 45.

FIG. 46 illustrates an exemplary bar plot of revenue change to risk for the two exemplary price change scenarios of FIG. 45, shown generally at 4600. The Revenue change is plotted along the Y-axis and is shown at 4602. Risk value buckets are plotted along the X-axis and are shown at 4604.

Bars labeled 4606 correspond to the unequal price change distribution from FIG. 45. Contrary, bars labeled 4608 correspond to the equal across all segment price change distribution from FIG. 45. Thus, it may be seen that with unequal pricing distribution, the price change may come from segments with a lower risk than if pricing were applied equally across all segments.

In sum, systems and methods for calibrating pricing power and pricing risk scores in a business to business market setting are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the system and methods has been described in functional terms, embodiments of the present invention may include entirely hardware, entirely software or some combination of the two. Additionally, manual performance of any of the methods disclosed is considered as disclosed by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for calibrating power and risk scores, useful in association with an integrated price management system, the method comprising:
  receiving a quantitative power score and a quantitative risk score for each of at least one quantitative segment;
  receiving a qualitative power score and a qualitative risk score for each of at least one qualitative segment, wherein the at least one qualitative segment is defined by a user, and wherein the user determines the qualitative power score and the qualitative risk score for each of the at least one qualitative segment;
  generating at least one consolidated segment by aggregating some of the at least one quantitative segments, wherein the at least one consolidated segment is analogous to the at least one qualitative segment;

generating a consolidated power score and a consolidated risk score for each of the at least one consolidated segment, wherein the consolidated power score and the consolidated risk score is generated by aggregating the quantitative power score and the quantitative risk score for each of the at least one quantitative segment used to generate each of the at least one consolidated segment;

reconciling gaps, executed by a computer, between the qualitative power score and the qualitative risk score for each of at least one qualitative segment with the consolidated power score and the consolidated risk score for each of the at least one consolidated segment, wherein the reconciliation generates adjustment factors; and applying the adjustment factors to the quantitative power score and the quantitative risk score for each of the at least one quantitative segment to generate calibrated power and risk scores for each of the at least one quantitative segment.

2. The method as recited in claim 1, wherein the quantitative power score and the quantitative risk score for each of at least one quantitative segment are generated.

3. The method as recited in claim 2, wherein the generating the quantitative power score and the quantitative risk score includes:

identifying at least one pricing power factor;

identifying at least one pricing risk factor;

assigning a raw pricing power score for each of the at least one pricing power factor for each of the at least one quantitative segment;

assigning a raw pricing risk score for each of the at least one pricing risk factor for each of the at least one quantitative segment;

generating a pricing power weight for each of the raw pricing power score for each of the at least one pricing power factor for each of the at least one quantitative segment;

generating a pricing risk weight for each of the raw pricing risk score for each of the at least one pricing risk factor for each of the at least one quantitative segment;

generating the quantitative pricing power score for each of the at least one quantitative segment by computing a weighted average of the raw pricing power score for each at least one pricing power factor using the generated pricing power weight for each of the raw pricing power score for each of the at least one pricing power factor; and generating the quantitative pricing risk score for each of the at least one quantitative segment by computing a weighted average of the raw pricing risk score for each at least one pricing risk factor using the generated pricing risk weight for each of the raw pricing risk score for each of the at least one pricing risk factor.

4. The method as recited in claim 1, further comprising generating a segment map for aggregating the at least one quantitative segment by comparing the at least one quantitative segment to the at least one qualitative segment.

5. The method as recited in claim 1, further comprising drilling down into the qualitative power score and the qualitative risk score, wherein the drilling down generates data explaining the gap between the qualitative power score and the consolidated power score, and the gap between the qualitative risk score and the consolidated risk score.

6. The method as recited in claim 5, further comprising modifying at least one of the qualitative power score and the qualitative risk score in response to the drill down data.

7. The method as recited in claim 5, further comprising overriding at least one of the quantitative power score and the quantitative risk score in response to the drill down data.

8. The method as recited in claim 5, further comprising tuning at least one of the quantitative power score and the quantitative risk score in response to the drill down data, and rerunning the power and risk score calibration.

9. The method as recited in claim 1, wherein the applying the adjustment factors to the quantitative power score and the quantitative risk score includes a non linear adjustment.

10. The method as recited in claim 1, further comprising outputting the calibrated power and risk scores to a segment price setter.

11. A power and risk score calibrator, useful in association with an integrated price management system, the power and risk score calibrator comprising:

a segment pricing power reconciler configured to receive a quantitative power score for each of at least one quantitative segment, receive a qualitative power score for each of at least one qualitative segment, wherein the at least one qualitative segment is defined by a user, and wherein the user determines the qualitative power score for each of the at least one qualitative segment;

a segment pricing risk reconciler configured to receive a quantitative risk score for each of the at least one quantitative segment, receive a qualitative risk score for each of the at least one qualitative segment, wherein the at least one qualitative segment is defined by the user, and wherein the user determines the qualitative power score for each of the at least one qualitative segment;

a segment cartographer configured to generate at least one consolidated segment by aggregating some of the at least one quantitative segments, wherein the at least one consolidated segment is analogous to the at least one qualitative segment;

a segment power aggregator configured to generate a consolidated power score for each of the at least one consolidated segment, wherein the consolidated power score is generated by aggregating the quantitative power score for each of the at least one quantitative segment used to generate each of the at least one consolidated segment;

a pricing power value comparer configured to reconcile gaps between the qualitative power score for each of at least one qualitative segment with the consolidated power score for each of the at least one consolidated segment, wherein the reconciliation generates power adjustment factors;

a pricing power value calibrator, embodied on a computer system, configured to apply the power adjustment factors to the quantitative power score for each of the at least one quantitative segment to generate calibrated power scores for each of the at least one quantitative segment;

a segment risk aggregator configured to generate a consolidated risk score for each of the at least one consolidated segment, wherein the consolidated risk score is generated by aggregating the quantitative risk score for each of the at least one quantitative segment used to generate each of the at least one consolidated segment;

a pricing risk value comparer configured to reconcile gaps between the qualitative risk score for each of the at least one qualitative segment with the consolidated risk score for each of the at least one consolidated segment, wherein the reconciliation generates risk adjustment factors; and a pricing risk value calibrator, embodied on a computer system, configured to apply the risk adjustment factors to the quantitative risk score for each of the at least one quantitative segment to generate calibrated risk scores for each of the at least one quantitative segment.

12. The power and risk score calibrator of claim 11, further comprising a quantitative pricing power and pricing risk score generator configured to generate the quantitative power score and the quantitative risk score for each of at least one quantitative segment.

13. The power and risk score calibrator of claim 12, wherein the quantitative pricing power and pricing risk score generator includes:
- a segment pricing power analyzer configured to identify at least one pricing power factor, assign a raw pricing power score for each of the at least one pricing power factor for each of the at least one quantitative segment, generate a pricing power weight for each of the raw pricing power score for each of the at least one pricing power factor for each of the at least one quantitative segment, and generate the quantitative pricing power score for each of the at least one quantitative segment by computing a weighted average of the raw pricing power score for each at least one pricing power factor using the generated pricing power weight for each of the raw pricing power score for each of the at least one pricing power factor; and
- a segment pricing risk analyzer configured to identify at least one pricing risk factor, assign a raw pricing risk score for each of the at least one pricing risk factor for each of the at least one quantitative segment, generate a pricing risk weight for each of the raw pricing risk score for each of the at least one pricing risk factor for each of the at least one quantitative segment, and generate the quantitative pricing risk score for each of the at least one quantitative segment by computing a weighted average of the raw pricing risk score for each at least one pricing risk factor using the generated pricing risk weight for each of the raw pricing risk score for each of the at least one pricing risk factor.

14. The power and risk score calibrator of claim 11, wherein the segment cartographer is further configured to generate a segment map for aggregating the at least one quantitative segment by comparing the at least one quantitative segment to the at least one qualitative segment.

15. The power and risk score calibrator of claim 11, wherein the pricing power value calibrator is further configured to drill down into the qualitative power score, wherein the drill down generates data explaining the gap between the qualitative power score and the consolidated power score, and wherein the pricing risk value calibrator is further configured to drill down into the qualitative risk score, wherein the drill down generates data explaining the gap between the qualitative risk score and the consolidated risk score.

16. The power and risk score calibrator of claim 15, wherein the pricing power value calibrator is further configured to modify the qualitative power score in response to the drill down data, and the pricing risk value calibrator is further configured to modify the qualitative risk score in response to the drill down data.

17. The power and risk score calibrator of claim 15, wherein the pricing power value calibrator is further configured to override the quantitative power score in response to the drill down data, and the pricing risk value calibrator is further configured to override the quantitative risk score in response to the drill down data.

18. The power and risk score calibrator of claim 15, wherein the pricing power value calibrator is further configured to tune the quantitative power score in response to the drill down data, and the pricing risk value calibrator is further configured to tune the quantitative risk score in response to the drill down data, and wherein the power and risk score calibrator is configured to rerun the power and risk score calibration.

19. The power and risk score calibrator of claim 11, wherein the pricing power value calibrator and the pricing risk value calibrator are configured to apply the adjustment factors to the quantitative power score and the quantitative risk score as a non linear adjustment.

20. The power and risk score calibrator of claim 11, further comprising a reconciled data outputter configured to output the calibrated power and risk scores to a segment price setter.

* * * * *